United States Patent [19]
Yoshizawa et al.

[11] Patent Number: 5,822,760
[45] Date of Patent: Oct. 13, 1998

[54] CACHE-MEMORY SYSTEM HAVING MULTIDIMENSIONAL CACHE

[75] Inventors: Hideki Yoshizawa; Tatsushi Otsuka, both of Kawasaki, Japan

[73] Assignee: Fujitsu Limited, Kawasaki, Japan

[21] Appl. No.: 659,702

[22] Filed: Jun. 10, 1996

Related U.S. Application Data

[63] Continuation-in-part of Ser. No. 381,157, Jan. 31, 1995, abandoned.

[30] Foreign Application Priority Data

Jan. 31, 1994 [JP] Japan .................................. 6-009756
Aug. 10, 1995 [JP] Japan .................................. 7-204278

[51] Int. Cl.⁶ .................................................. G06F 12/08
[52] U.S. Cl. ........................... 711/137; 711/213; 711/129
[58] Field of Search .................................. 395/403, 405, 395/419, 445, 454, 455, 456, 465, 421.03, 421.1; 711/118, 127, 128, 129, 138, 3, 5, 209, 213, 220, 137

[56] References Cited

U.S. PATENT DOCUMENTS

| | | | |
|---|---|---|---|
| 4,197,580 | 4/1980 | Chang et al. | 711/144 |
| 5,287,487 | 2/1994 | Priem et al. | 711/204 |

FOREIGN PATENT DOCUMENTS

| | | |
|---|---|---|
| 2-238490 | 9/1990 | Japan . |
| 4-051373 | 2/1992 | Japan . |
| 4-102146 | 4/1992 | Japan . |
| 6-004396 | 1/1994 | Japan . |
| 2 180 128 | 3/1987 | United Kingdom . |

OTHER PUBLICATIONS

Handy, "The Cache Memory Bank", 1993, pp. 49–52.
"Block Random–Access Memory" Texas Instruments, 1994, pp. 1–20. (With translation).
"4–Megabit Block Random–Access Memory TMS 92060 (5V)", Nov. 10, 1994, pp. 1–22. (With translation).
Hennessy et al., *Computer Architecture: A Quantitative Approach,* Chapter 8.3 —"Caches", 1990, pp. 408–425.

*Primary Examiner*—Eddie P. Chan
*Assistant Examiner*—Kevin L. Ellis
*Attorney, Agent, or Firm*—Staas & Halsey

[57] ABSTRACT

A prediction block address is generated from a current block address in accordance with a rule specified by a prediction mode signal. One of two cache memory banks is allocated as a current bank and the other is allocated as a prediction bank. When the current block address is stored in the prediction bank, the allocation of the current and prediction banks is reversed. When the prediction block address is not stored in the prediction bank, a data block specified by the prediction block address is block-read into the prediction bank.

6 Claims, 47 Drawing Sheets

Fig.11A

START → 
1401: LOAD VALUE STORED IN LINE NUMBER FIELD IN TAG MEMORY INDICATED BY 8 HIGH-ORDER BITS OF X-AD. REG. INTO L-NO. REG. →
1402: LOAD DATA STORED AT CACHE MEMORY ADDRESS GIVEN BY L-NO. REG., 3 LOW-ORDER BITS OF X-AD. REG., AND 3 LOW-ORDER BITS OF Y-AD. REG. INTO D-REG. →
1403: UPDATE CURRENT ACCESS FLAG (FIG. 15C) →
1404: SET REFERENCE BIT (FIG. 15B) →
END

Fig.11B

START →
1501: LOAD VALUE STORED IN LINE NUMBER FIELD IN TAG MEMORY INDICATED BY 8 HIGH-ORDER BITS OF X-AD. REG. INTO L-NO. REG. →
1502: STORE VALUE OF D-REG. AT CACHE MEMORY ADDRESS GIVEN BY L-NO. REG., 3 LOW-ORDER BITS OF X-AD. REG., AND 3 LOW-ORDER BITS OF Y-AD. REG. →
1503: UPDATE CURRENT ACCESS FLAG (FIG. 15C) →
1504: SET REFERENCE BIT (FIG. 15B) →
END

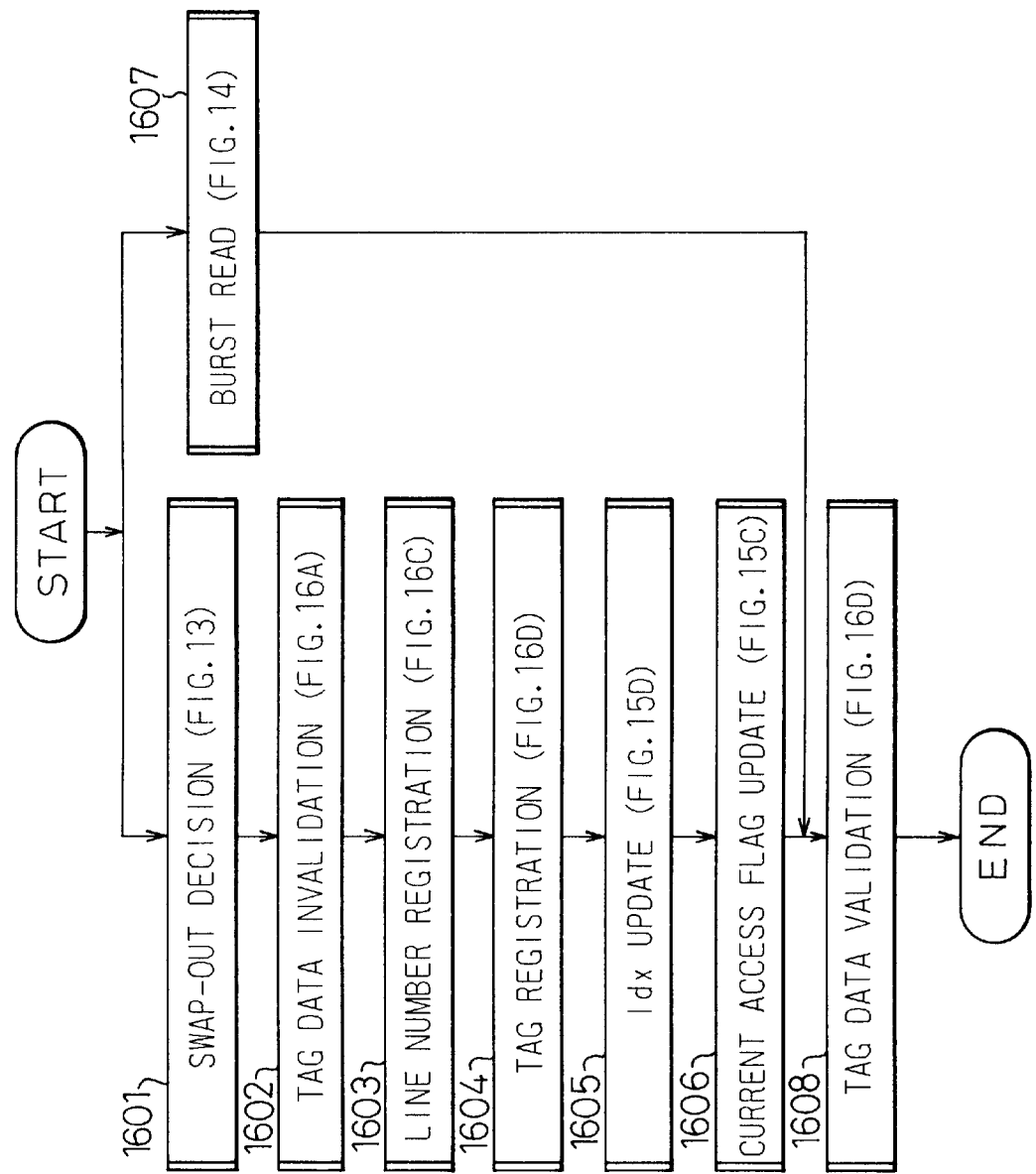

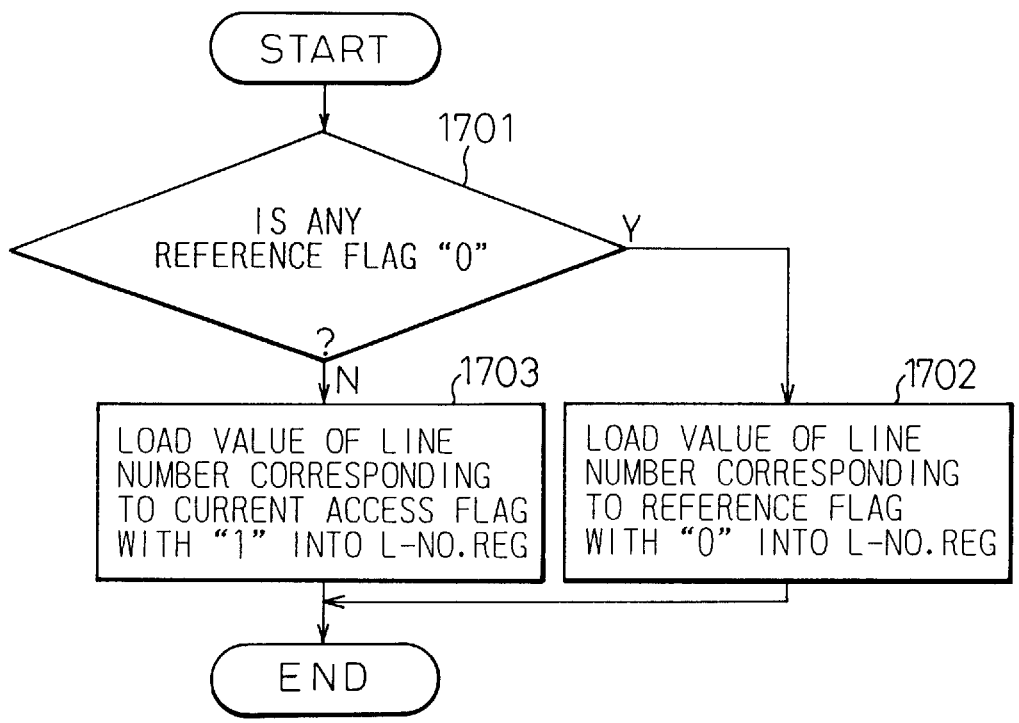

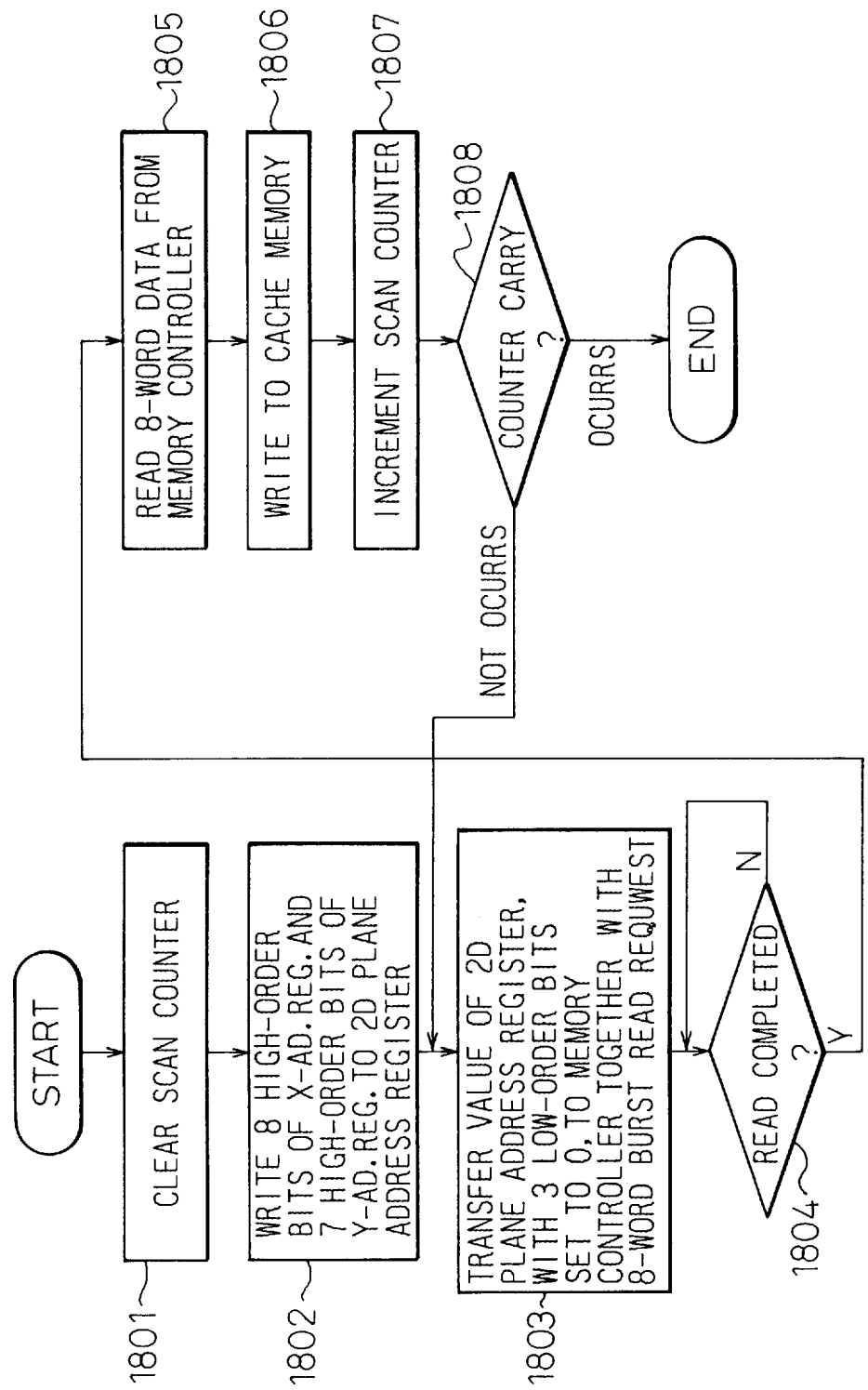

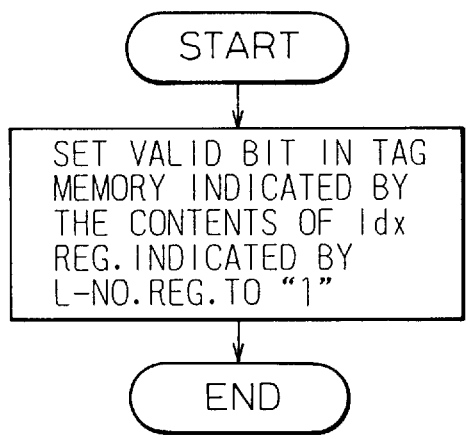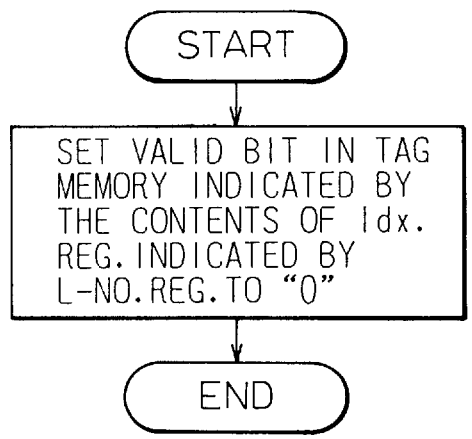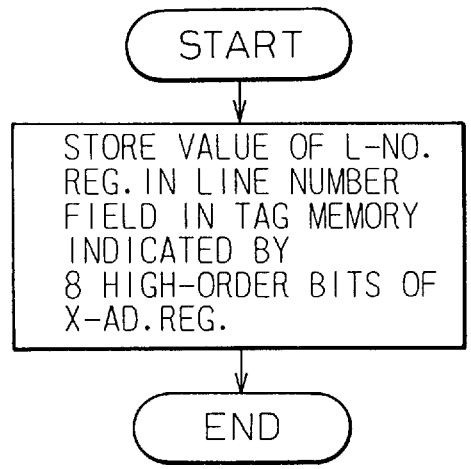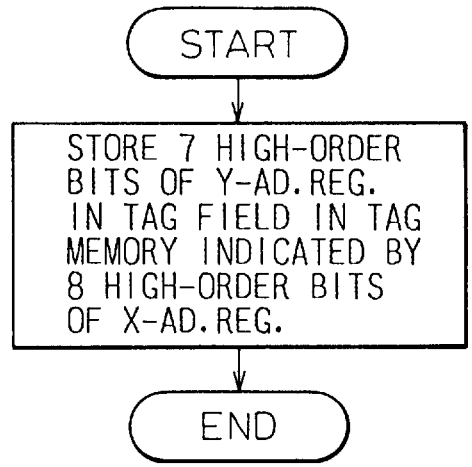

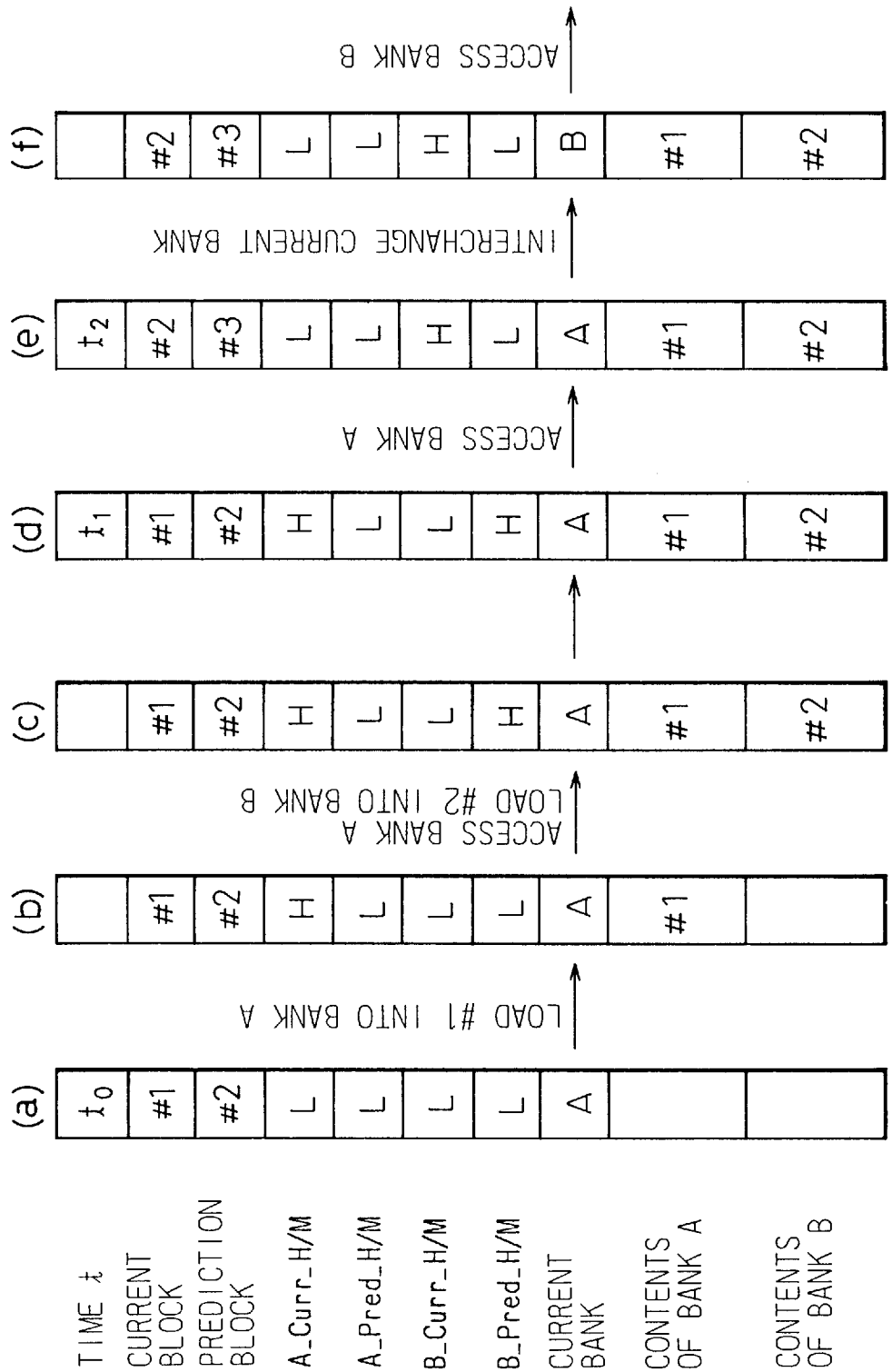

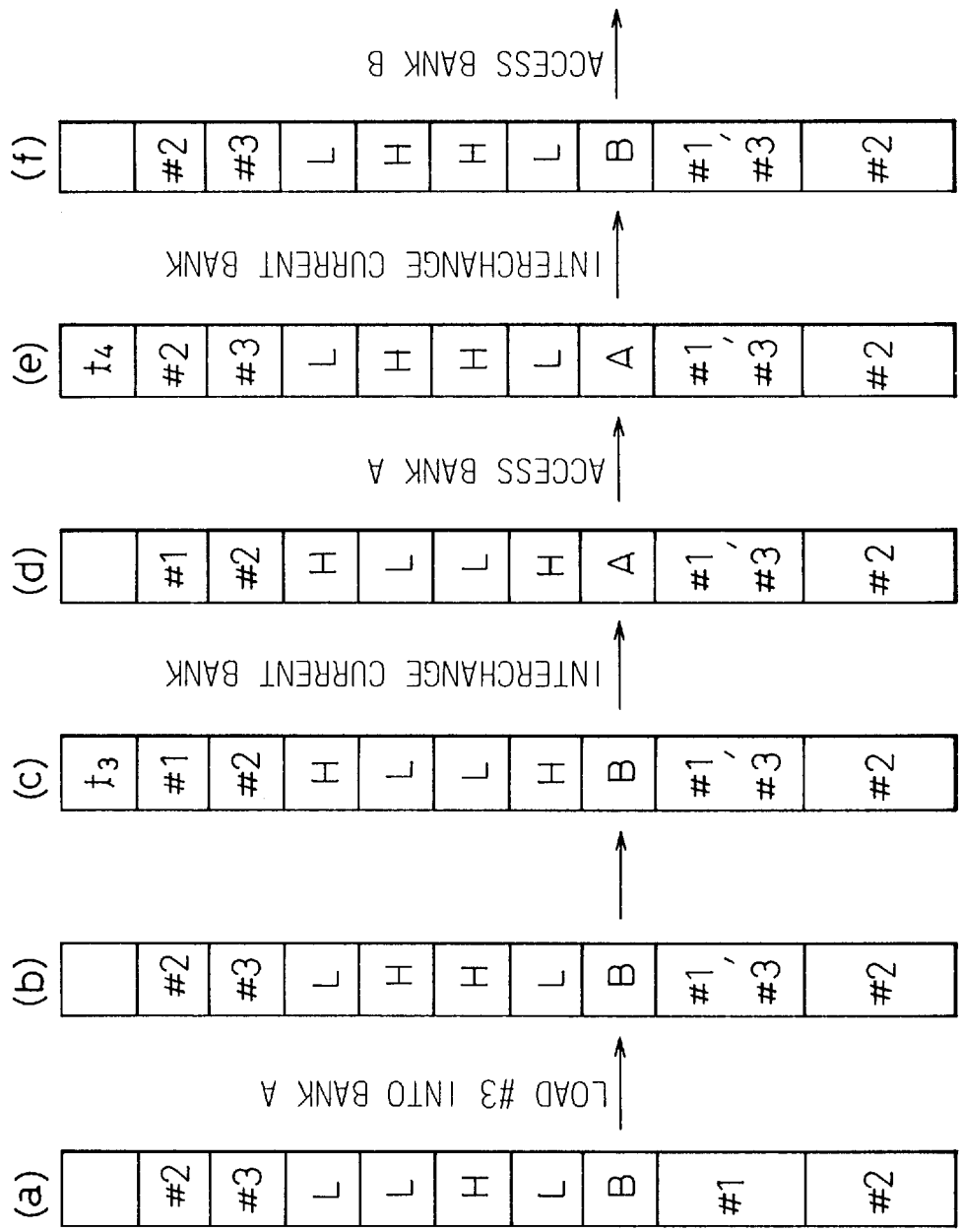

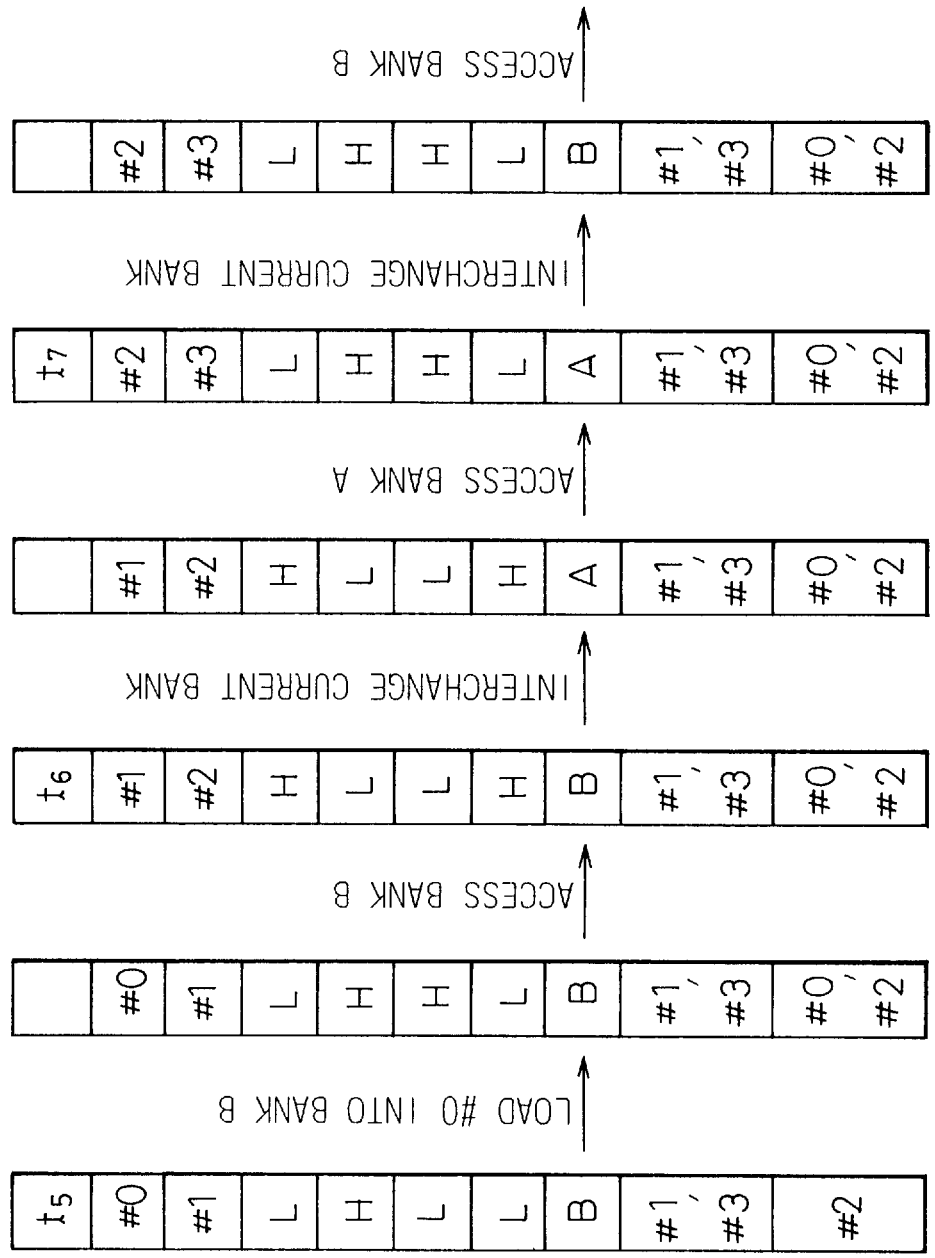

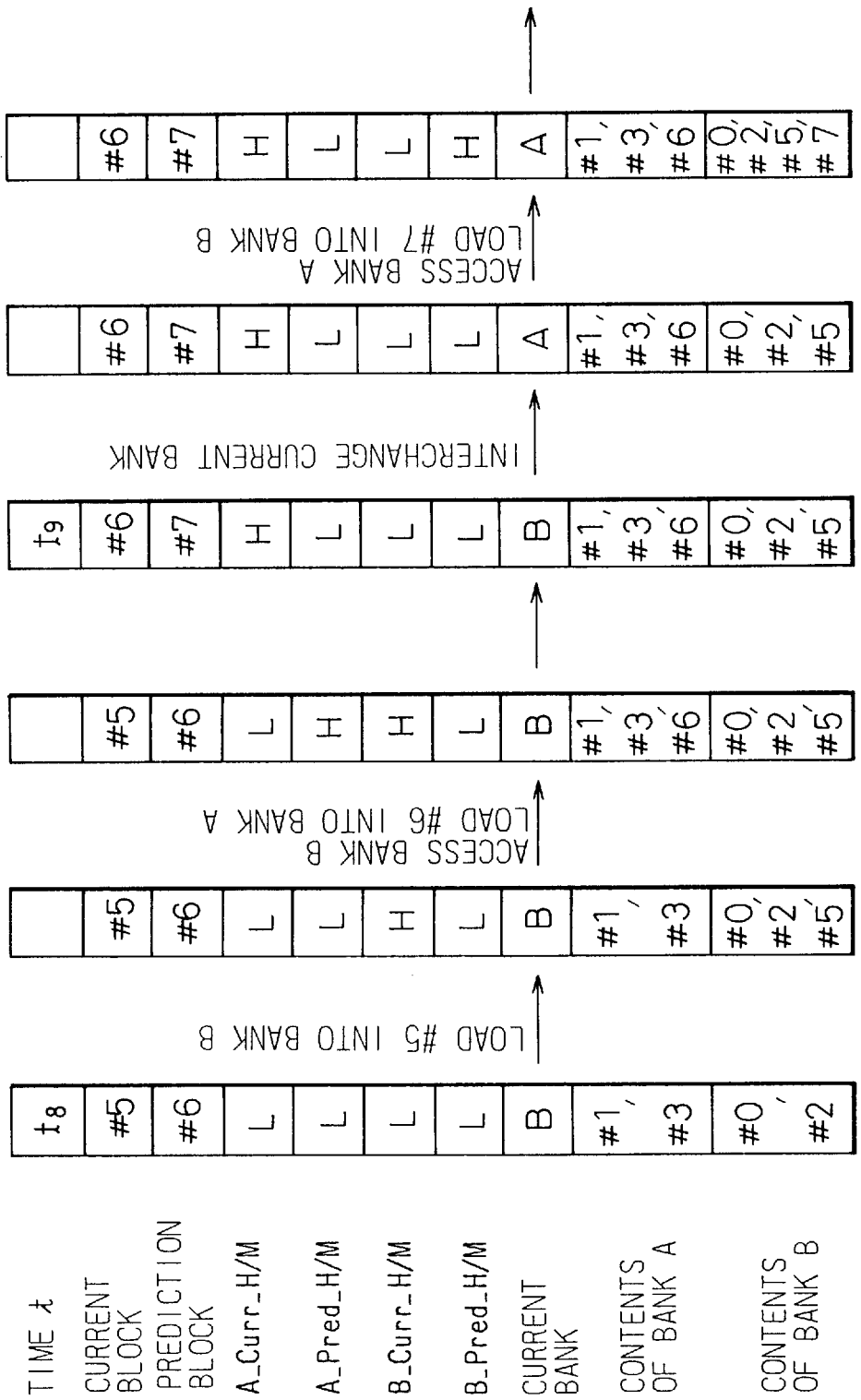

CACHE-MEMORY SYSTEM HAVING MULTIDIMENSIONAL CACHE

CROSS REFERENCE TO RELATED APPLICATION

This application is a continuation-in-part application of Ser. No. 08/381,157 filed on Jan. 31, 1995, now abandoned.

BACKGROUND OF THE INVENTION

1. Field of the Invention

The present invention relates to a cache-memory system suitable for processing data arrayed in multidimensional space (each data item being addressable by a combination of a plurality of addresses), and more particularly to a cache-memory system that is suitable for high-speed processing of data arrayed in a two-dimensional plane (each data item being addressable by a combination of an X address and a Y address) such as the processing of 3-D graphic data.

2. Description of the Related Art

In an apparatus for processing data arrayed in multidimensional space such as 3-D graphic data, the graphic data are stored in a frame buffer memory such as a video RAM, and the processor performs read/write operations by directly accessing the graphic data stored in the frame buffer memory.

Since the amount of data arrayed in such multidimensional space is very large, a large-capacity semiconductor memory is used for the storage thereof. The access time of such a large-capacity semiconductor memory, however, is inherently long, and to achieve high-speed data processing, a cache-memory system is often used to reduce apparent access time.

On the other hand, the processing of data arranged in multidimensional space such as 3-D graphic data exhibits the following characteristics.

i) In the long term, the processing tends to extend randomly over the entire space, but in the short term, the processing tends to concentrate on data in a specific area.

ii) The area where the processing concentrates has a certain spread either spatially or two-dimensionally.

iii) Since individual data items forming a geometrical figure or a three-dimensional figure are processed in a predetermined sequence, it is possible to predict the next data item to be processed.

Accordingly, when employing a cache-memory system in an apparatus for processing data arrayed in multidimensional space, the cache-memory system must be designed by taking the above characteristic into consideration.

In Japanese Unexamined Patent Publication (Kokai) No. 4-102146 (a Japanese patent application claiming priority based on U.S. patent application Ser. No. 454952), there is disclosed a cache-memory system that is used in conjunction with a frame buffer for display. However, as in cache systems widely used in general-purpose computer systems, each data block is identified by address bits, excluding, for example, three low-order bits, of the address in the main memory; each bank of the cache, therefore, stores a data block consisting, for example, of 8 words having contiguous addresses in the display frame buffer. That is, each data block only corresponds to a portion of one scanning line of an image to be displayed, but does not correspond to an area having a two-dimensional spread.

Furthermore, as in cache systems for general-purpose computer systems, direct mapping is employed which identifies each bank of the cache by using some address bits of the address for the display frame buffer; accordingly, which of the data stored in the frame buffer is stored in which bank is predetermined uniquely. As a result, because of the graphic data processing characteristic that the processing extends over the entire screen in the long term while, in the short term, the processing concentrates on a specific area, there occurs the problem that most of the cache banks are not used efficiently.

SUMMARY OF THE INVENTION

It is an object of the present invention to provide a cache-memory system that appropriately addresses the above-described characteristic in the processing of data arrayed in multidimensional space.

According to the present invention, there is provided a cache-memory system for processing data which is stored in a main memory and whose location is specified by a combination of a plurality of data addresses, comprising: a first cache memory bank having a plurality of memory areas each for storing a copy of a data block which is specified by a block address consisting of a first part of a combination of said plurality of data addresses, and each of whose constituent data is specified by an intra-block address consisting of a second part of said combination; a second cache memory bank having a plurality of memory areas each for storing a copy of a data block which is specified by a block address consisting of a first part of a combination of said plurality of data addresses, and each of whose constituent data is specified by an intra-block address consisting of the remaining second part of said combination; a prediction address generating circuit for determining a prediction block address in accordance with a prescribed rule from a current block address derived from a combination of specified data addresses; a cache comparator for determining whether the current block address and the prediction block address determined by said prediction address generating circuit are stored in said first and said second cache memory bank; and a control block for controlling said main memory and said first and said second cache comparator in accordance with the determination made by said cache comparator.

According to the present invention there is also provided a cache-memory system for storing in a cache memory a portion of a main memory where data to be specified by a combination of a plurality of data addresses are stored, comprising: a first cache comparator for determining whether or not first data specified by a combination of said plurality of data addresses is available in said cache memory; a prediction address generating circuit for generating a data address determined by the combination of said plurality of data addresses and by a prediction mode; a second cache comparator for determining whether or not second data specified by the data address generated by said prediction address generating circuit is available in said cache memory; and a control block for reading said first and said second data from said main memory for loading into said cache memory when said first and said second cache comparator respectively have determined that a cache miss has occurred.

BRIEF DESCRIPTION OF THE DRAWINGS

FIGS. 11A and 11B are diagrams each showing a process flow for a cache access operation;

FIG. 12 is a diagram showing a process flow for a block read operation;

FIG. 13 is a diagram showing a process flow for a swap-out block deciding operation;

FIG. 14 is a diagram showing a process flow for a burst read operation;

FIGS. 16A to 16D are diagrams each showing a process flow for TAG updating;

FIG. 48 is a diagram for explaining the operation of the cache-memory system of the present invention;

FIG. 49 is a diagram for explaining the operation of the cache-memory system of the present invention;

FIG. 50 is a diagram for explaining the operation of the cache-memory system of the present invention; and FIG. 51 is a diagram for explaining the operation of the cache-memory system of the present invention.

DESCRIPTION OF THE PREFERRED EMBODIMENTS

The present invention will now be described in detail below in accordance with the preferred embodiments in which the invention is embodied in an image processing apparatus that handles two-dimensional image data.

Figure 1:
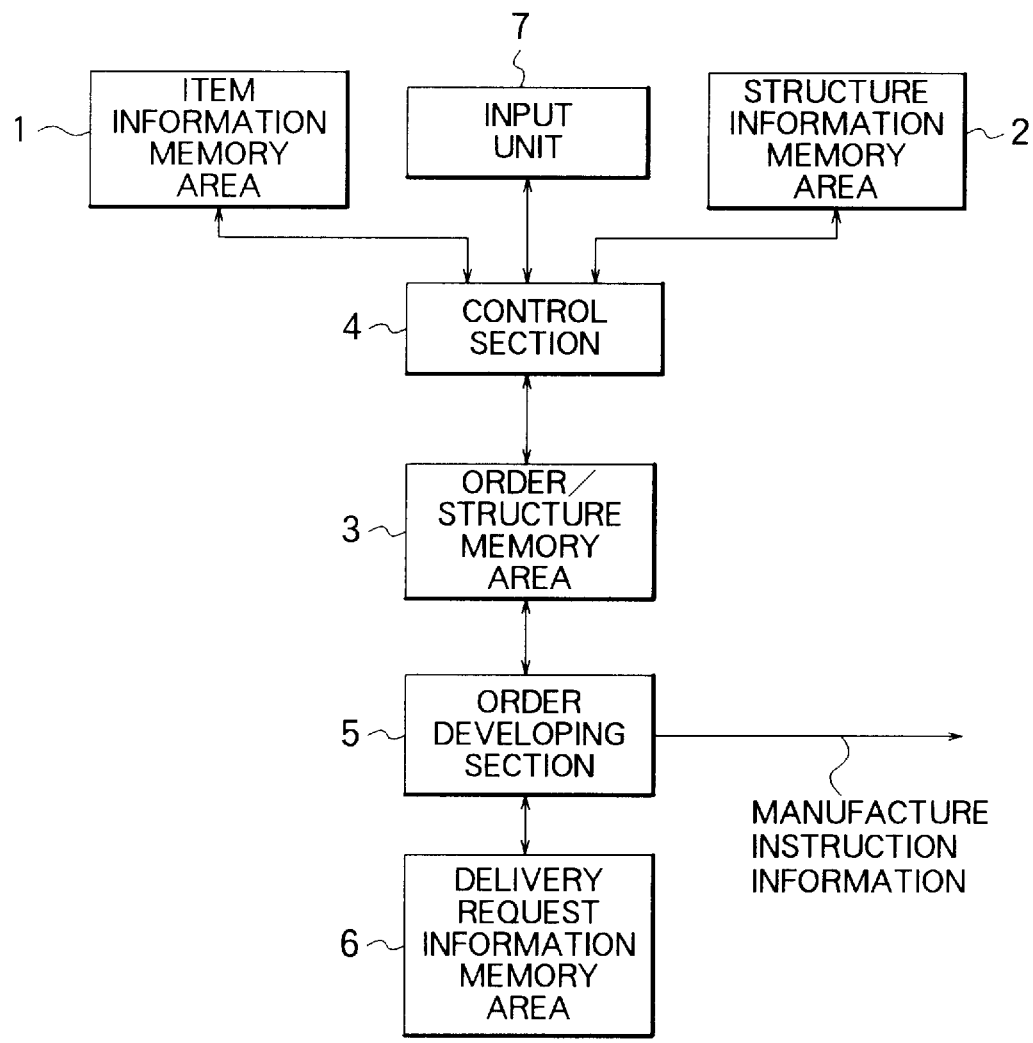
FIG. 1 is a block diagram showing the configuration of an image processing apparatus employing a two-dimensional cache-memory system according to one embodiment of the present invention.

FIG. 1 illustrates one embodiment of an image processing apparatus according to the present invention. In the figure, numeral 30 is a processor; 31 is a main memory; 32 is a two-dimensional cache-memory system for caching data blocks cut out from image data and having a two-dimensional spread; 33 is a memory controller for controlling the transfer of data blocks from the main memory 31; 34 is a buffer for switching between addresses (one from the processor 30 and the other from the two-dimensional cache-memory system 32) for supply to the main memory 31 in response to a control signal (SW1) from the two-dimensional cache-memory system 32; and 35 is a buffer for switching data (one from the main memory 31 and the other from the two-dimensional cache-memory system 32) for supply to the processor 30 in response to a control signal (SW0) from the two-dimensional cache-memory system 32.

As shown in the figure, a first feature of the image processing apparatus according to the invention is that the two-dimensional cache-memory system 32 for caching data blocks cut out from image data and having a two-dimensional spread is interposed between the processor 30 and the main memory 31.

Figure 2:
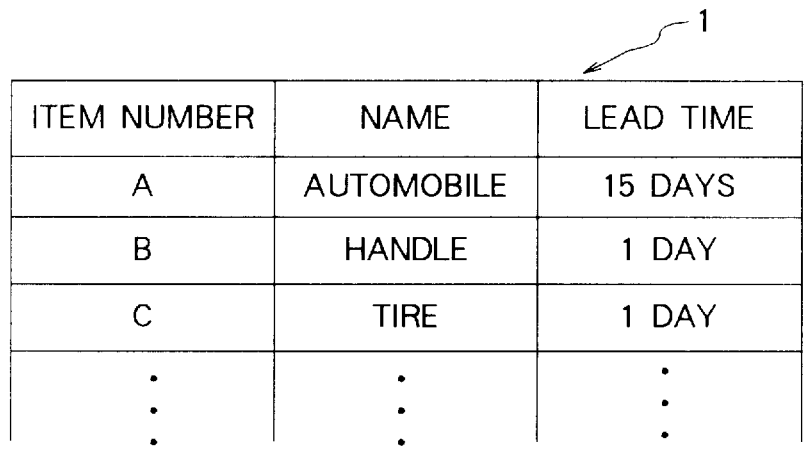
FIG. 2 is a diagram for explaining how image data is stored.
Figure 3:
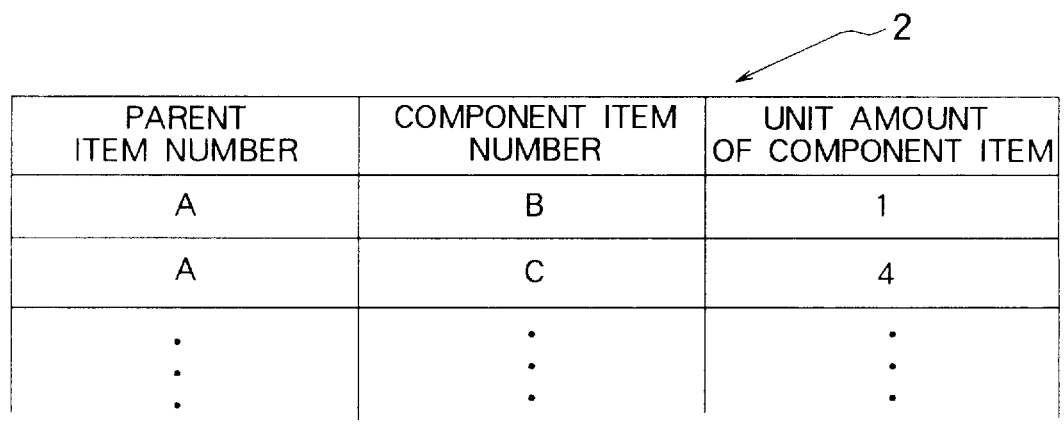
FIG. 3 is a diagram for explaining cache memory mapping.

For image data consisting of 2048×1024 pixels, for example, if each data block is to be made up of 8×8 pixels, the image data stored in the main memory 31 is divided into 255×128 data blocks starting at block address (0, 0) and ending at (255, 127), as shown in FIG. 2. Since the main memory 31 is addressed with X address as the low-order address and Y address as the high-order address, such as shown in FIG. 2, each data block, for example, the data block (0, 0), is mapped to the location shown by hatching in FIG. 2. The two-dimensional cache-memory system 32 has four memory areas (#0–#3), for example, as shown in FIG. 3, and caches one data block into each of these memory areas (lines).

For convenience of explanation, the following description assumes that image data has a size of 2048×1024 pixels and each data block consists of 8×8 pixels. Accordingly, the X address of the image data is 11 bits long and the Y address is 10 bits long, and each data block is identified by a block address (X', Y'), i.e., the combination of an 8-bit X' and a 7-bit Y'.

Figure 4:
FIG. 4 is a diagram showing the configuration of the two-dimensional cache-memory system.

FIG. 4 shows a detailed configuration of the two-dimensional cache-memory system 32. In the figure, numeral 40 indicates a cache memory, having, for example, four memory areas (lines), for temporarily storing copies of image data blocks; 41 denotes an X/Y address register for latching the X and Y addresses of image data issued from the processor 30; 42 designates a cache comparator for detecting whether or not a copy of the data block containing the image data requested by the processor 30 is validly stored in the cache memory 40; and 43 represents a control block for performing caching control operations. An 11-bit X address register constituting the X/Y address registers 41 may sometimes be designated by reference sign 41a and a 10-bit Y address register constituting the X/Y address registers 41 by reference sign 41b in the description given hereinafter.

Figure 5:
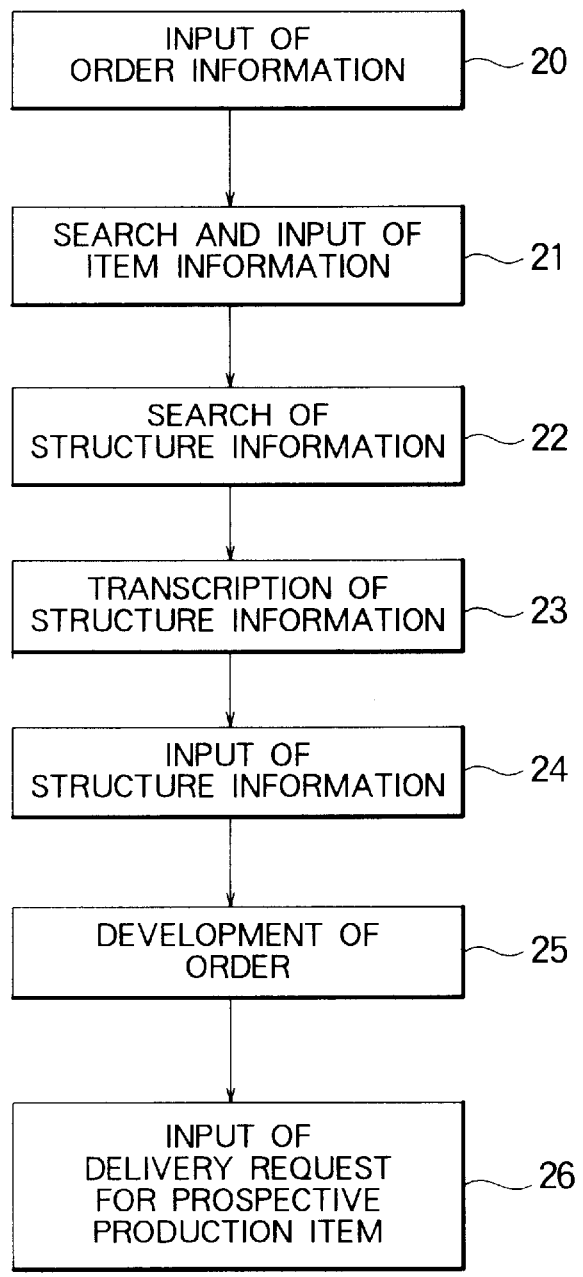
FIG. 5 is a diagram showing the configuration of a control block.
Figure 6:
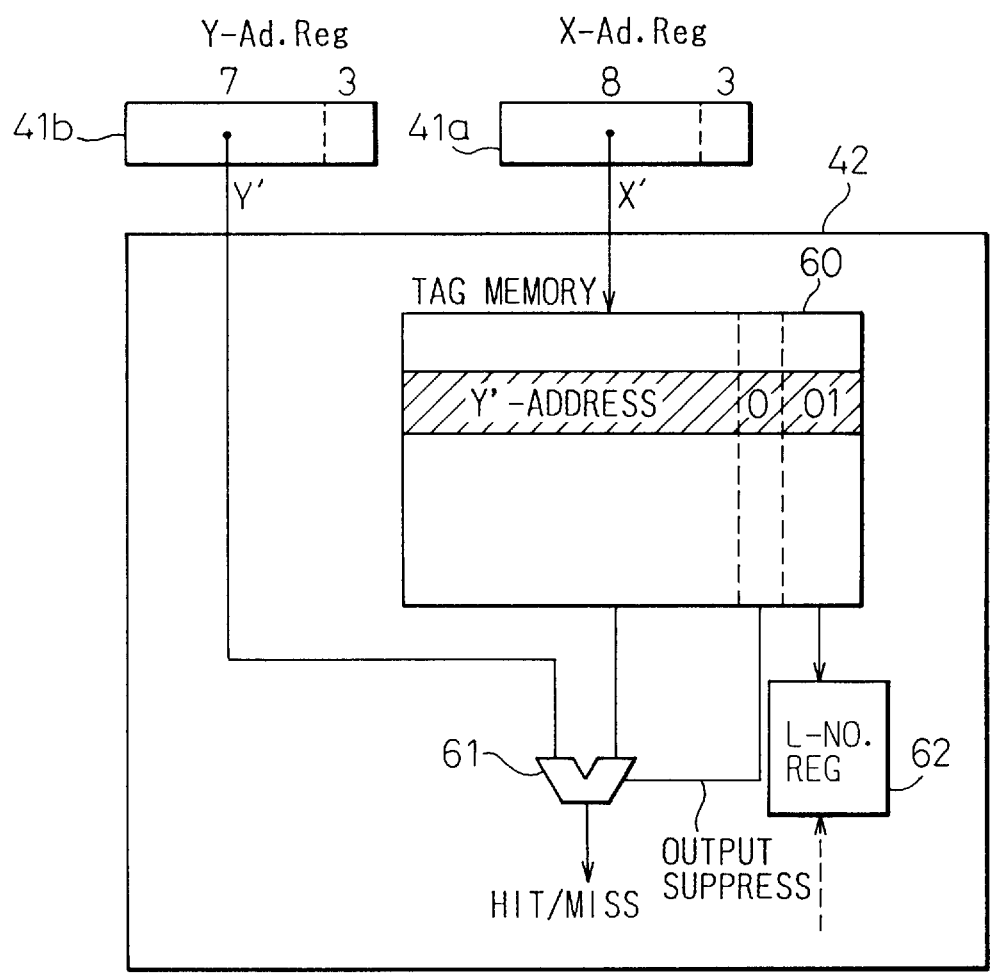
FIG. 6 is a diagram showing the configuration of a cache comparator.

FIG. 5 shows a detailed configuration of the control block 43, and FIG. 6 displays a detailed configuration of the cache comparator 42.

As shown in FIG. 5, the control block 43 comprises: reference flags 50, one provided for each of the four memory areas (lines) of the cache memory 40, for managing the history of the occurrence or non-occurrence of an access to the data blocks stored in the respective memory areas; current access flags 51, one provided for each of the four memory areas of the cache memory 40, for managing whether or not the data block stored in the corresponding memory area is the most recently accessed data; index registers 52, provided one for each of the four memory areas of the cache memory 40, for managing the indexes X' (serving as the tag address for addressing a TAG memory 60 hereinafter described) of the data blocks stored in the respective memory areas; a 4-bit reference refresh counter 53; a 6-bit scan counter 54; a 21-bit 2-D plane address register 55 for latching an address used to access the main memory 31; and a sequencer 56 for controlling the entire operation.

On the other hand, as shown in FIG. 6, the cache comparator 42 comprises the TAG memory 60 which is addressed by a tag address X' made up of the 8 high-order bits of the X address stored in the X address register 41a, which stores the tag Y' of a cached data block and which also stores a valid bit for indicating whether the cached data block is valid or not, and a line number of the memory area where the cached data block is stored. The cache comparator 42 further comprises: a match detection circuit 61 which determines whether the tag Y' read out of the TAG memory 60 by being addressed by an X' value matches the Y' value stored in the Y address register 41b, and which outputs a hit signal when they match and the valid bit indicates the validity of the data in cache, and otherwise outputs a miss hit signal; and a line number register 62 for latching the line number of the destination memory area read out of the TAG memory 60 (in some cases, the line number may be set externally).

In a specific example, when a valid data block having a block address (X', Y')=(102, 38) is stored in the memory area of line number "#3" in the cache memory 40, the TAG memory 60 stores a tag "Y'=38" in the TAG field addressed by a tag address "X'=102", a value "valid bit=0" in the valid bit field, and a value "line number=3" in the line number field. Each access position within data block stored in the cache memory 40 is designated by an intra-block address made up of the 3 low-order bits of the X address and the 3 low-order bits of the Y address.

While the cache system of the present invention includes a tag memory having a configuration similar to the conventional congruent type, the tag memory according to the invention has a line number field for indirectly specifying each memory area of the cache; hence a second feature is that the relationship between the stored tag and the memory area is determined dynamically.

Since the image data is two-dimensional data, there exist data blocks that are identical in tag address X' but different in tag Y'. In the present embodiment, however, simultaneous caching of such data blocks is not allowed. As will be described later, by employing a multi-way configuration, as in set associative organizations used in general-purpose computers, such caching may be allowed.

Next, the processing operations performed by the two-dimensional cache-memory system 32 will be described with reference to the flowcharts shown in FIGS. 7 to 16. For those skilled in the art, it will be possible to describe the behavior in a hardware description language (HDL) such as a Verilog-HDL at a register transfer level (RTL) in accordance with the flowcharts and to automatically obtain design data of a gate level circuit by inputting the description written in RTL to a logic synthesis tool. Therefore, the operational description given hereinafter with reference to the flowcharts will be substituted for a detailed description of the circuit configuration.

Figure 7:
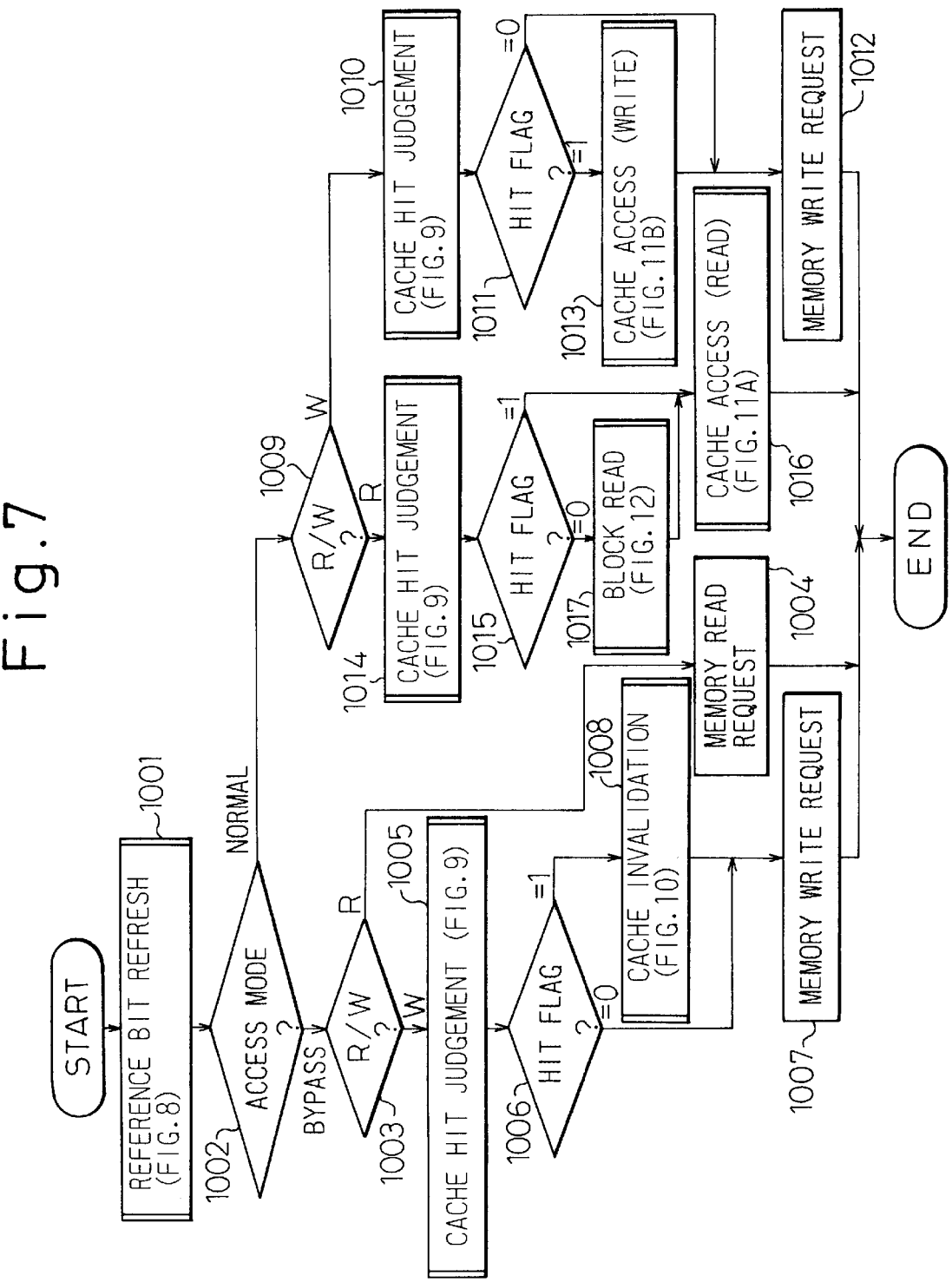
FIG. 7 is a diagram showing a main process flow.

When the processor 30 makes an access request, the two-dimensional cache-memory system 32 first performs a reference bit refresh operation as shown in step 1001 in the main process flow of FIG. 7.

Figure 8:
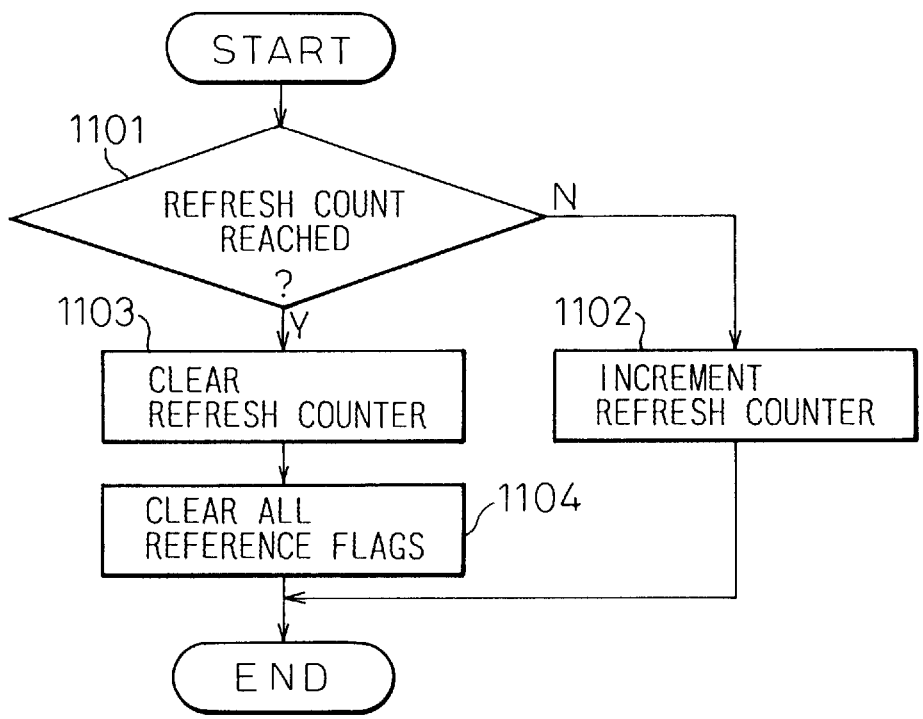
FIG. 8 is a diagram showing a process flow for a reference bit refresh operation.

In the reference bit refresh operation, as shown in detail in the process flow of FIG. 8, first a decision is made as to whether the count value of the 4-bit refresh counter 53 has reached the maximum value (step 1101). If it is decided that the count value has not reached the maximum value, the count value of the reference refresh counter 53 is incremented by 1 (step 1102), to terminate the refresh operation. On the other hand, if it is decided that the count value has reached the maximum value, then the count value of the reference refresh counter 53 is cleared (step 1103), and also, the flag values of all the reference flags 50 are cleared (step 1104), after which the refresh operation is terminated.

That is, in the above reference bit operation, the flag values of the reference flags 50 are reset each time when a predetermined number of access requests have been issued.

Next, as shown in step 1002 in the main process flow of FIG. 7, the access mode of the access request issued by the processor 30 is judged. There are two access modes in which the processor 30 issues an access request: a bypass mode in which the cache memory 40 is bypassed and an access is made directly to the main memory 31, and a normal mode in which an access is made to the cache memory 40. In step 1002, therefore, it is judged whether the access mode of the access request issued by the processor 30 is the bypass mode or the normal mode.

If it is judged as being the bypass mode, then as shown in step 1003 in the main process flow of FIG. 7, it is judged whether the access request issued by the processor 30 is a read request or a write request.

If it is judged as being a read request, then as shown in step 1004 in the main process flow of FIG. 7, a memory read request is issued to the main memory 31, since data matching between main memory and cache memory can be maintained if data is read from the main memory 31 in accordance with the bypass mode. After that, the process is terminated.

On the other hand, when the access request is judged as being a write request, data matching will not be maintained if data is written to the main memory 31 in accordance with the bypass mode; therefore, as shown in step 1005 in the main process flow of FIG. 7, a cache-hit judgement operation is performed to determine whether or not a copy of the data block containing the requested data is stored in the cache memory 40.

Figure 9:
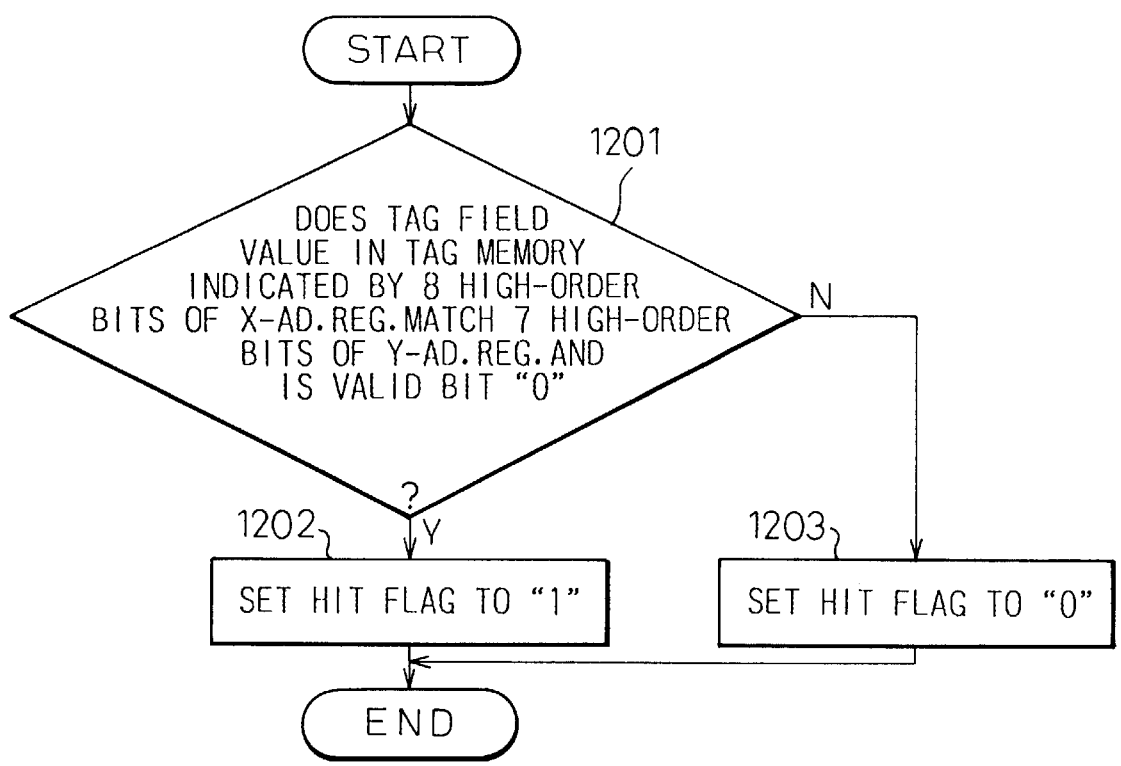
FIG. 9 is a diagram showing a process flow for a cache hit judgement operation.

As shown in detail in the process flow of FIG. 9, the cache-hit judgement operation is initiated by activating the cache comparator 42. More specifically, by addressing the TAG memory 60 using the 8 high-order bits X' of the X address stored in the X address register 41a, the 7 high-order bits Y' of the Y address and the valid bit are read out of the TAG memory 60, and detection is made to determine whether the readout Y' value matches the value Y' of the 7 high-order bits of the Y address stored in the Y address register 41b and also whether the valid bit is "0" indicating that the data is valid (step 1201). As a result of the detection, if it is judged that a hit occurs to the cache memory 40, a hit flag not shown is set to "1" (step 1202), and the process is terminated; if it is judged that a cache miss occurs, the hit flag is set to "0" (step 1203), and the process is terminated.

That is, in the cache hit judgement process, the cache comparator 42 is activated which then checks whether a copy of the data block indicated by the write request address issued by the processor 30 is stored as valid data in the cache memory 40; if it is stored as valid data, the hit flag is set to "1", and otherwise, the hit flag is set to "0".

Next, as shown in step 1006 in the main process flow of FIG. 7, the hit flag is tested to determine whether the flag value is "1" or "0".

If it is determined in this step that the hit flag value is "0", the data to be written is not present in the cache memory 40, and no effect will be caused if the data is written from the main memory 31 in accordance with the bypass mode. Therefore, as shown in step 1007 in the main process flow of FIG. 7, a memory write request is immediately issued to the main memory 31, after which the process is terminated.

On the other hand, if it is determined that the hit flag value is "1", then as shown in step 1008 in the main process flow of FIG. 7, a cache invalidation operation is performed to maintain data matching, and then, a memory write request is issued to the main memory 31, after which the process is terminated.

Figure 10:
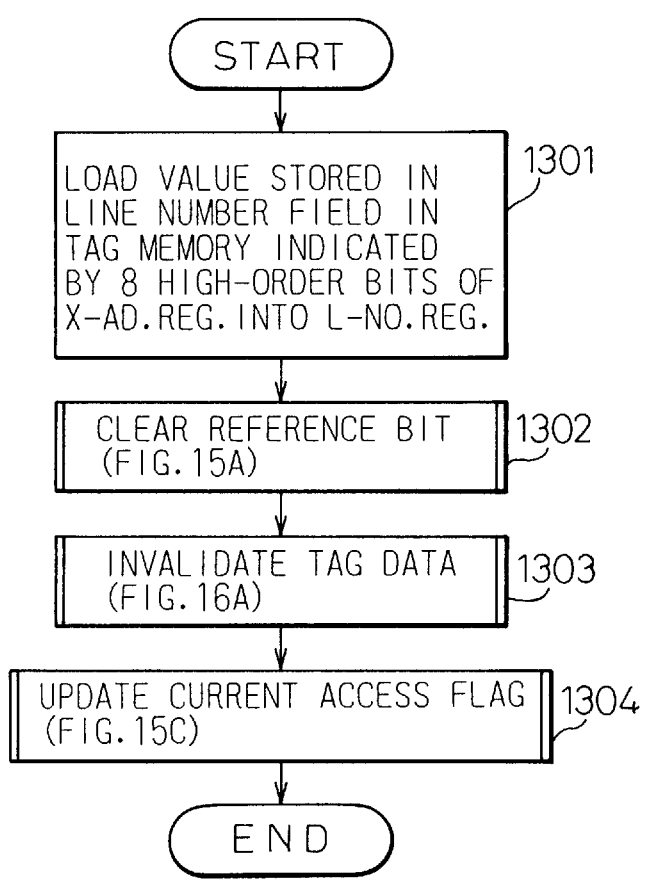
FIG. 10 is a diagram showing a process flow for a cache invalidation operation.

In the cache invalidation process, as shown in detail in the process flow of FIG. 10, first an access is made to the line number field in the TAG memory 60 indicated by the X' stored in the X address register 41a, and the line number stored in that field is read out and loaded into the line number register 62 (step 1301). Next, as shown in the process flow of FIG. 15A, the flag bit of the reference flag 50 corresponding to the line number held in the line number register 62 is set to "0" indicating no access occurrence (step 1302). Then, as shown in the process flow of FIG. 16A, the valid bit for the entry in the TAG memory 60 indicated by the X' value of the index register 52 corresponding to the line number held in the line number register 62 is set to "1" indicating that the data is invalid (step 1303). Next, as shown in the process flow of FIG. 15C, the flag values of all the current access flags 51 are set to "0" first, and then, the flag value of the current access flag 51 corresponding to the line number held in the line number register 62 is set to "1" indicating the existence of the most recently accessed data, after which the process is terminated (step 1304).

That is, in the cache invalidation process, registration information is invalidated for the data block containing the data to be written to the main memory 31 in accordance with the bypass mode, and the flag value of the current access flag 51 is updated.

On the other hand, in step 1002 in the main process flow of FIG. 7, if the access request issued by the processor 30 is judged as being the normal mode, then as shown in step 1009 in the main process flow of FIG. 7, it is judged whether the access request issued by the processor 30 is a read request or a write request.

If the access request is judged as being a write request, then as shown in step 1010 in the main process flow of FIG. 7, a cache-hit judgement operation is performed to determine whether or not a copy of the data block containing the data requested to write is present in the cache memory 40.

The cache-hit judgement process performed in this step is the same as that performed in step 1005 in the main process flow of FIG. 7. That is, the cache comparator 42 is activated which then checks whether a copy of the data block indicated by the write request address issued by the processor 30 is stored as valid data in the cache memory 40; if it is stored as valid data, the hit flag is set to "1", and otherwise, the hit flag is set to "0".

Next, as shown in step 1011 in the main process flow of FIG. 7, the hit flag is tested to determine whether the flag value is "1" or "0".

If it is determined in this step that the hit flag value is "0", the data to be written is not present in the cache memory 40. Therefore, as shown in step 1012 in the main process flow of FIG. 7, a memory write request is immediately issued to the main memory 31, after which the process is terminated.

On the other hand, if it is determined that the hit flag value is "1", the data to be written is present in the cache memory 40; therefore, as shown in step 1013 in the main process flow of FIG. 7, a cache access operation for data write is performed to rewrite the write data stored in the cache memory 40, and after that, to maintain data matching, a memory write request is issued to the main memory 31 before terminating the process.

In the cache access operation for data write, as shown in detail in the process flow of FIG. 11B, first an access is made to the line number field in the TAG memory 60 indicated by the X' stored in the X address register 41a, and the line number stored in that field is read out and loaded into the line number register 62 (step 1501). Next, the intra-block address, specified by the 3 low-order bits of the X address stored in the X address register 41a and the 3 low-order bits of the Y address stored in the Y address register 41b, is identified, and in accordance with the intra-block address, the write position is designated in the data block stored in the memory area indicated by the value stored in the line number register 62, so that the write data transferred from the processor 30 and held in a read register not shown (D register) is stored into the designated position (step 1502). Next, as shown in the process flow of FIG. 15C, the flag values of all the current access flags 51 are set to "0" first, and then, the flag value of the current access flag 51 corresponding to the line number held in the line number register 62 is set to "1" indicating the existence of the most recently accessed data (step 1503). Then, as shown in the process flow of FIG. 15B, the flag value of the reference flag 50 corresponding to the line number held in the line number register 62 is set to "1" (if it is already set, the value is left as is) (step 1504), after which the process is terminated.

That is, in the cache access operation for data write, the data stored in the cache memory 40 is replaced by the data requested by the processor 30, while the flag values of the current access flags 51 and reference flags 50 are updated.

On the other hand, if it is determined in step 1009 in the main process flow of FIG. 7 that the access request issued by the processor 30 is a read request, then as shown in step 1014 in the main process flow of FIG. 7, a cache-hit judgement operation is performed to determine whether a copy of the data block containing the read request data is stored in the cache memory 40.

The cache-hit judgement process performed in this step is the same as that performed in step 1005 in the main process flow of FIG. 7. That is, the cache comparator 42 is activated which then checks whether a copy of the data block indicated by the read request address issued by the processor 30 is stored as valid data in the cache memory 40; if it is stored as valid data, the hit flag is set to "1", and otherwise, the hit flag is set to "0".

Next, as shown in step 1015 in the main process flow of FIG. 7, the hit flag is tested to determine whether the flag value is "1" or "0".

If it is determined that the hit flag value is "1", the data to be read is present in the cache memory 40; therefore, as shown in step 1016 in the main process flow of FIG. 7, a cache access operation for data read is performed to read the read data stored in the cache memory 40, and the data is transferred to the processor 30, after which the process is terminated.

In the cache access operation for data read, as shown in detail in the process flow of FIG. 11A, the line number stored in the line number field in the TAG memory 60 indicated by the X' stored in the X address register 41*a* is read out and loaded into the line number register 62 (step 1401). Next, the intra-block address, specified by the 3 low-order bits of the X address stored in the X address register 41*a* and the 3 low-order bits of the Y address stored in the Y address register 41*b*, is identified, and in accordance with this intra-block address, the requested data is read out of the data block stored in the memory area indicated by the value stored in the line number register 62, and is loaded into a read register not shown (D register) (step 1402). Next, as shown in the process flow of FIG. 15C, the flag values of all the current access flags 51 are set to "0" first, and then, the flag value of the current access flag 51 corresponding to the line number held in the line number register 62 is set to "1" indicating the existence of the most recently accessed data (step 1403). Then, as shown in the process flow of FIG. 15B, the flag value of the reference flag 50 corresponding to the line number held in the line number register 62 is set to "1" (if it is already set, the value is left as is), after which the process is terminated (step 1404).

That is, in the cache access operation for data read, the read data stored in the cache memory 40 is read out and transferred to the processor 30, while the flag values of the current access flags 51 and reference flags 50 are updated.

On the other hand, if it is determined in step 1015 in the main process flow of FIG. 7 that the hit flag value is "0", the data to be read is not available in the cache memory 40; therefore, to store into the cache memory 40 the data block containing the data to be read, a block read operation is performed as shown in step ST17 in the main process flow of FIG. 7, and after that a cache access operation of step 1016 is performed.

The block read operation will be described in detail below with reference to FIGS. 12 to 14. It will be noted here that the right-hand half and left-hand half of the process flow shown in FIG. 12 are carried out in parallel.

As shown in the process flow of FIG. 12, in the block read operation, first a decision is made in step 1601 as to what data block is to be swapped out.

In this decision process, as shown in the process flow of FIG. 13, first a decision is made as to whether there is any reference flag 50 whose flag value is "0" (step 1701). If there is any such reference flag 50, the line number corresponding to that reference flag 50 is loaded into the line number register 62 (step 1702); if there is no such reference flag 50, the line number corresponding to the current access flag 51 whose flag value is "1" is loaded into the line number register 62 (step 1703).

As will be described later, the data block stored in the memory area indicated by the value stored in the line number register 62 is the data block to be swapped out; in this decision process, therefore, if there is any memory area that has not been accessed from the time the reference flags 50 were last cleared, until the occurrence of the current access, the data block stored in that memory area is decided as the swap-out data block. If there is no such memory area, the most recently accessed data block is decided as the swap-out block.

Next, in step 1602, registration data in the TAG memory is invalidated for the data block that has been decided as the swap-out block.

In the invalidation process, as shown in the process flow of FIG. 16A, the valid bit for the entry in the TAG memory 60, indicated by the X' value in the index register 52 corresponding to the line number held in the line number register 62, is set to "1" indicating that the data is invalid. That is, the valid bit in the TAG memory 60 for the data block decided as the swap-out block is invalidated.

Next, in step 1603, the line number at which the data block containing the read data is to be stored is registered in the TAG memory 60.

In this registration process, as shown in the process flow of FIG. 16C, the line number held in the line number register 62 is stored into the line number field in the TAG memory 60 indicated by the X' held in the X address register 41*a*. That is, the line number of the destination area is entered into the line number field in the TAG memory 60 for the data block that is to be stored.

Next, in step 1604, the tag value Y' of the data block containing the read data is registered in the TAG memory 60.

In this registration process, as shown in the process flow of FIG. 16D, the tag Y' held in the Y address register 41*b* is stored into the TAG field in the TAG memory 60 indicated by the tag address X' held in the X address register 41*a*. That is, the Y' value of the data block to be stored is entered into the TAG field in the TAG memory for that data block.

Next, in step 1605, the register value of the index register 52 is updated.

Figure 15A:
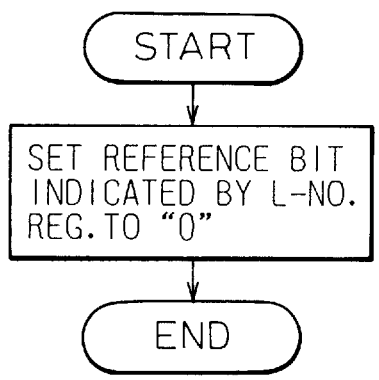
FIGS. 15A to 15D are diagrams each showing a process flow for control flag updating.
Figure 15B:
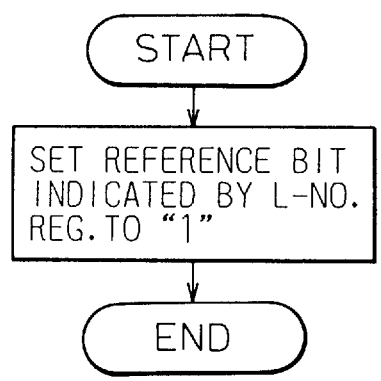
Figure 15C:
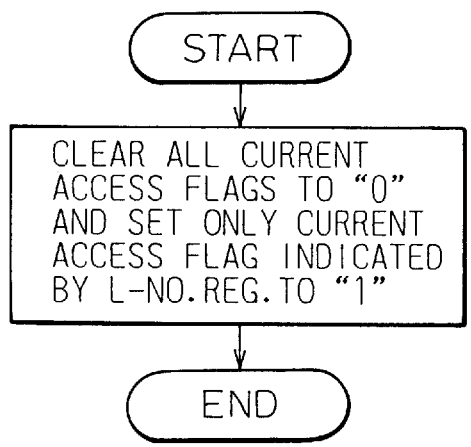
Figure 15D:
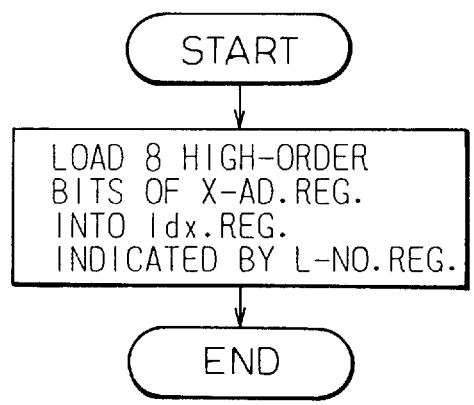

In this updating process, as shown in the process flow of FIG. 15D, the X' value held in the X address register 41a is stored into the index register 52 corresponding to the line number held in the line number register 52. That is, the index register 52 is updated so that it points to the newly validated entry in the TAG memory 60.

Next, in step 1606, the flag value of the current access flag 51 is updated.

In this updating process, as shown in the process flow of FIG. 15C, the flag values of all the current access flags 51 are set to "0" first; then, the current access flag 51 corresponding to the line number held in the line number register 62 is identified, and its flag value is set to "1" indicating the existence of the most recently accessed data.

Simultaneously with the processing from step 1601 to step 1606, a burst read operation in step 1607 is performed to store a copy of the data block containing the read data into the cache memory 40.

Figure 17:
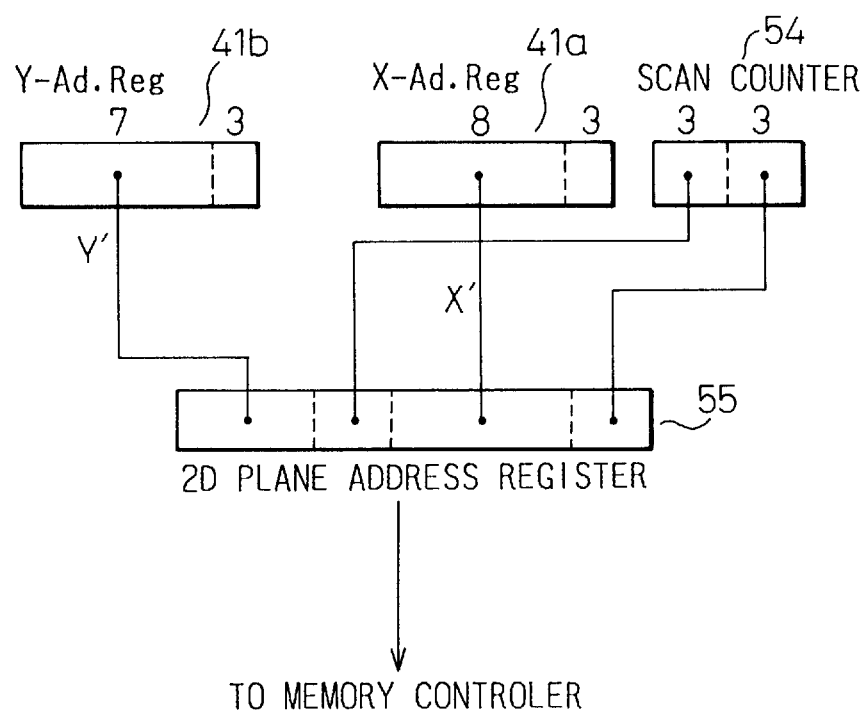
FIG. 17 is a diagram for explaining the generation of an address in a burst access mode.

In the burst read operation, as shown in detail in the process flow of FIG. 14, first the count value of the 6-bit scan counter 54 is cleared (step 1801). Then, the count value of the scan counter 54, the X' value stored in the X address register 41a, and the Y' value stored in the Y address register 41b are loaded into the 2-D plane address register 55 in accordance with the format shown in FIG. 17 (step 1802). By designating the address stored in the 2-D plane address register 55, a burst read request for 8-word data is issued to the memory controller 33 (step 1803). Next, the 8-word data transferred in response to the burst read request is received (step 1805), which is then written to the memory area in the cache memory 60 indicated by the value stored in the line number register 62 (step 1806). Then, the count value of the scan counter 54 is incremented by 8 to update the stored value in the 2-D plane address register 55 (step 1807). If a carry-over occurs in the scan counter 54, the process is terminated; if no carry-over occurs, the address stored in the 2-D plane address register 55 is designated again, and a burst read request for 8-word data is issued to the memory controller 33, thus repeating the process.

That is, in the burst read operation, starting at the block address (X', Y') indicated by the data block containing the data requested by the processor, the X, Y addresses indicating data in that data block are sequentially issued to store a copy of that data block into the cache memory 40.

Thus, in the process flow of FIG. 12, when the processing in steps 1601 to 1606 and the processing for the burst read operation in step 1607 are completed, in the final step 1608 the registration data in the TAG memory for the newly stored data block is then made valid.

In this validation step, as shown in the process flow of FIG. 16B, the valid bit for the entry in the TAG memory 60, indicated by the X' value in the index register 52 corresponding to the line number held in the line number register 62, is set to "1" indicating that the data is valid.

In the cache-memory system of the present invention described above, the configuration of the tag memory and the cache hit/miss judgement processing implemented by it are similar to those employed in the conventional congruent type. However, according to the invention, since the association between each stored tag and its corresponding cache memory area is not fixed but is determined dynamically, the number of tags and the number of cache memory lines can be designed independently of each other; furthermore, even in situations where processing concentrates on a particular data block during operation, the memory areas can be used efficiently.

The example illustrated above employs an arrangement in which a tag made up of the high-order bits Y' of the Y address is stored in the tag memory addressed by the high-order bits X' of the X address, but it will be appreciated that the opposite is also possible. Furthermore, the bits constituting X' and Y' may be allocated arbitrarily between the tag bits and the tag address bits.

The above example has dealt with the processing of data that is addressed by a two-dimensional address X, Y, but it will be recognized that the processing of data addressed by a three-dimensional address X, Y, Z can be accomplished by appropriately allocating the respective high-order bits X', Y', and Z' between the tag bits and the tag address bits. In a like manner, the processing can be easily extended to handle data having any higher-dimensional address.

Next, another example of the image processing apparatus employing the cache-memory system of the invention will be described below.

The cache-memory system of the invention has two cache memory banks, one being allocated as a current bank for caching a data block containing the data currently being accessed, and the other as a prediction bank for pre-caching data that is likely to be accessed next, based on the address of the data currently being accessed (the current data address). In this arrangement, when the current data address is not found in the current bank, if it is found in the prediction bank, then the allocation of the current and prediction banks is reversed, thereby allowing the processing to continue without interrupting the current operation in order to access the main memory. Accordingly, as long as the prediction is correct, the allocation is switched alternately between the two cache memory banks. While this is being done, if it is found that the data block that should have been cached in the prediction bank is not cached in the prediction bank, a block read operation to the prediction bank is performed while access is being made to the current bank.

It is desirable that a plurality of prediction modes for making a prediction based on the current data address be prepared and be made switchable under direction of the processor 30. It is further desirable that the two cache memory banks be made switchable so as to be controlled as a two-way set associative cache under direction of the processor 30.

Figure 18:
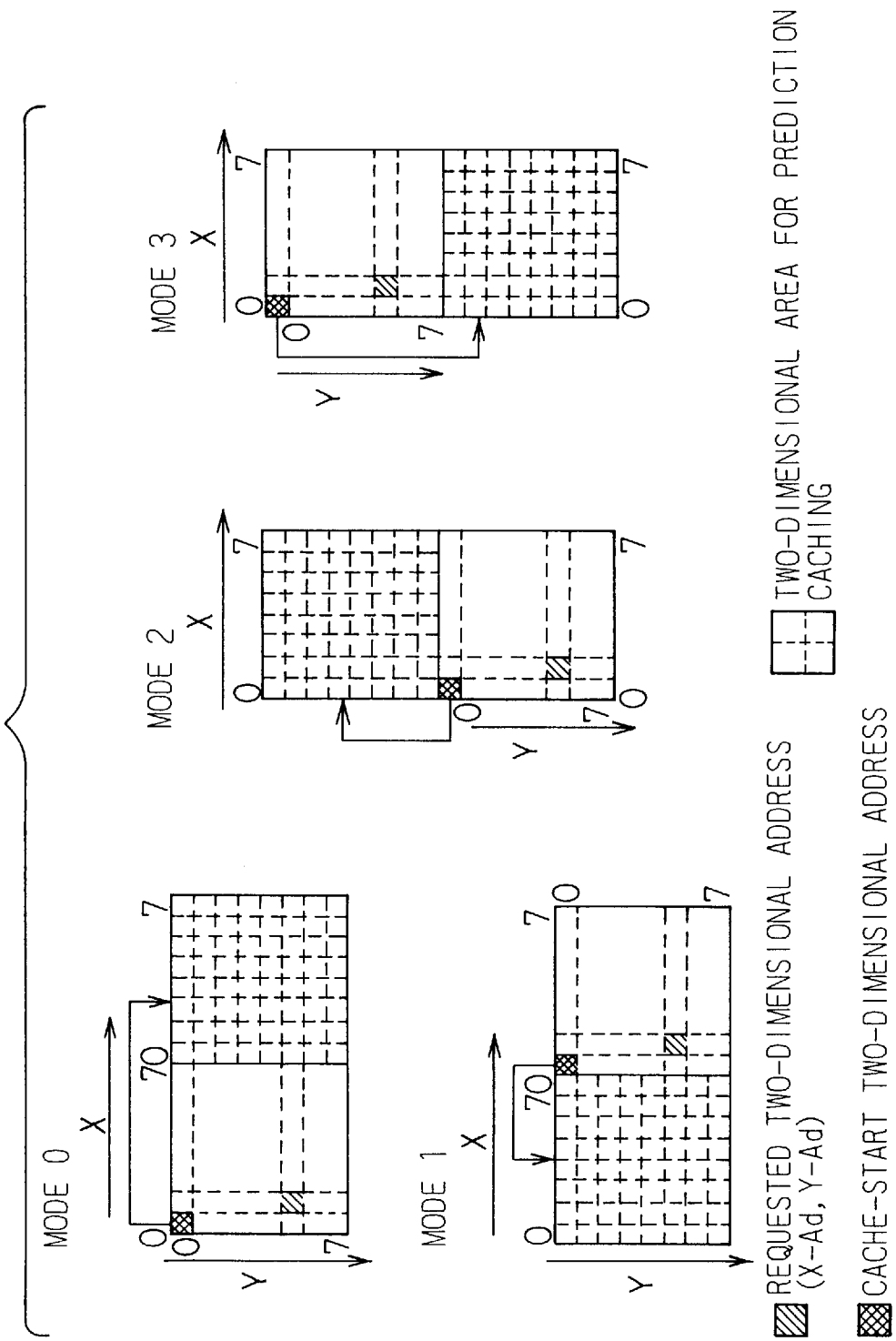
FIG. 18 is a diagram showing four examples of prediction modes in the two-dimensional cache-memory system of the present invention.

FIG. 18 shows four examples of prediction modes. In FIG. 18, each hatched area represents data specified by the current data address, and each double-hatched area indicates the start point (origin) of a data block containing that data. As shown in FIG. 18, in mode 0, the data block adjacent to the right of the data block containing the requested data is pre-cached in the prediction bank. In mode 1, the data block adjacent to the left of the data block containing the requested data is pre-cached in the prediction bank. In mode 2, the data block adjacent upward is pre-cached, while in mode 3, the data block adjacent downward is pre-cached.

Figure 19:
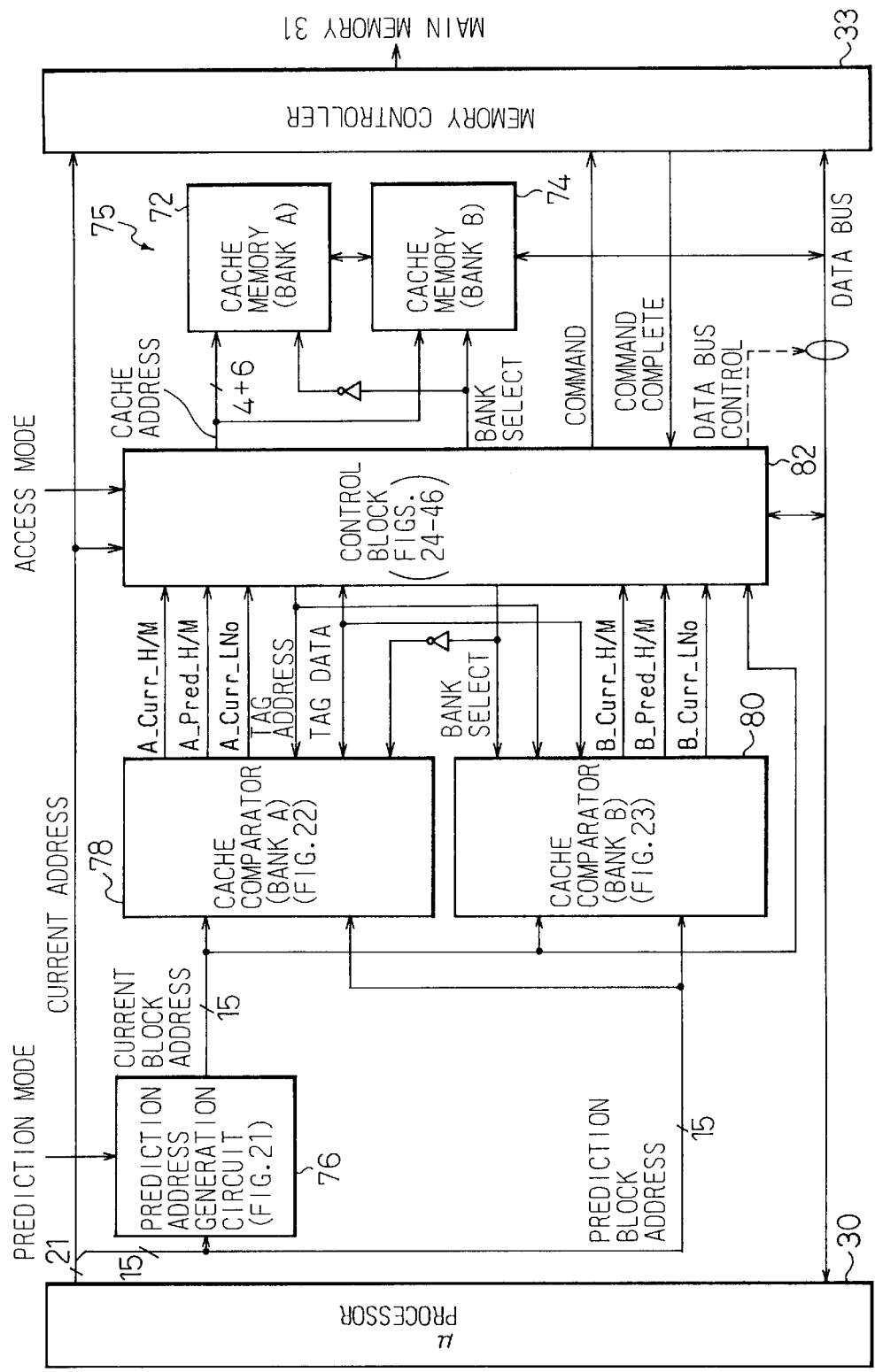
FIG. 19 is a block diagram of one example of the two-dimensional cache-memory system according to the present invention.

FIG. 19 is a block diagram showing in simplified form the configuration of a predictive two-dimensional cache-memory system 70 according to the invention, which is an improved version of the two-dimensional cache-memory system 32 shown in FIG. 1. As shown in FIG. 19, the predictive two-dimensional cache-memory system of the invention comprises a cache memory 75 having two banks, bank A and bank B indicated at 72 and 74, respectively; a prediction address generating circuit 76 for generating a prediction block address from a two-dimensional address (consisting, for example, of 11 bits in an X address and 10 bits in a Y address, a total of 21 bits) output from the processor 30, in accordance with a prediction mode; a cache comparator 78 for bank A for judging whether the current block address and the prediction block address are stored in the bank A, 72, of the cache memory 75; a cache comparator 80 for bank B for judging whether the current block address and the prediction block address are stored in the bank B, 74, of the cache memory 75; and a control block 82 for controlling the cache memory banks 72 and 74 in accordance with the result of the judgement made by the cache comparators 78 and 80, and for controlling the main memory 31 via the memory controller 33.

Figure 20:
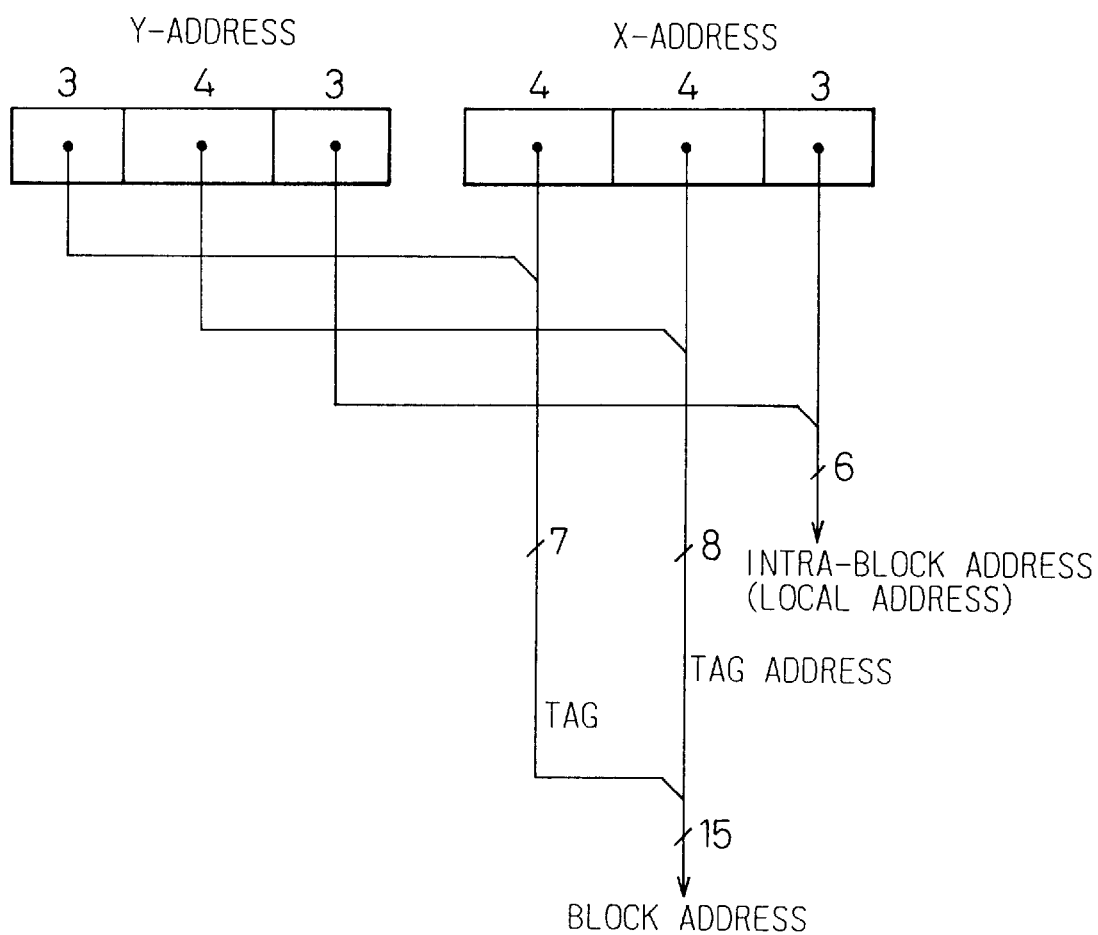
FIG. 20 is a diagram showing an example of a method of generating various addresses.

FIG. 20 shows an example of how various addresses are generated from an X address and a Y address output from the processor 30. A block address for specifying a data block, the unit of caching, is generated from the 8 high-order bits of the X address and the 7 high-order bits of the Y address, and an intra-block address (local address) for specifying a data item within the block is generated from the remaining 6 bits. This is the same as the system described with reference to FIGS. 1 to 17. However, the tag that forms part of the block address is generated from the 4 high-order bits of the X address and the 3 high-order bits of the Y address, and the tag address is generated from the remaining 4 bits each. This has the effect of spreading out the blocks in space that are to be stored at the same tag address in the tag memory within the cache comparator.

Figure 21:
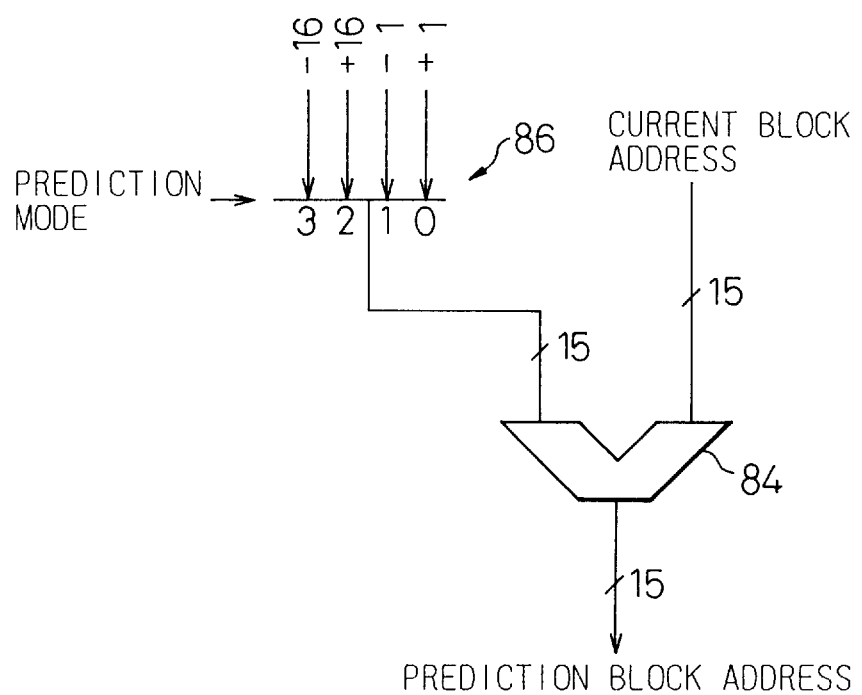
FIG. 21 is a circuit diagram showing the configuration of a prediction address generating circuit.

FIG. 21 is a circuit diagram showing the detailed configuration of the prediction address generating circuit 76. As shown in FIG. 21, the prediction address generating circuit 76 comprises an adder 84 and a selector 86. The current block address derived from the current address output from the processor 30 is applied to one input of the adder 84 whose other input is coupled to the output of the selector 86. The selector 86 selects a value "+1" when the prediction mode is mode 0, a value "−1" when in mode 1, a value "+16" when in mode 2, and a value "−16" when in mode 3. The adder 84 adds the value selected by the selector 86 to the current block address, to generate a prediction block address.

Figure 22:
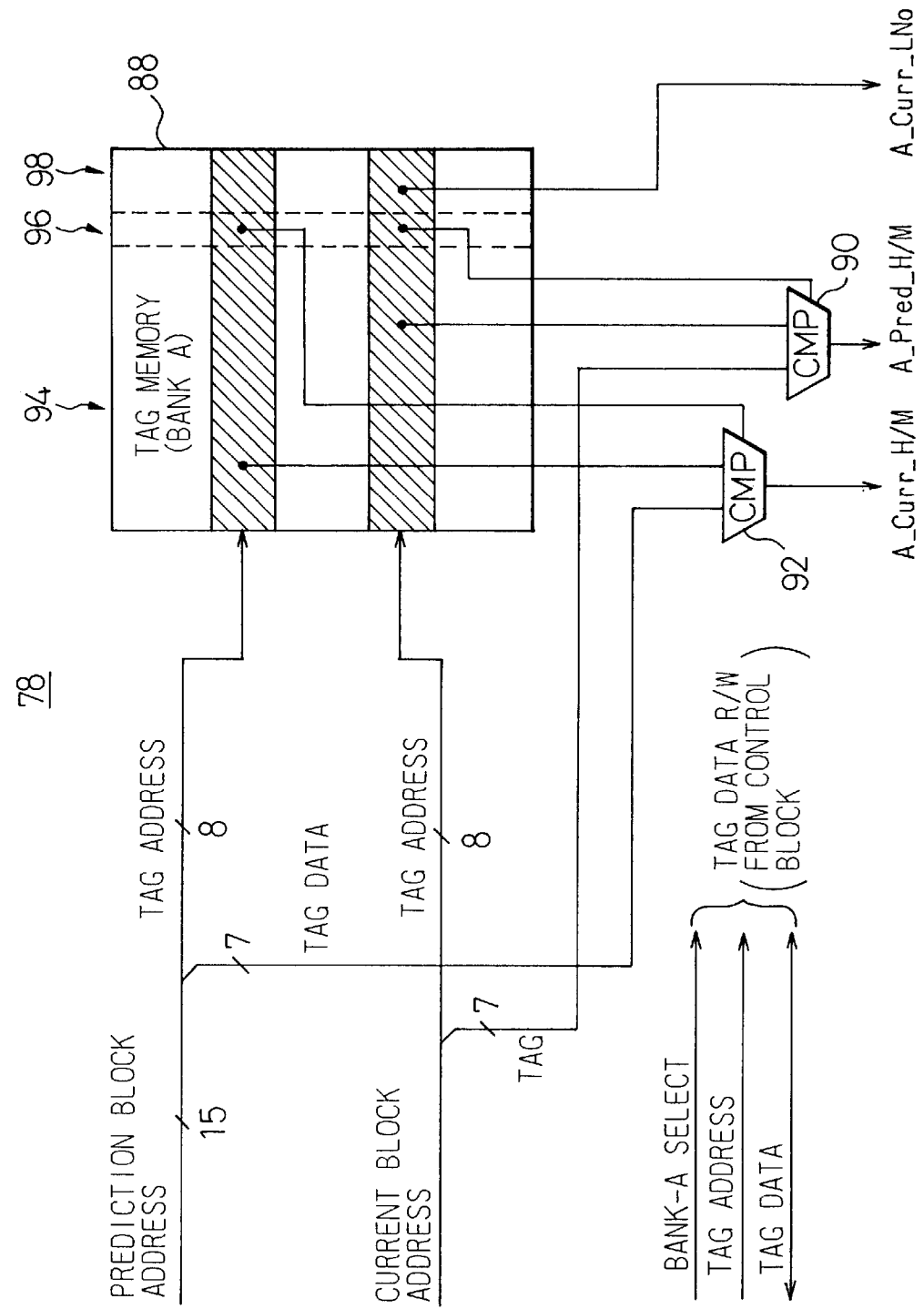
FIG. 22 is a block diagram showing the configuration of a cache comparator for bank A.

FIG. 22 shows the detailed configuration of the cache comparator 78 for bank A. The cache comparator 78 for bank A comprises a tag memory 88 for bank A, and two match detection circuits 90 and 92. Each record stored in the tag memory 88 is made up of a tag field 94 for storing a tag, a valid bit field 96 for storing a valid bit, and a line number field 98 for storing a line number, as in the case of the tag memory 60 shown in FIG. 6. In the tag memory 88 of this example, however, two addresses, i.e., the tag address derived from the current block address and the tag address derived from the prediction block address, are simultaneously applied, and two records thus addressed are simultaneously output. If the valid bit of the record addressed by the tag address derived from the current block address is "0" (valid), and if the tag in the tag field matches the tag derived from the current block address, the match detection circuit 90 sets a signal A_Curr_H/M (a signal indicating a hit or miss, that is, whether the current address is held in the bank A) to the H level indicating the occurrence of a cache hit. If the valid bit of the record addressed by the tag address derived from the prediction block address is "0" (valid), and if the tag in the tag field matches the tag derived from the prediction block address, the match detection circuit 92 sets a signal A_Pred_H/M (a signal indicating a hit or miss, that is, whether the prediction address is held in the bank A) to the H level indicating the occurrence of a cache hit. The signals A_Curr_H/M and A_Pred_H/M are supplied to the control block 82 along with a signal A_Curr_LNo indicating the value of the line number field in the record (tag data) read by the current block address. Tag data can also be read from or written to the tag memory 88 by making the bank select signal valid and issuing the tag address from the control block 82. As can be seen from FIG. 19, when one bank is enabled, the other bank is disabled. Though not explicitly shown in the figure, as the cache comparator 78 or 80 is selected, the associated cache memory bank 72 or 74 is automatically selected.

Figure 23:
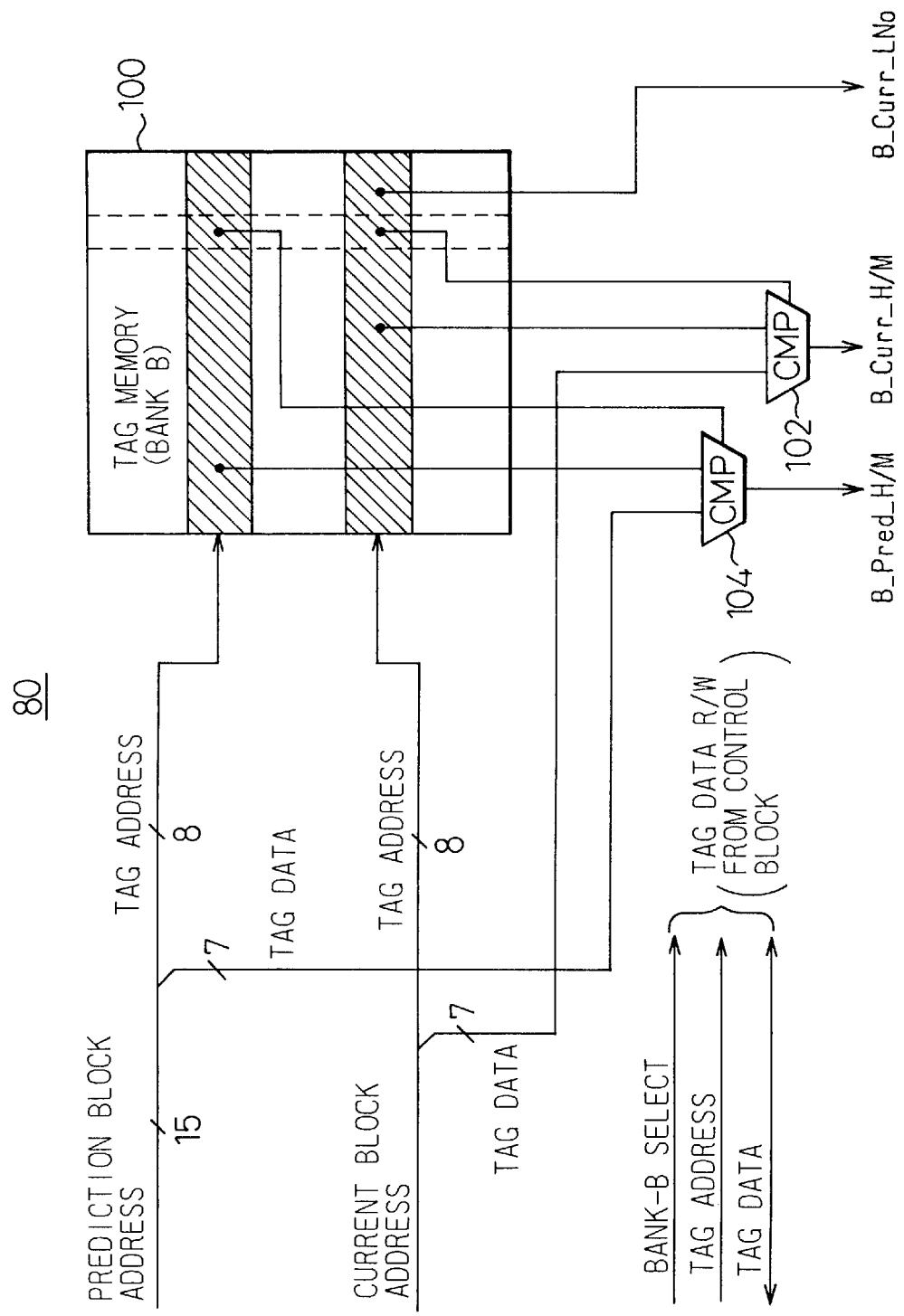
FIG. 23 is a block diagram showing the configuration of a cache comparator for bank B.

FIG. 23 shows the configuration of the cache comparator 80 for bank B. The cache comparator 80 for bank B is similar in configuration to the cache comparator 78 for bank A, and outputs B_Curr_H/M indicating whether the current block address is held in the bank B, B_Pred_H/M indicating whether the prediction block address is held in the bank B, and, when the current block address is held in the bank B, B_Curr_LNo indicating the line number of the memory area holding the current block address. These signals are supplied to the control block 82. When the bank B is selected, tag data can be read or written by issuing the tag address from the control block 82.

Figure 24:
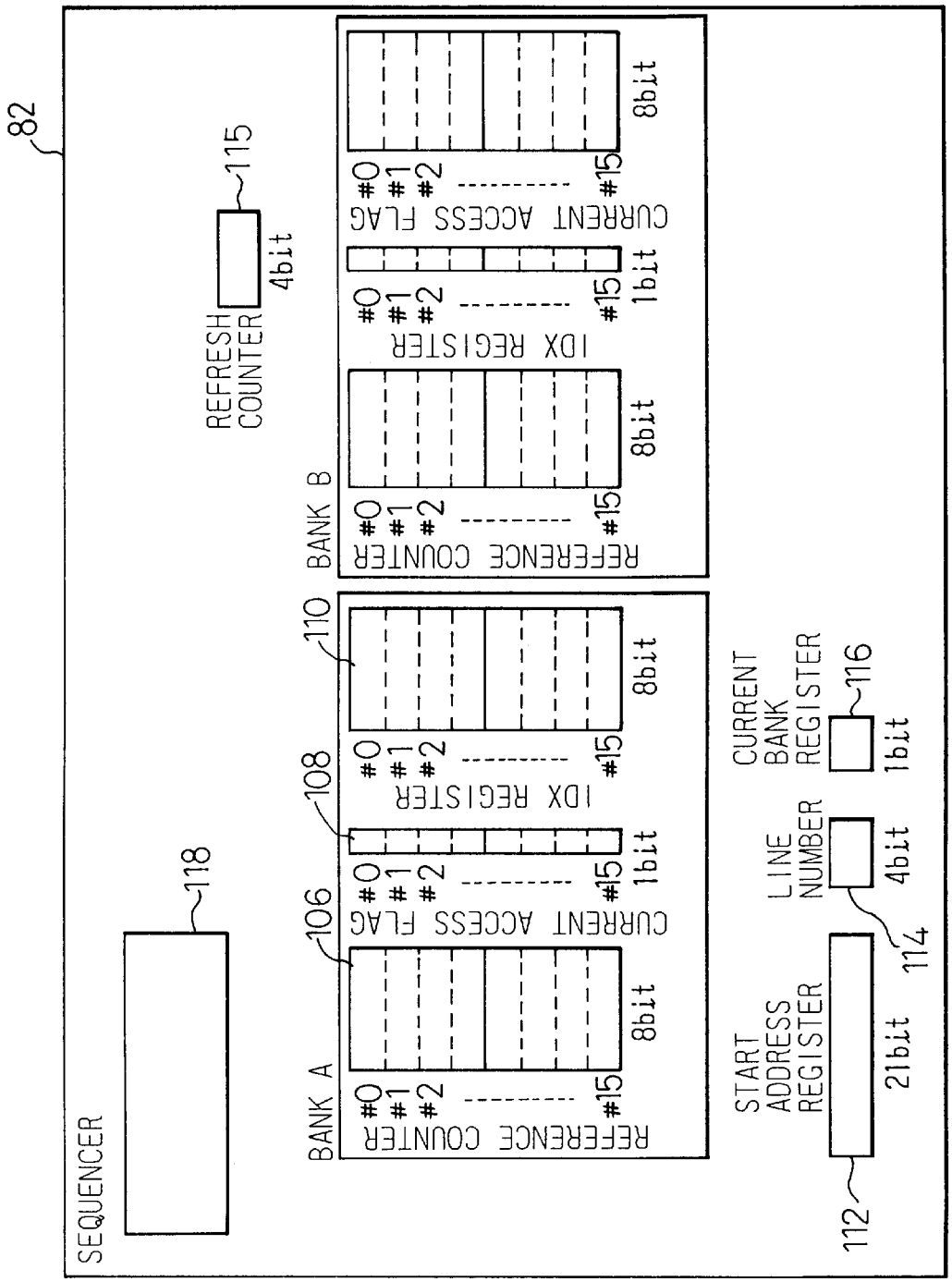
FIG. 24 is a block diagram showing a simplified form of the configuration of a control block.

FIG. 24 shows a simplified form of the configuration of the control block 82. As shown in FIG. 24, the control block 82 contains registers for bank A, which include: a reference counter 106 for indicating the number of accesses by being incremented each time its associated memory area in the bank A is accessed; a current access flag 108 for indicating the memory area currently being accessed; and an index register 110 for storing a tag address associated with the data block stored in the corresponding memory area. In the illustrated example, since the cache memory has 16 lines of memory areas, each register array consists of 16 registers. The same number of registers are also provided for the bank B. A start address register 112 is used to temporarily store a start address in the main memory when transferring a block between the cache memory and the main memory. A line number register 114 is used to temporarily store a line number for specifying a memory area in the cache. A refresh counter 115 is used to control the cycle of a refresh operation which is performed periodically in order to prevent the reference counter from overflowing. A current bank register 116, when its value is "0", indicates that the bank A is the current bank and the bank B is the prediction bank, and when its value is "1", indicates that the bank B is the current bank and the bank A is the prediction bank. A sequencer 118 is responsible for overall control of the control block 82.

As in the case of the system described with reference to FIGS. 1 to 17, the operational description hereinafter given with reference to the flowcharts of FIGS. 25 to 46 will be substituted for a detailed description of the circuit configuration of the control block 82, in particular, the sequencer 118.

Figure 25:
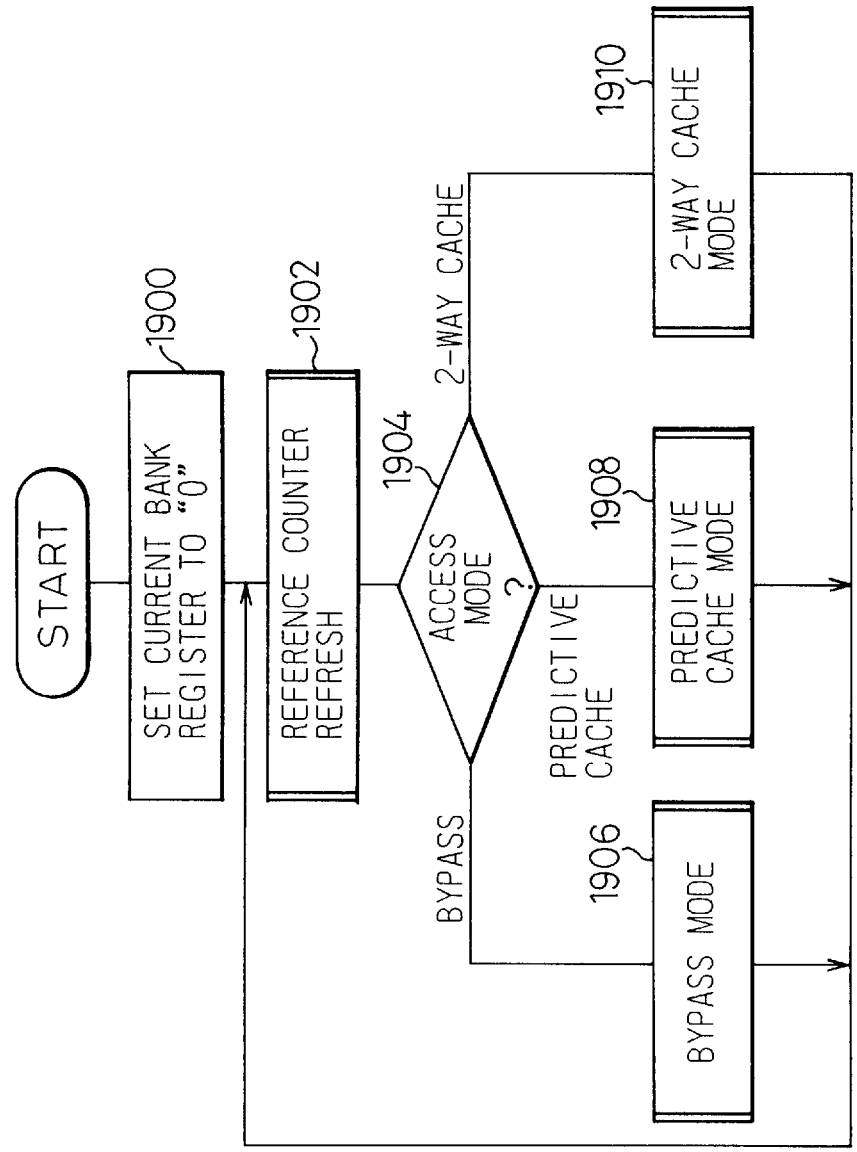
FIG. 25 is a main flowchart for explaining the operation of the control block.

FIG. 25 shows a main flowchart. In FIG. 25, first the current bank register is initialized to "0" in step 1900; as a result, the bank A is selected as the current bank and the bank B as the prediction bank. Next, in step 1902, a reference counter refresh operation is performed, which is followed by a step 1904 where an access mode setting is examined. Depending on the access mode setting, the process proceeds to step 1906 for a bypass mode operation, step 1908 for a predictive cache mode operation, or step 1910 for a two-way cache mode operation, after which the process returns to step 1902.

Figure 26:
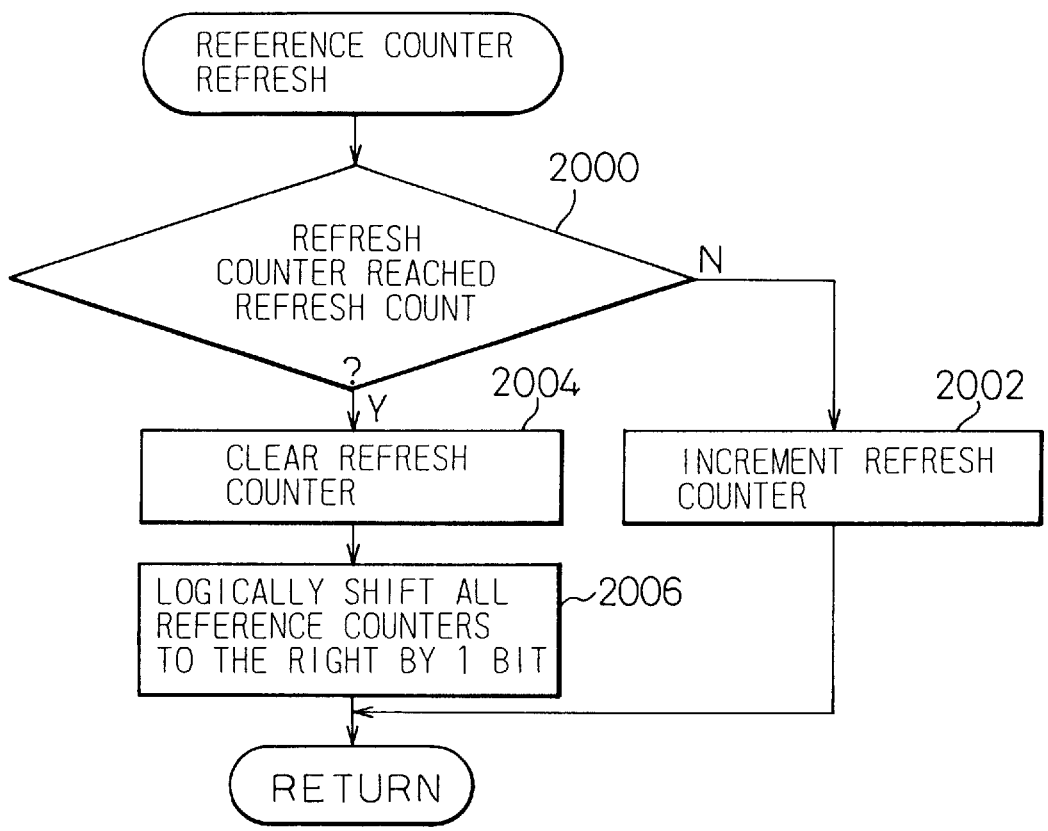
FIG. 26 is a flowchart for a reference counter refresh operation.

FIG. 26 shows the details of the reference counter refresh operation performed in step 1902 in FIG. 25. In step 2000, a decision is made as to whether the refresh counter has reached a prescribed refresh count; if it has not reached the refresh count, the refresh counter is incremented in step 2002, and the process returns to the main flow. On the other hand, if the refresh counter has reached the refresh count, the refresh counter is cleared in step 2004, and all the reference counters are logically shifted to the right by one bit in step 2006. The effect of this is to multiply the count value of every reference counter by ½.

Figure 27:
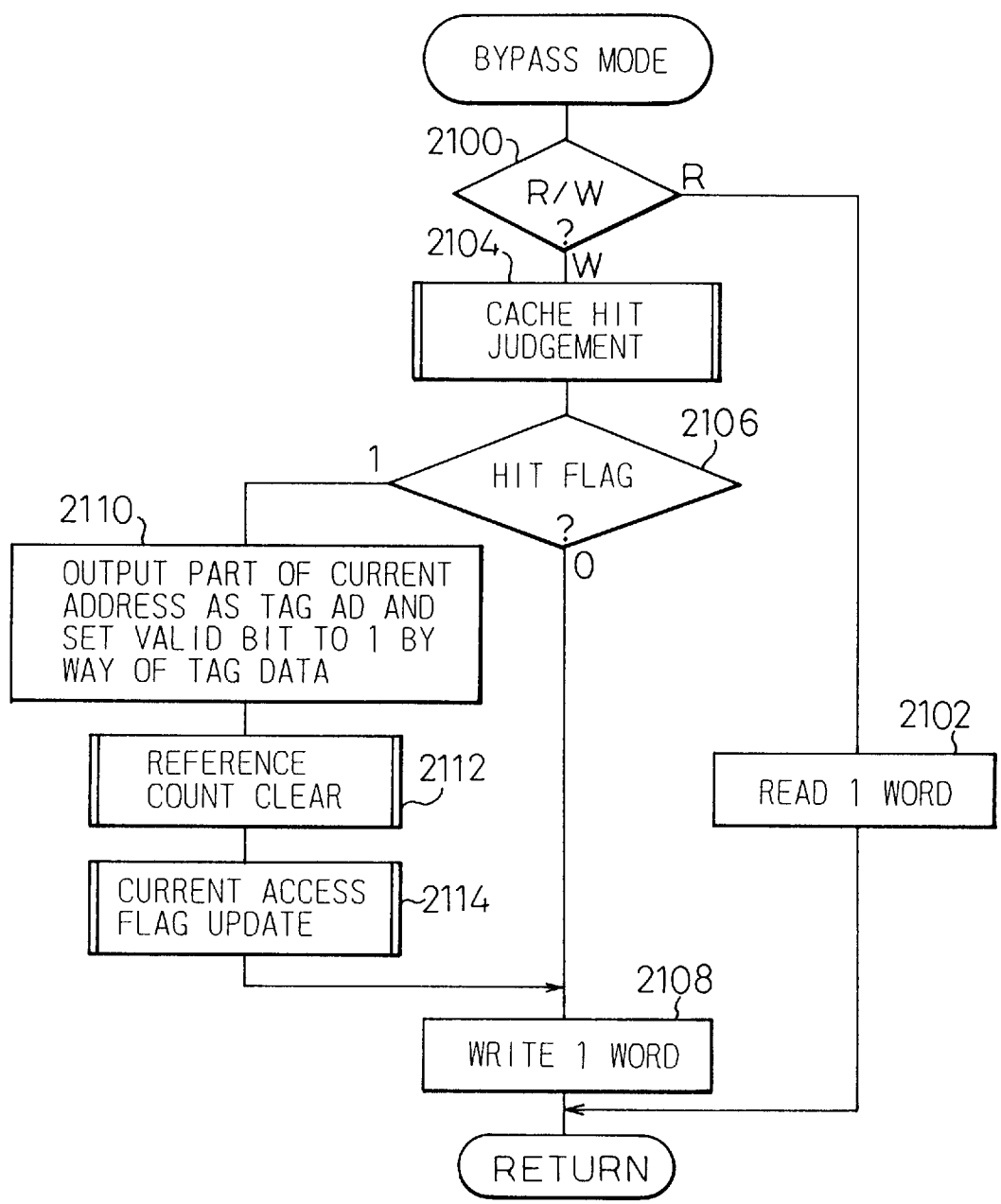
FIG. 27 is a flowchart for a bypass mode operation.

FIG. 27 shows the details of the bypass mode operation performed in step 1906 in FIG. 25. In the bypass mode, the cache memory is bypassed and the main memory 31 is directly accessed via the memory controller 33. In this case, if a write is performed to the memory area whose contents are cached in the cache memory, a discrepancy will arise between the contents of the main memory and the cache memory; therefore, the corresponding area of the cache memory will have to be invalidated. Accordingly, in step 2100, a decision is made as to whether the access is for a memory write or a memory read; if it is a read operation, 1-word data is read from the main memory 31 via the memory controller 33 in step 2102, after which the process returns to the main flow. If it is a write operation, a cache-hit judgement operation is performed in step 2104. In the cache-hit judgement operation, as will be described in detail later, if it is judged that the current address is held in either one of the cache memory banks (a hit), then the hit flag is set to "1", the bank where the hit occurred is selected, and the line number of the corresponding memory area is loaded into the line number register. Next, in step 2106, the value of the hit flag is examined; if it is "0", the flag indicates a cache miss, so that 1-word data is written to the main memory 31 via the memory controller 33 in step 2108, after which the process returns to the main flow. On the other hand, if it is "1", the flag indicates a cache hit; in that case, since the bank where the hit occurred is already selected in the cache-hit judgement operation, in step 2110 some of the current address bits are output as the tag address and tag data with its valid bit field set to 1 is output, thereby invalidating the tag stored in the selected bank. Next, in step 2112, a reference count clear operation is performed to clear the reference count associated with that tag, and in step 2114, a current access flag update operation is performed to update the current access flag, after which the process proceeds to step 2108.

Figure 28:
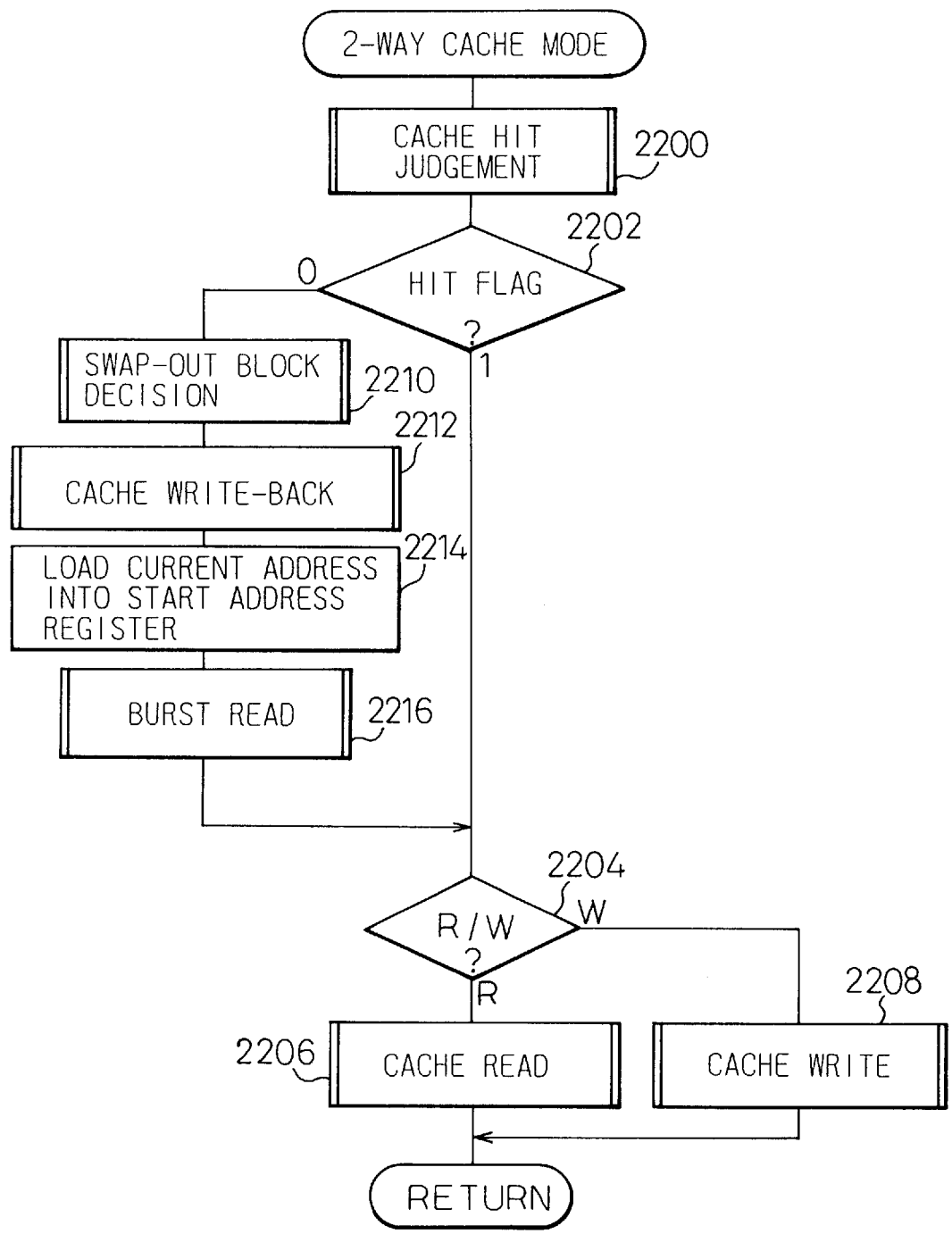
FIG. 28 is a flowchart for a two-way cache mode operation.

FIG. 28 shows the details of the two-way cache mode operation performed in step 1910 in FIG. 25. In step 2200, a cache-hit judgement operation is performed. Then, if it is judged in step 2202 that a cache hit has occurred, a cache read operation or a cache write operation (described in detail later) is performed to read from or write to the cache memory (steps 2204, 2206, 2208). If it is judged that a cache miss has occurred, a swap-out block deciding operation is performed in step 2210 to determine the bank, as well as the line number, holding the data block to be swapped out, and a cache write-back operation is performed in step 2212, issuing an instruction to the memory controller 33 to write back the data block to the main memory. Then, in step 2214 the current address is loaded into the start address register, and in step 2216 a burst read operation is performed, issuing an instruction to the memory controller 33 to burst-read the data block containing the data to be accessed. After that, the process proceeds to step 2204.

Figure 29:
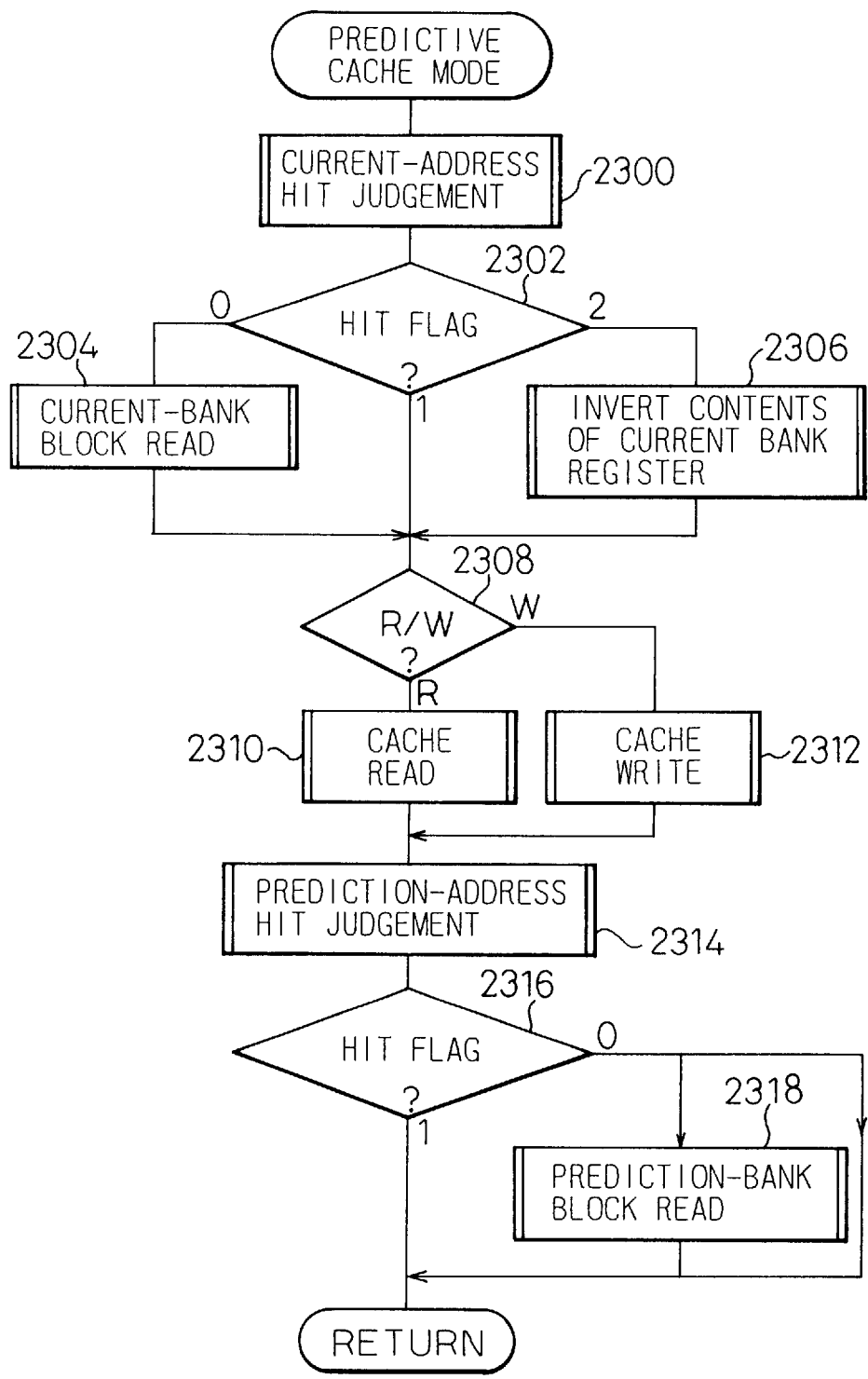
FIG. 29 is a flowchart for a predictive cache mode operation.

FIG. 29 shows the details of the predictive cache mode operation performed in step 1908 in FIG. 25. In step 2300, a current address hit judgement operation is performed to judge whether the current block address is held in the current bank or the prediction bank or in neither of the banks. As will be described later, in the current address hit judgement operation, the hit flag is set to 1 when the current block address is stored in the current bank, and to 2 when it is stored in the prediction bank. If it is not stored in either of the banks, the hit flag is set to 0. In step 2302, the value of the hit flag is examined, and if it is 0, a current-bank block-read operation is performed in step 2304 to load the data block containing the data to be accessed into the current bank cache memory. If the hit flag value is 2, the contents of the current bank register are inverted in step 2306. In either case, the result is that the data block containing the data to be accessed is cached in the current bank cache memory. Then, the cache read or cache write operation is performed to read from or write to the cache memory (steps 2308, 2310, 2312). Next, in step 2314, a prediction-address hit judgement operation is performed to judge whether the prediction block address is held in the current bank or the prediction bank or in neither of the banks. If it is not stored in either of the banks, the hit flag is set to 0, in which case a prediction-bank block-read operation is performed in step 2318 to load the data block specified by the prediction block address into the prediction bank cache memory. As shown in the figure, this prediction-bank block-read operation is performed in parallel with other operations.

In the above process, the current-bank block-read operation is performed only when the current block address is not stored in either the current bank or the prediction bank, and the prediction bank block read operation is performed only when the prediction block address is not stored in either the current bank or the prediction bank. This avoids the situation where the same data block is loaded into both banks simultaneously. Accordingly, there is no concern of a disparity arising between the contents of the main memory and the cache memory which could occur if the same data block were loaded into a plurality of cache memory banks simultaneously.

Figure 30:
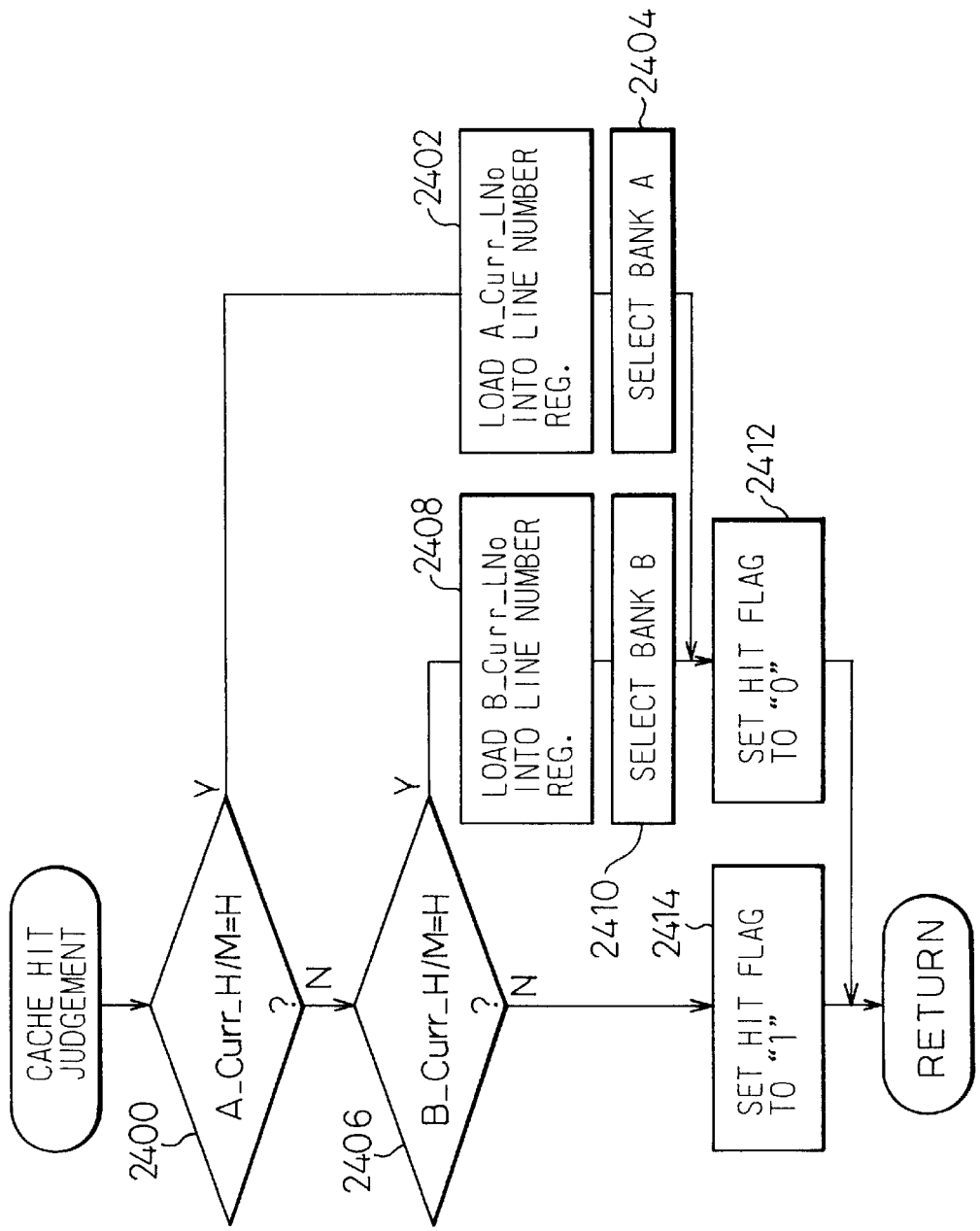
FIG. 30 is a flowchart for a cache-hit judgement operation.

FIG. 30 shows the details of the cache-hit judgement operation performed in step 2104 in FIG. 27 and step 2200 in FIG. 28. In step 2402, it is determined whether or not the signal A_Curr_H/M is at the H level, that is, whether or not the current block address is held in the bank A (a hit). If the A_Curr_H/M is at the H level, the value of the signal A_Curr_LNo is loaded into the line number register in step 2402, and a select signal for selecting the bank A is output in step 2404. On the other hand, if the A_Curr_H/M is at the L level, the process proceeds to step 2406 where it is determined whether or not the signal B_Curr_H/M is at the H level, that is, whether or not the current block address is held in the bank B (a hit). If the B_Curr_H/M is at the H level, the value of the signal B_Curr_LNo is loaded into the line number register in step 2408, and a select signal for selecting the bank B is output in step 2410. In either case, the hit flag is set to "1" in step 2412, to complete the operation. If, in step 2406, the signal B_Curr_H/M is at the L level, the hit flag is set to "0" in step 2414, to complete the operation.

Figure 31:
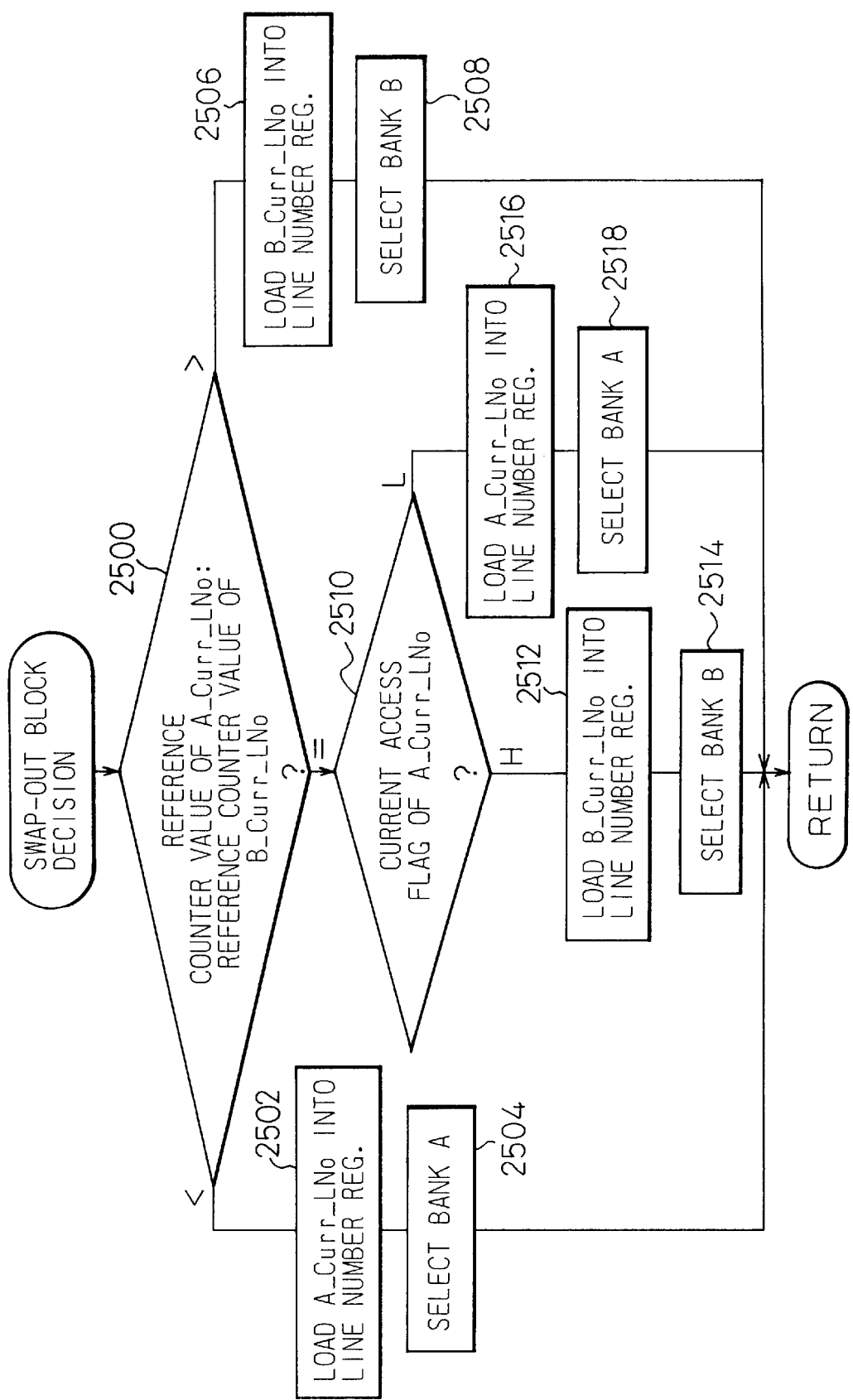
FIG. 31 is a flowchart for a swap-out block deciding operation.

FIG. 31 shows the details of the swap-out block deciding operation performed in step 2210 in FIG. 28. When the current block address is not held in either the bank A or the bank B, the signal A_Curr_LNo and the signal B_Curr_LNo respectively indicate the line numbers of the storage areas where data blocks having the same tag address, i.e., candidate data blocks to be swapped out, are stored. Then, their reference counter values are compared, and if the reference counter value on the bank A is smaller, in step 2502 the value of A_Curr_LNo is loaded into the line number register, and in step 2504 a select signal for selecting the bank A is output, to swap out the data block stored in the bank A. Conversely, if the reference counter value on the bank B is smaller, in step 2506 the value of B_Curr_LNo is loaded into the line number register, and in step 2508 a select signal for selecting the bank B is output, to swap out the data block stored in the bank B. If the two values are equal, the process proceeds to step 2510 where it is determined whether the current access flag referred to by A_Curr_LNo is at the H level, that is, whether the swap-out candidate data block is the most-recently accessed data block. If the flag is at the H level, then in step 2512 the value of B_Curr_LNo is loaded into the line number register, and in step 2514 a select signal for selecting the bank B is output, to swap out the data block stored in the bank B. If the flag is at the L level, in step 2516 the value of A_Curr_LNo is loaded into the line number register, and in step 2518 a select signal for selecting the bank A is output, to swap out the data block stored in the bank A.

Figure 32:
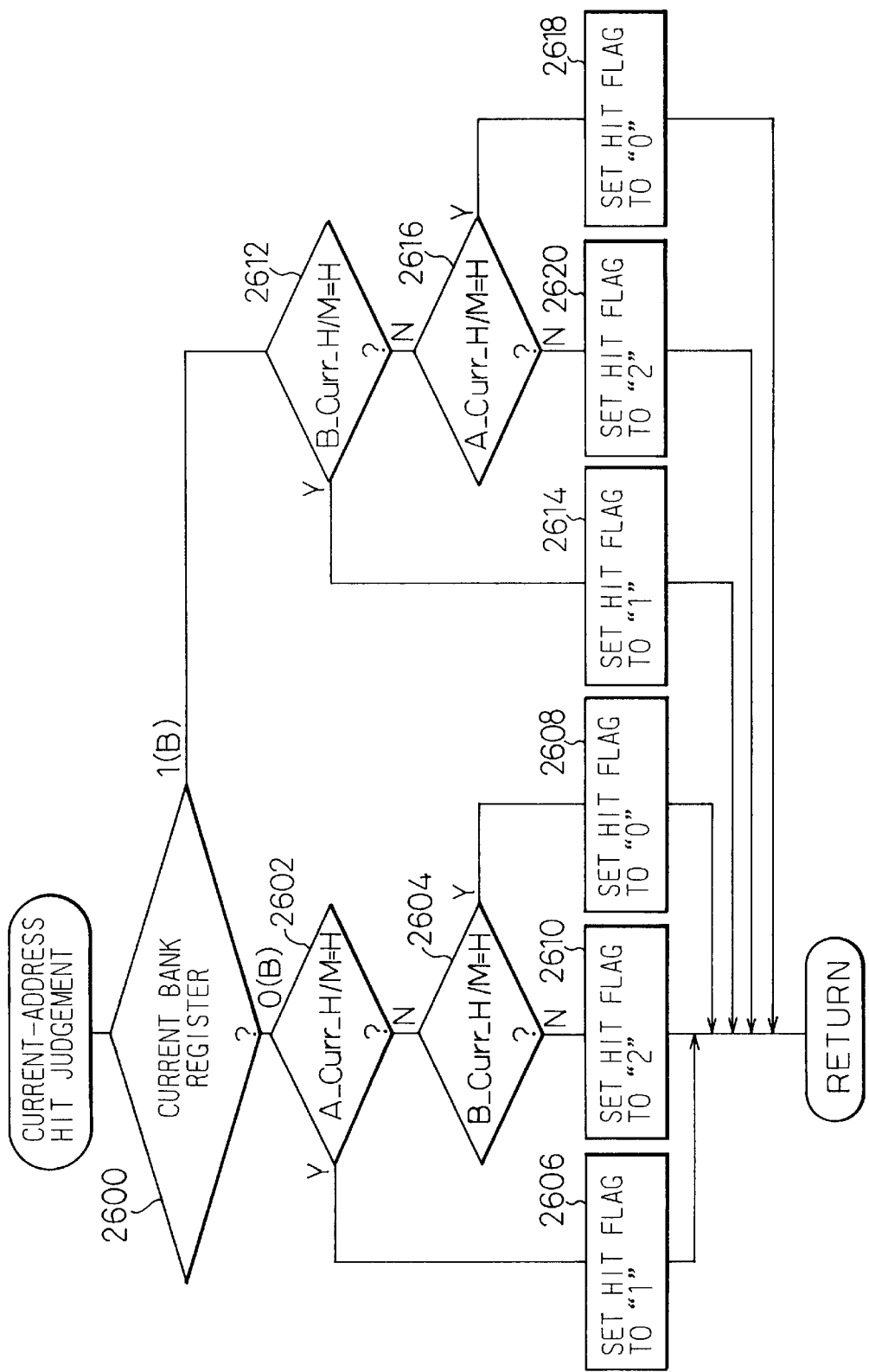
FIG. 32 is a flowchart for a current address hit judgement operation.

FIG. 32 shows the details of the current-address hit judgement operation performed in step 2300 in FIG. 29. First, in step 2600, it is determined whether the value in the current bank register is 0 or 1, that is, whether the current bank is bank A or bank B. If the bank A is the current bank, it is determined in step 2602 whether the signal A_Curr_H/M is at the H level or not. If it is at the H level, it is decided that the current block address is found in the current bank (a hit), and the hit flag is set to "1" in step 2606. If A_Curr_H/M is at the L level, the process proceeds to step 2604 where it is determined whether B_Curr_H/M is at the H level or not. If it is at the H level, it is decided that the current block address is found in the prediction bank (a hit), and the hit flag is set to "2" in step 2608. If A_Curr_H/M and B_Curr_H/M are both at the L level, the hit flag is set to "0" in step 2610. Referring back to step 2600, if the value in the current bank register is 1, the process proceeds to step 2612 to determine whether B_Curr_H/M is at the H level or not. If it is at the H level, it is decided that the current block address is found in the current bank (a hit), and the hit flag is set to "1" in step 2614. If the signal is at the L level, the process proceeds to step 2616 to determine whether A_Curr_H/M is at the H level or not. If it is at the H level, it is decided that the current block address is found in the prediction bank (a hit), and the hit flag is set to "2" in step 2618. If it is at the L level, the hit flag is set to "0" in step 2620.

Figure 33:
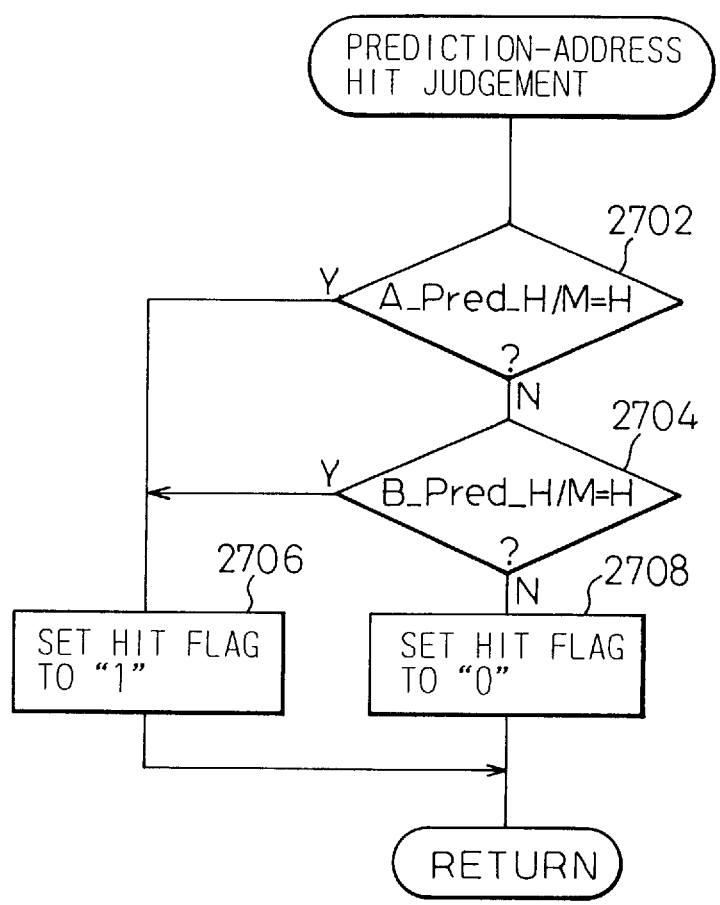
FIG. 33 is a flowchart for a prediction address hit judgement operation.

FIG. 33 shows the details of the prediction-address hit judgement operation performed in step 2314 in FIG. 29. In FIG. 33, if either A_Pred_H/M (in step 2702) or B_Pred_H/M (in step 2704) is H, the hit flag is set to "1" (step 2706); if both are L, the hit flag is set to "0" (step 2708).

Figure 34:
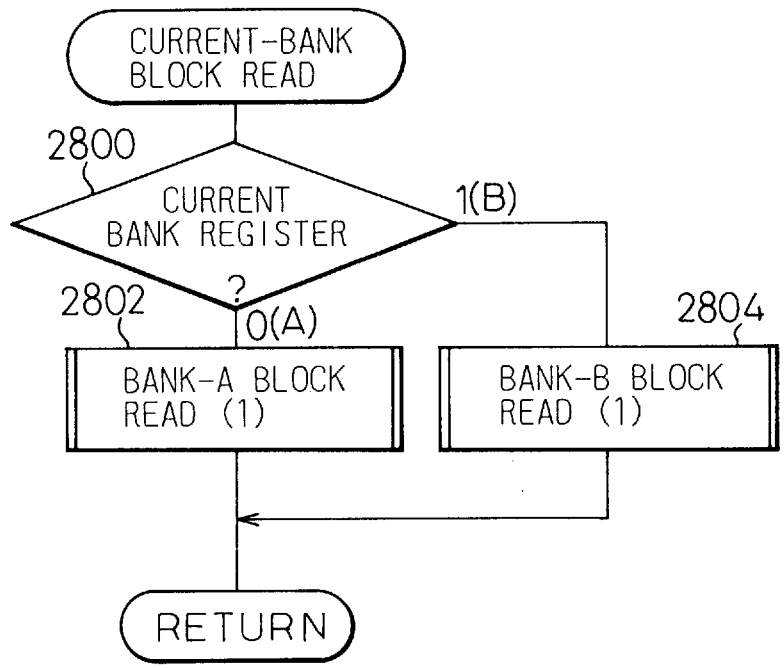
FIG. 34 is a flowchart for a current-bank block-read operation.

FIG. 34 shows the details of the current-bank block-read operation performed in step 2304 in FIG. 29. In step 2800, it is determined whether the value in the current bank register is 0 (bank A) or 1 (bank B). If the bank A is the current bank, a bank-A block-read operation (1) is performed in step 2802 to load the data block specified by the current block address into the bank A. If the bank B is the current bank, a bank-B block-read operation is performed in step 2804 to load the data block specified by the current block address into the bank B.

Figure 35:
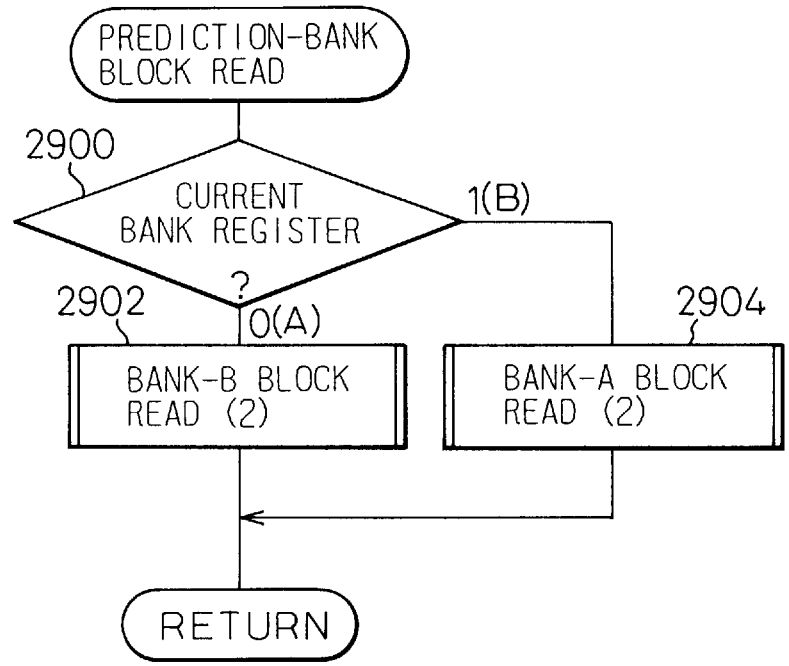
FIG. 35 is a flowchart for a prediction-bank block-read operation.

FIG. 35 shows the details of the prediction-bank block-read operation performed in step 2318 in FIG. 29. In step 2900, the value in the current bank register is checked to determine whether the current bank is bank A or bank B. If the bank A is the current bank, a bank-B block-read operation (2) is performed in step 2902 to load the data block specified by the prediction block address into the bank B which is the prediction bank. If the bank B is the current bank, a bank-A block-read operation (2) is performed in step 2904 to load the data block specified by the prediction block address into the bank A which is the prediction bank.

Figure 36:
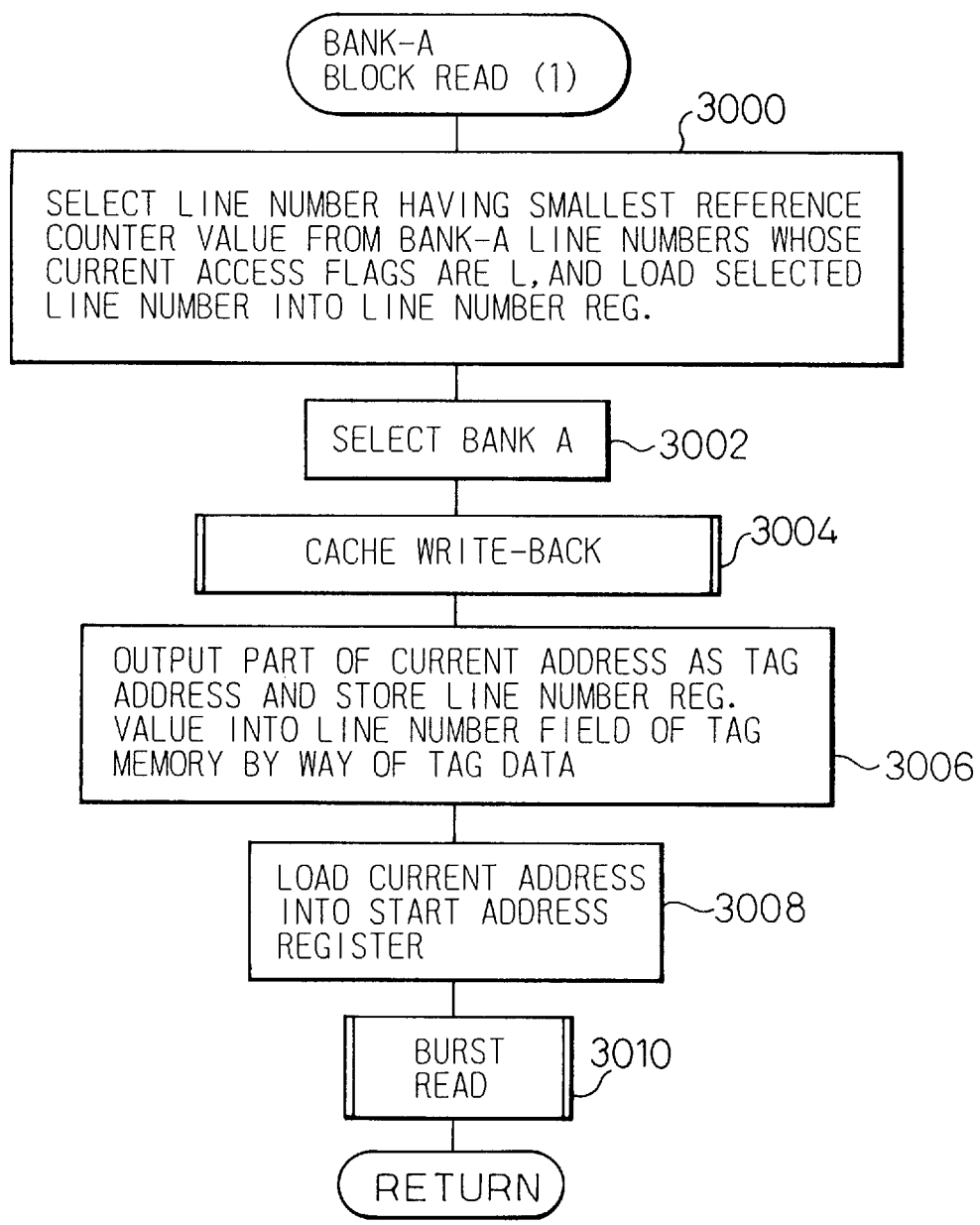
FIG. 36 is a flowchart for a bank-A block-read operation (1)

FIG. 36 shows the details of the bank-A block-read operation (1) performed in step 2802 in FIG. 34. In step 3000, of the line numbers of the bank A for which the current access flags are L, the line number whose reference counter value is the smallest is loaded into the line number register. More specifically, of the data blocks stored in the bank A, the data block least frequently accessed, and not the most-recently accessed one, is decided as the data block to be swapped out. In step 3002, a select signal for selecting the bank A is output, and in step 3004, a cache write-back operation is performed to return the swap-out data block to the main memory. Next, in step 3006, part of the current address is output as the tag address, and tag data with the line number register value set in its line number field is output so that the tag memory corresponding to the current address is mapped to the storage area where the new data block is to be loaded. Next, in step 3008, the current address is loaded into the start address register, and in step 3010, a burst read operation is performed to load the data block specified by the current address into the designated memory area.

Figure 37:
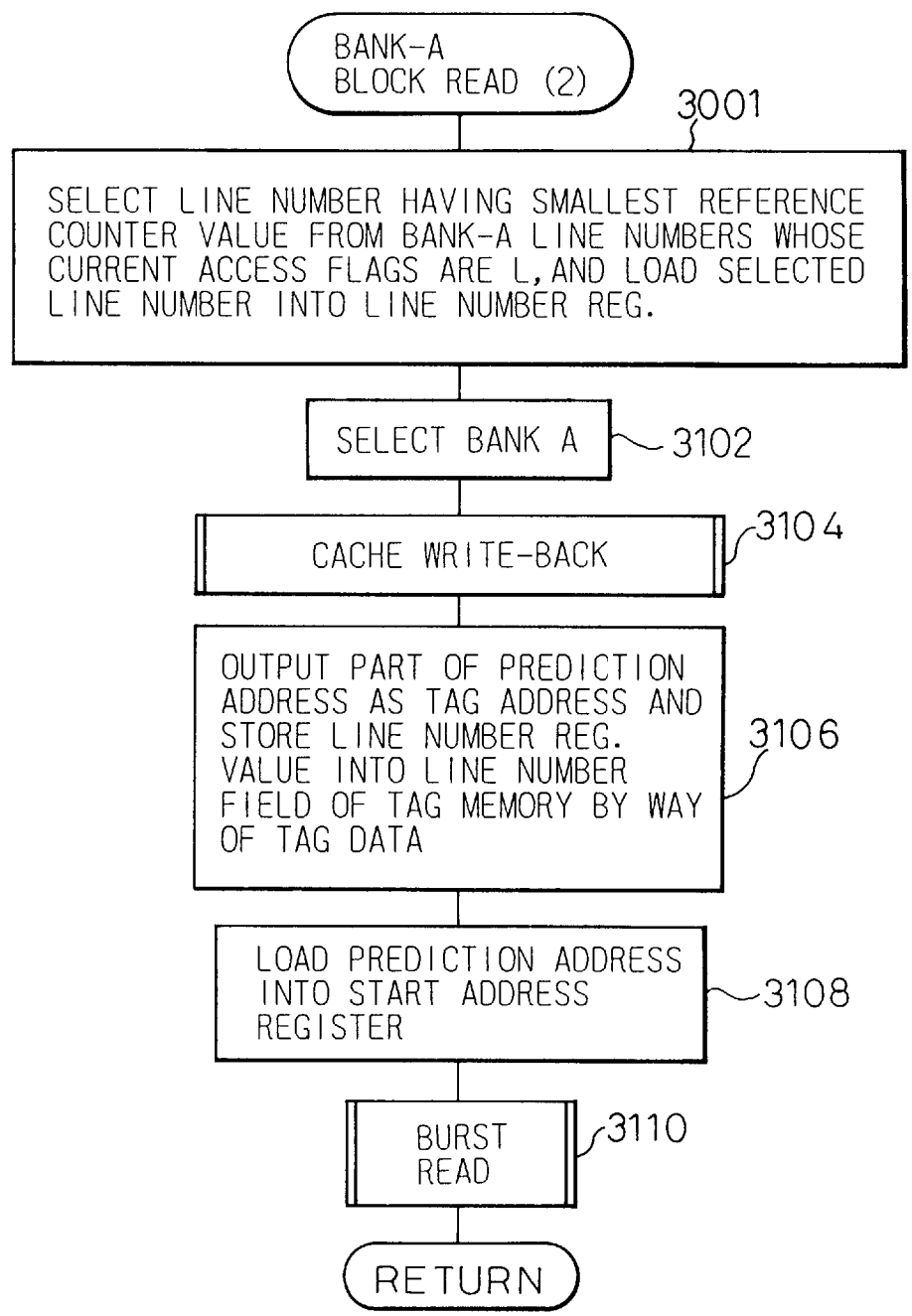
FIG. 37 is a flowchart for a bank-A block-read operation (2)

FIG. 37 shows the details of the bank-A block-read operation (2) performed in step 2904 in FIG. 35. This operation is fundamentally the same as the bank-A block-read operation (1) shown in FIG. 36, the only difference being that in steps 3106 and 3108 the prediction address output from the prediction address generating circuit is used in place of the current address.

Figure 38:
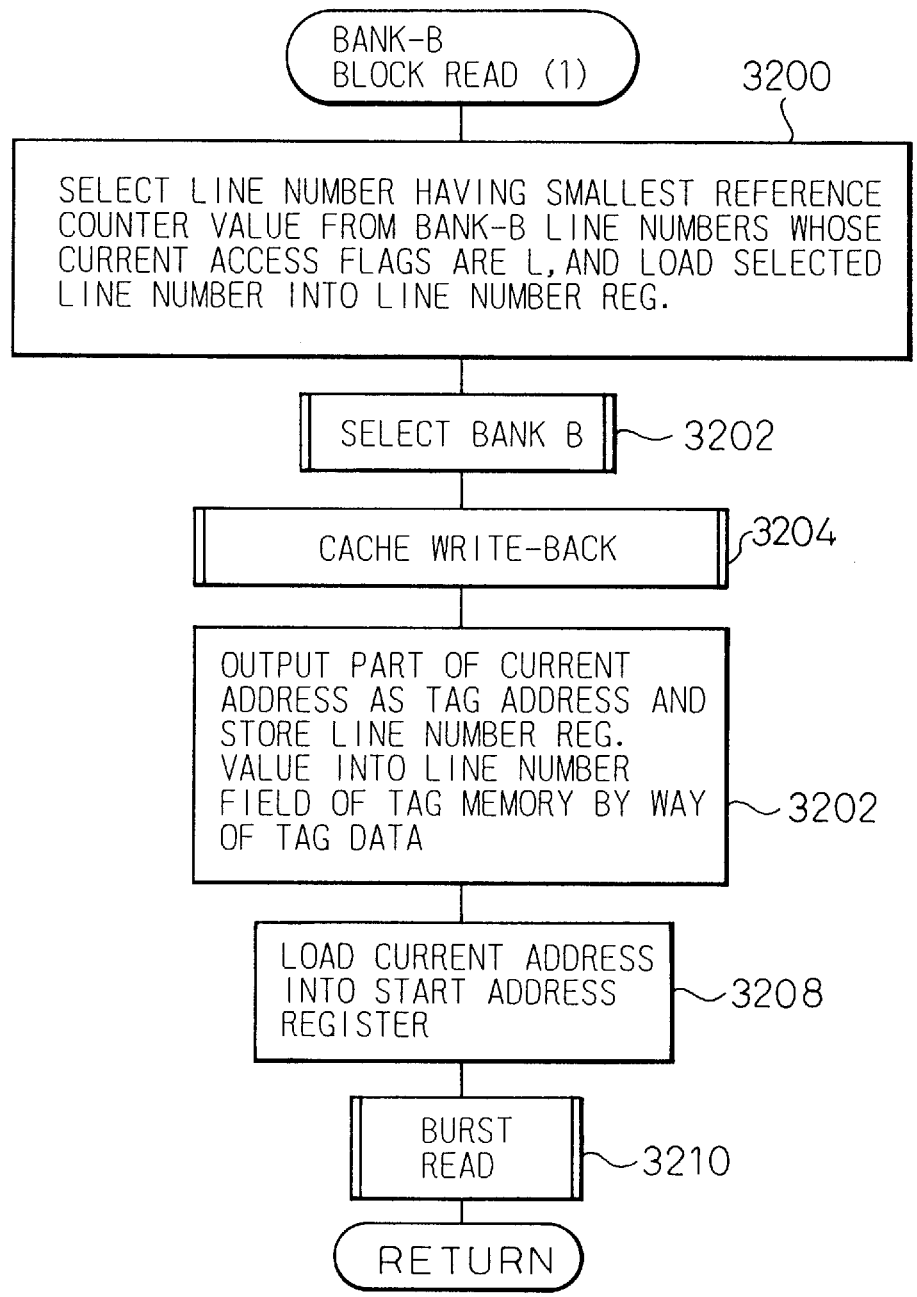
FIG. 38 is a flowchart for a bank-B block-read operation (1)

FIG. 38 shows the details of the bank-B block-read operation (1) performed in step 2804 in FIG. 34. This operation is fundamentally the same as the bank-A block-read operation (1) shown in FIG. 36, the only differences being that in step 3200 the reference counters and current access flags for the bank B are used in place of the reference counters and current access flags for the bank A, and that in step 3202 the bank B is selected.

Figure 39:
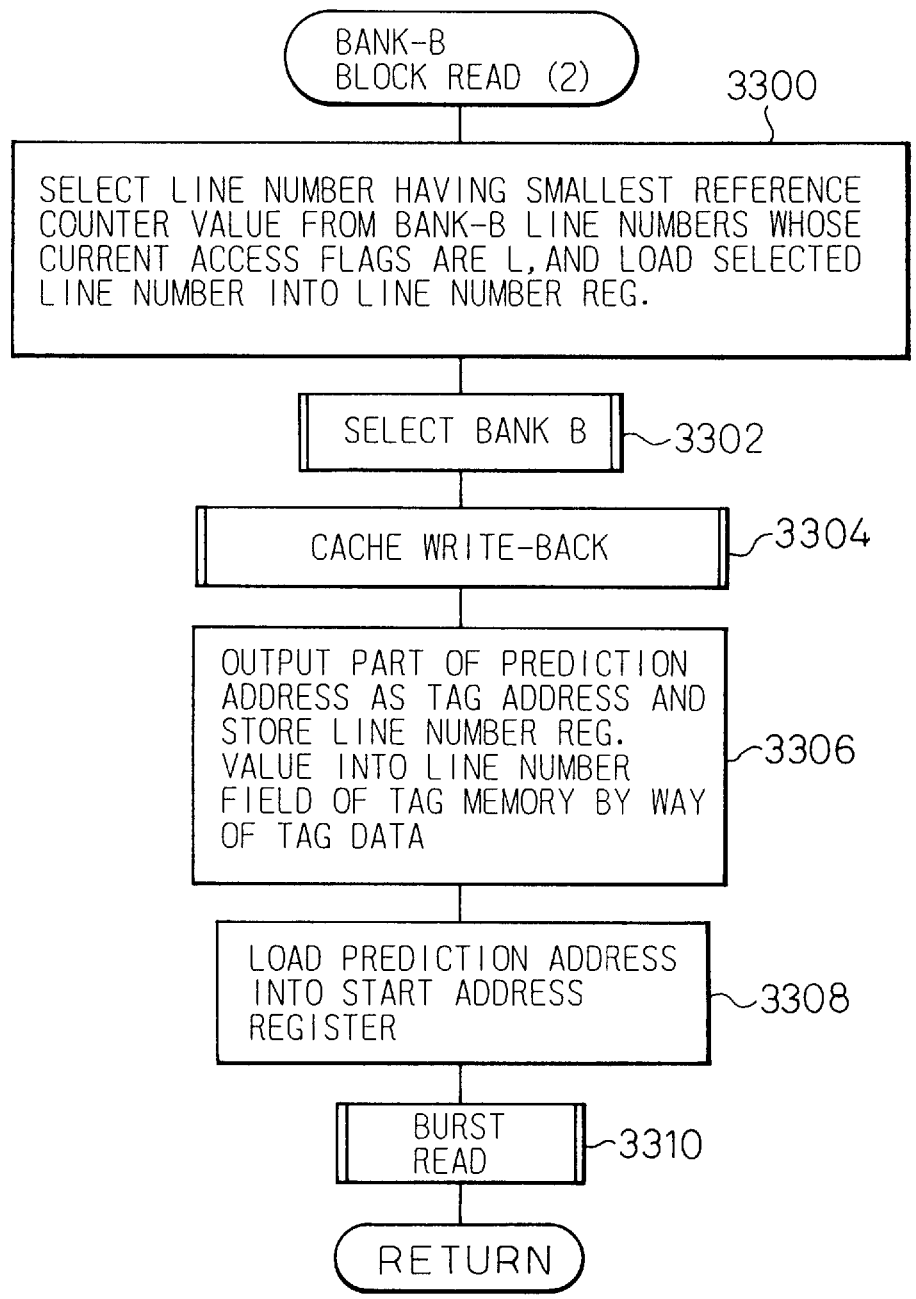
FIG. 39 is a flowchart for a bank-B block-read operation (2)

FIG. 39 shows the details of the bank-B block-read operation (2) performed in step 2902 in FIG. 35. This operation is fundamentally the same as the bank-B block-read operation (1) shown in FIG. 38, the only difference being that in steps 3306 and 3308 the prediction address is used in place of the current address.

Figure 40:
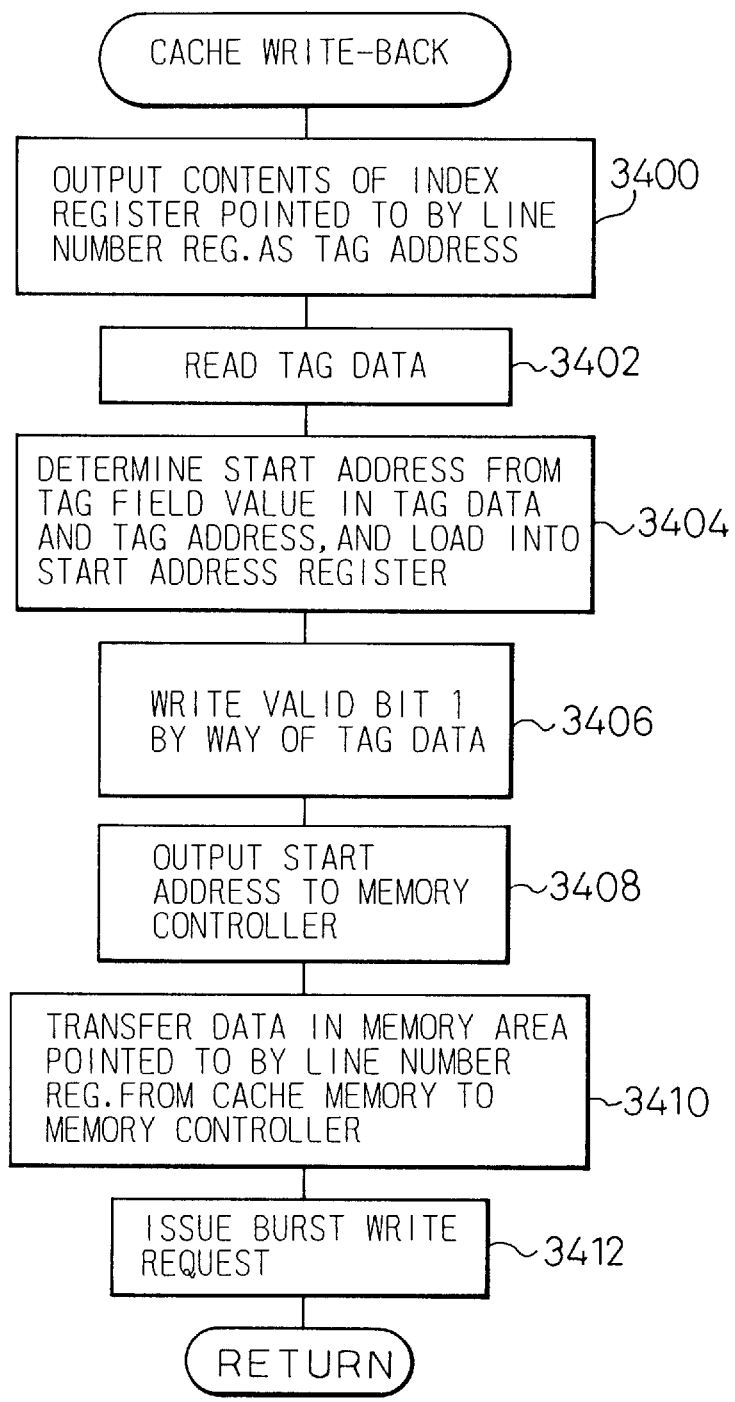
FIG. 40 is a flowchart for a cache write-back operation.

FIG. 40 shows the details of the cache write-back operation performed in step 2212 in FIG. 28, step 3004 in FIG. 36, step 3104 in FIG. 37, step 3204 in FIG. 38, and step 3304 in FIG. 39. In step 3400, the contents of the index register pointed to by the line number register is output as the tag address, thereby addressing the tag data corresponding to the data block to be written back. In step 3402, the tag data is read, and in step 3404, the block address of the data block to be written back is assembled from the tag address and the value of the tag field in the tag data, and is loaded into the start address register. In step 3406, the tag data with its valid bit field set to "1" is output, thereby invalidating the tag. In step 3408, the contents of the start address register are output to the memory controller 33, and in step 3410, the data held in the memory area pointed to by the line number register is transferred from the cache memory to the memory controller 33. Finally, in step 3412, a burst write request is issued to the memory controller 33 so that the data to be written back is transferred as a block to the main memory.

Figure 41:
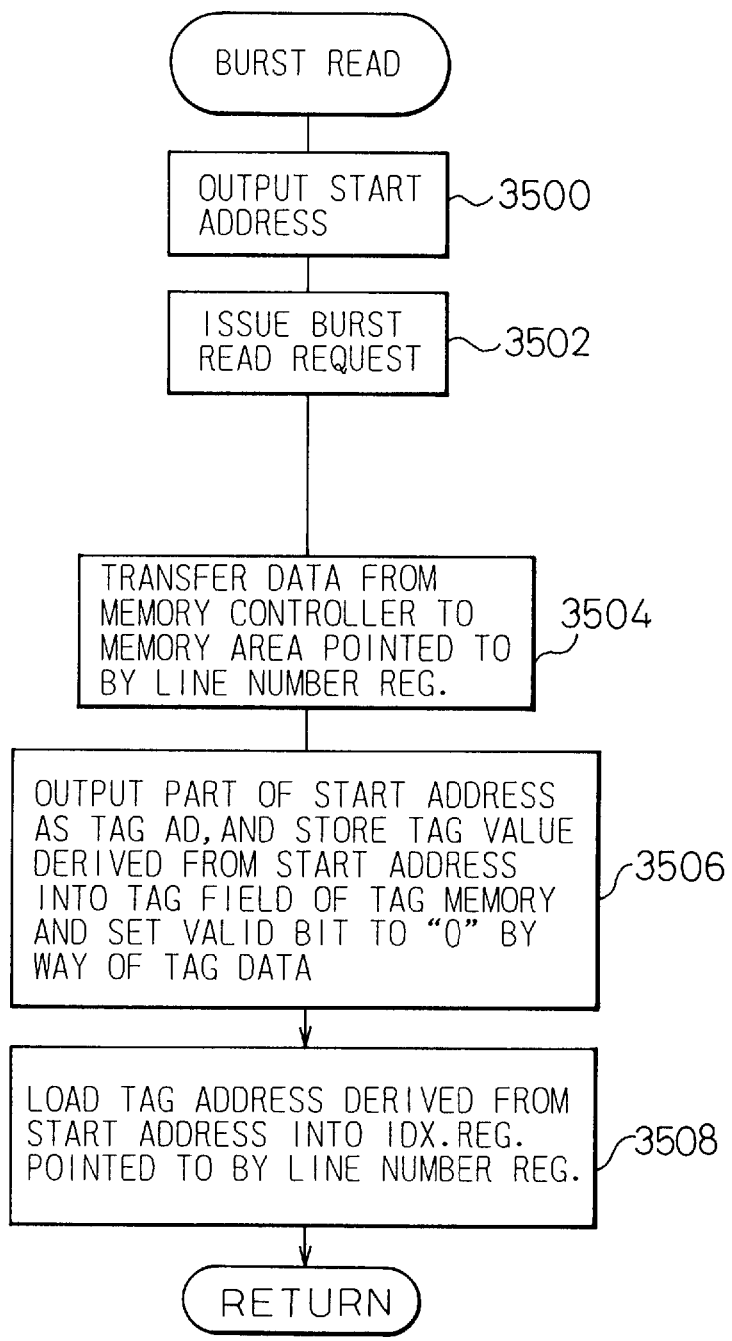
FIG. 41 is a flowchart for a burst read operation.

FIG. 41 shows the details of the burst read operation performed in step 2216 in FIG. 28, step 3010 in FIG. 36, step 3110 in FIG. 37, step 3210 in FIG. 38, and step 3310 in FIG. 39. In step 3500, the start address stored in the start address register is output to the memory controller 33, and in step 3502, a burst read request is issued to the memory controller 33 to read the data block specified by the start address from the main memory into the memory controller 33. In step 3504, the data is transferred to the memory area pointed to by the line number register. In step 3506, part of the contents of the start address register is output as the tag address, and tag data, with part of the start address set in its tag field and with its valid bit field set to "0", is output to write to the tag memory. Next, in step 3508, the tag address is loaded into the index register pointed to by the line number register.

Figure 42:
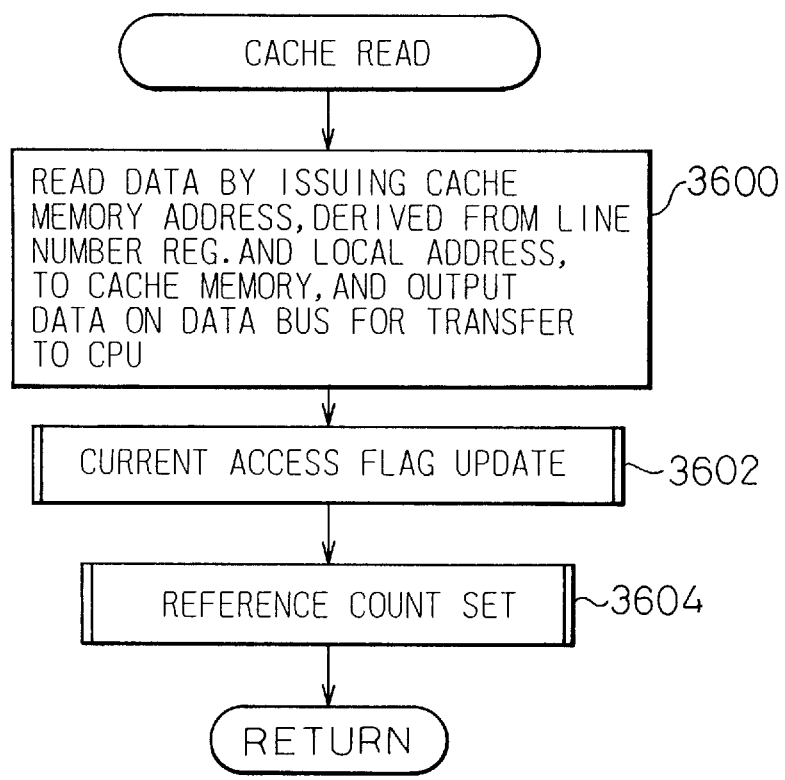
FIG. 42 is a flowchart for a cache read operation.

FIG. 42 shows the details of the cache read operation performed in step 2206 in FIG. 28 and step 2310 in FIG. 29. In step 3600, data specified by a cache memory address consisting of the line number register and local address is read from the cache memory and output on the data bus for transfer to the CPU. In step 3602, the current access flag update operation is performed, and in step 3604, the reference count set operation is performed to increment the corresponding reference count.

Figure 43:
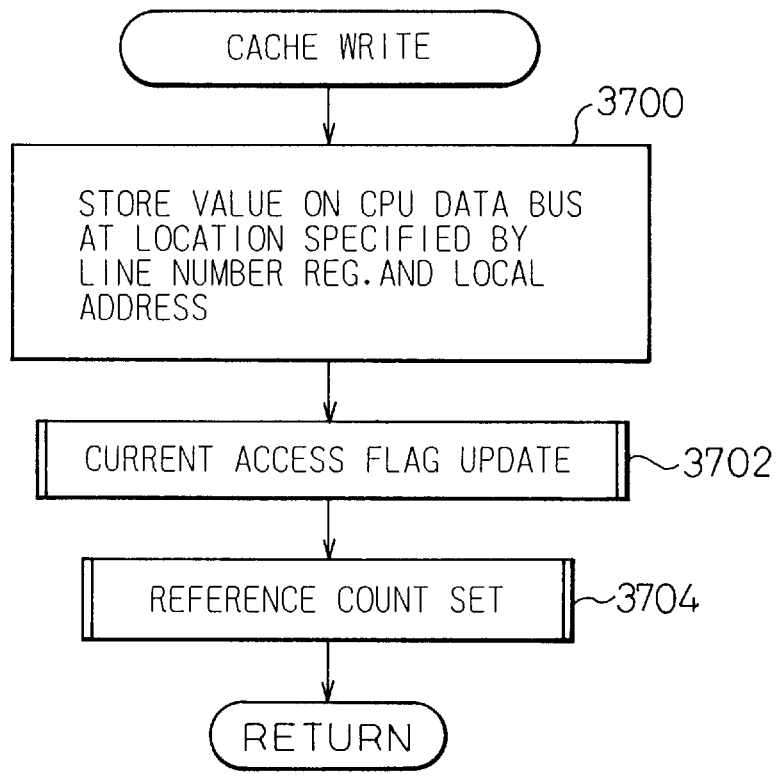
FIG. 43 is a flowchart for a cache write operation.

FIG. 43 shows the details of the cache write operation performed in step 2208 in FIG. 28 and step 2312 in FIG. 29. In step 3700, the value output on the data bus from the CPU is stored at the location in the cache memory specified by the line number register value and the local address, and in step 3702, the current access flag update operation is performed. In step 3704, the reference count set operation is performed.

Figure 44:
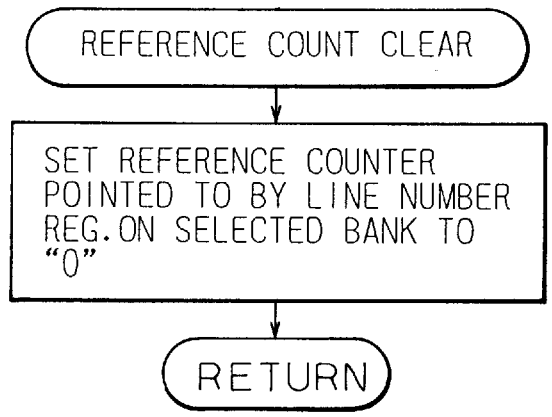
FIG. 44 is a flowchart for a reference count clear operation.

FIG. 44 shows the details of the reference count clear operation performed in step 2112 in FIG. 27. In the reference count clear operation, the reference counter pointed to by the line number register on the currently selected bank is set to "0".

Figure 45:
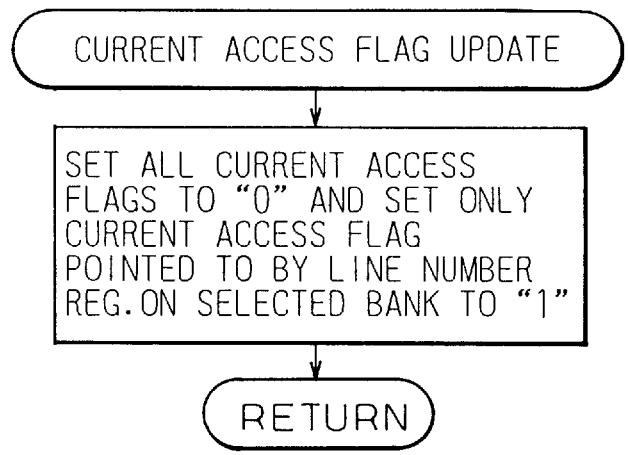
FIG. 45 is a flowchart for a current access flag update operation.

FIG. 45 shows the details of the current access flag update operation performed in step 2114 in FIG. 27, step 3602 in FIG. 42, and step 3702 in FIG. 43. In the current access flag update operation, all the current access flags are set to "0", except the current access flag pointed to by the line number register on the currently selected bank, which is set to "1".

Figure 46:
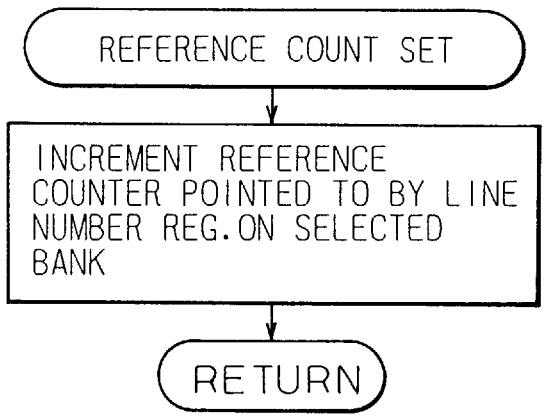
FIG. 46 is a flowchart for a reference count set operation.
Figure 47:
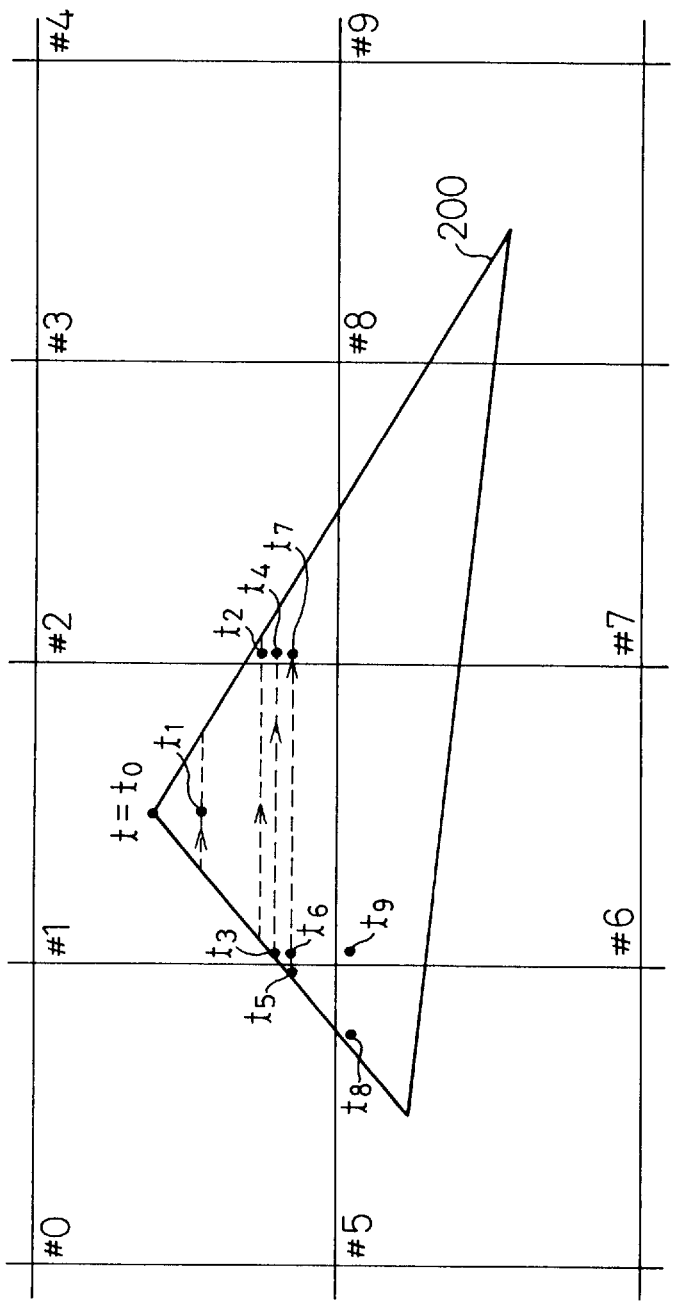
FIG. 47 is a diagram for explaining the operation of the cache-memory system of the present invention.
Figure 1:
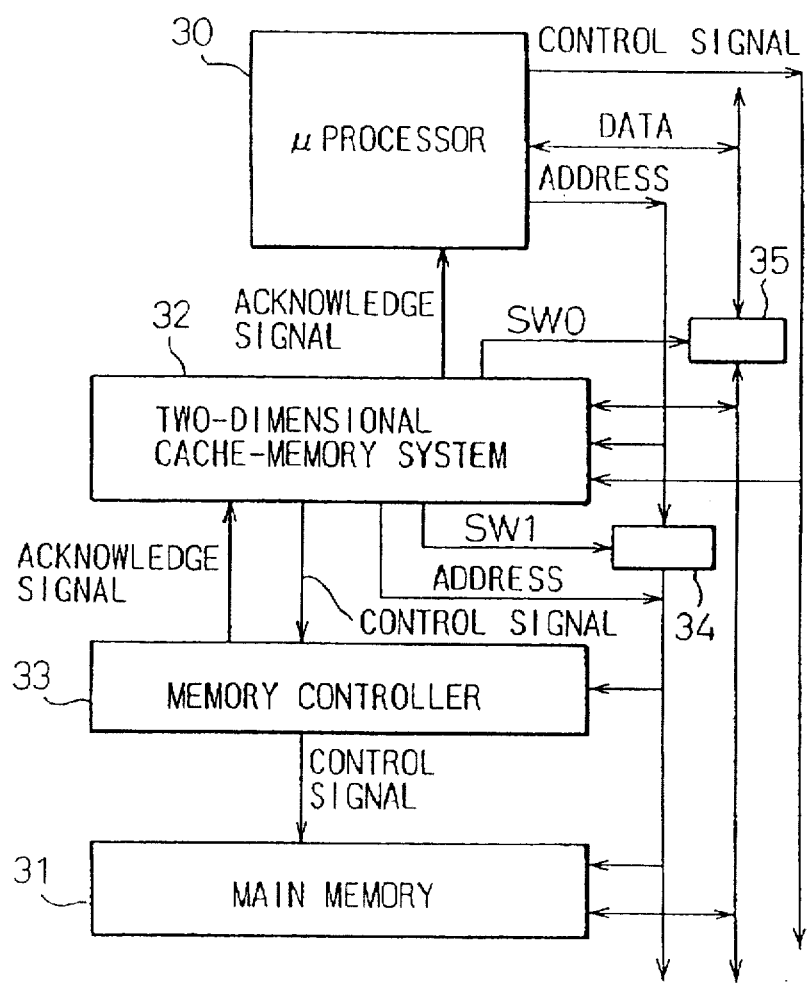
Figure 2:
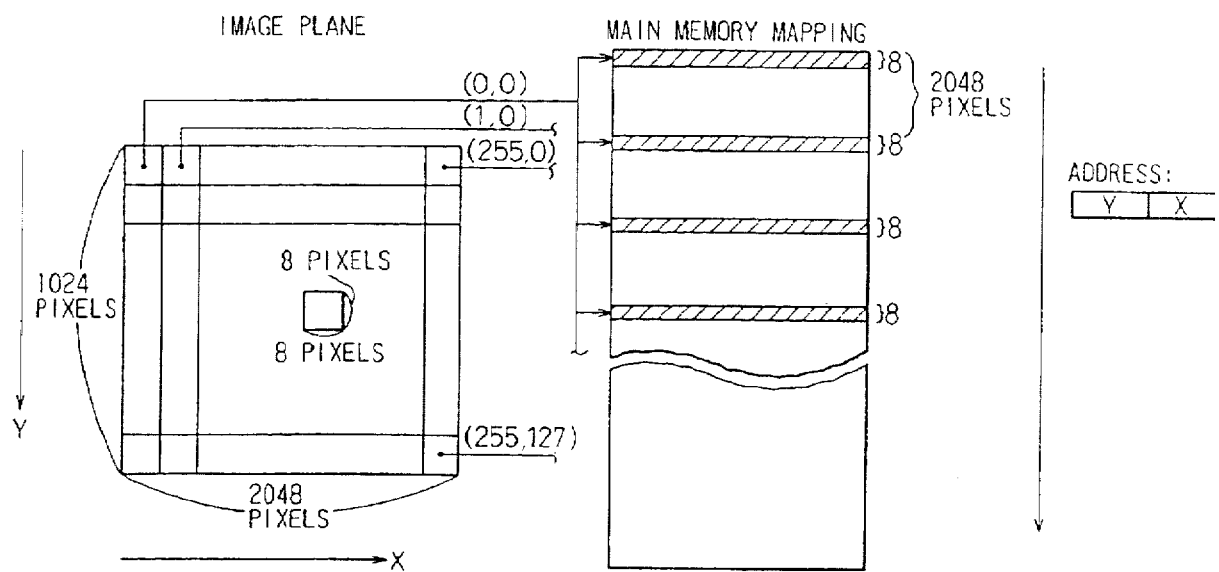
Figure 3:
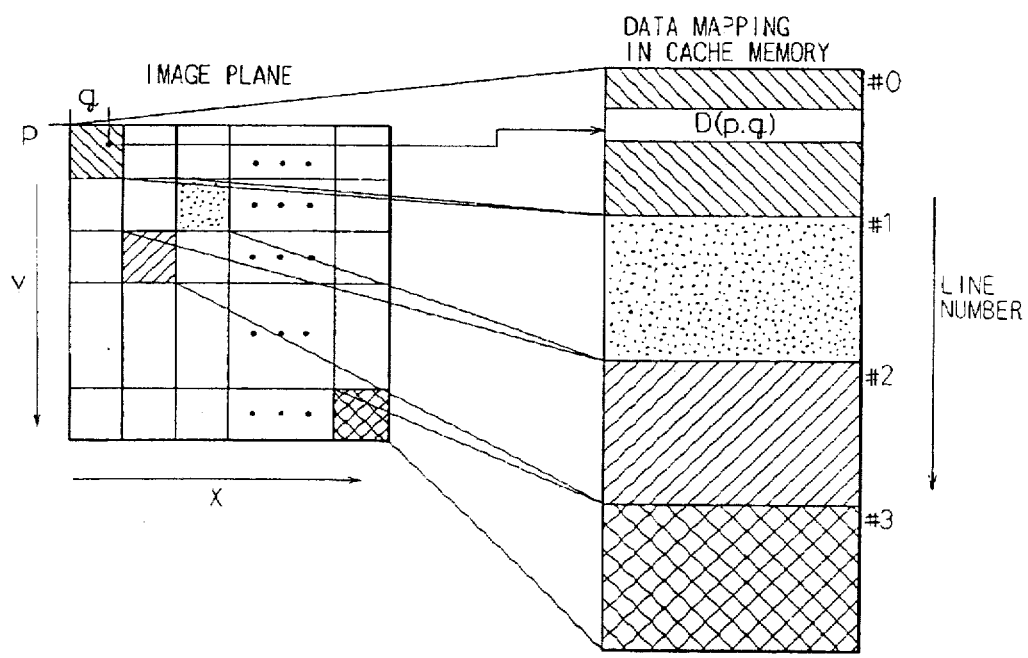
Figure 5:
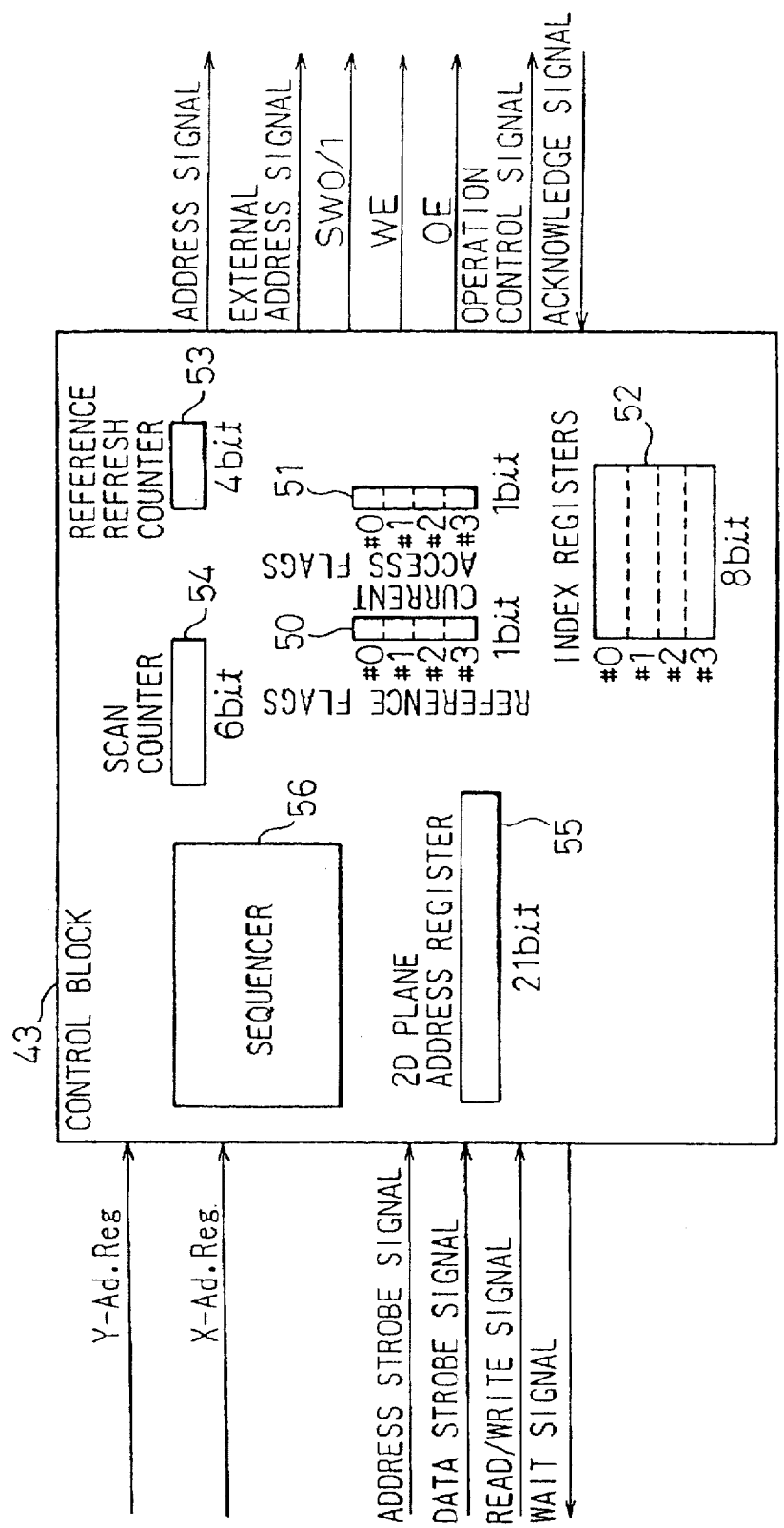

FIG. 46 shows the details of the reference count set operation performed in step 3604 in FIG. 42 and step 3704 in FIG. 43. In the reference count set operation, the reference counter pointed to by the line number register on the currently selected bank is incremented.

Referring now to FIG. 47 and FIGS. 48 to 51, we will describe the prediction mode operation of the cache memory system according to the present invention. We start with the example shown in FIG. 47, in which data within a region enclosed by a triangle 200 are processed in a raster scan fashion, that is, along scanning lines progressing from left to right in sequence from the top to the bottom of the figure. The prediction mode is set to mode 0, and as the initial state it is assumed that the bank A is set as the current bank and the bank B as the prediction bank, and that none of the data blocks (#0 to #2, #5 to #8) containing the data lying within the region enclosed by the triangle 200 are stored in either cache bank. At time $t_0$, the current block address is #1, and the prediction block is #2. Therefore, as shown in part (a) of FIG. 48, neither the current block address nor the prediction block address is held in the bank A or bank B, so that A_Curr_H/M, A_Pred_H/M, B_Curr_H/M, and B_Pred_H/M are all at the L level. Then, the block #1 is loaded into the bank A which is the current bank, so that the current block address is now held in the current bank and A_Curr_H/M goes high, as shown in part (b) of FIG. 48.

In this situation, the bank A is accessed. Next, the block #2 is loaded into the bank B, and B_Pred_H/M is set to the H level, as shown in part (c) of FIG. 48. At time $t_1$, since A_Curr_H/M is at the H level, as shown in part (d) of FIG. 48, the bank A is accessed. At time $t_2$, the current block is now #2 and the prediction block #3, as shown in part (e) of FIG. 48. Since, at this time, only B_Curr_H/M is high, the allocation of the current bank is reversed so that the bank B is accessed, as shown in part (f) of FIG. 48. Next, since A_Pred_H/M is low, as shown in part (a) of FIG. 49, the block #3 is now loaded into the bank A which is the prediction bank, the result being as shown in part (b) of FIG. 49. At time $t_3$, the current block address is now #1 and the prediction block address #2, as shown in part (c) of FIG. 49. As a result, the allocation of the current bank is reversed, so that an access is made to the bank A which is the current bank (part (d) of FIG. 49). At time $t_4$, A_Curr_H/M is low and B_Curr_H/M is high, as shown in part (e) of FIG. 49, so that the allocation of the current bank is again reversed, and the bank B is accessed, as shown in part (f) of FIG. 49. As the time elapses from $t_5$ to $t_6$ to $t_7$ to $t_8$ to $t_9$, the states change as shown in FIGS. 50 and 51.

In the above process, the processing of data belonging to a new data block is initiated at time $t_0$, $t_2$, $t_5$, $t_8$, and $t_9$, but it should be noted that it is only at time $t_0$, $t_5$, and $t_8$ that the processing is interrupted until a new data block is loaded; at $t_2$ and $t_9$, the processing can be continued without interruption just by reversing the allocation of the current and prediction banks.

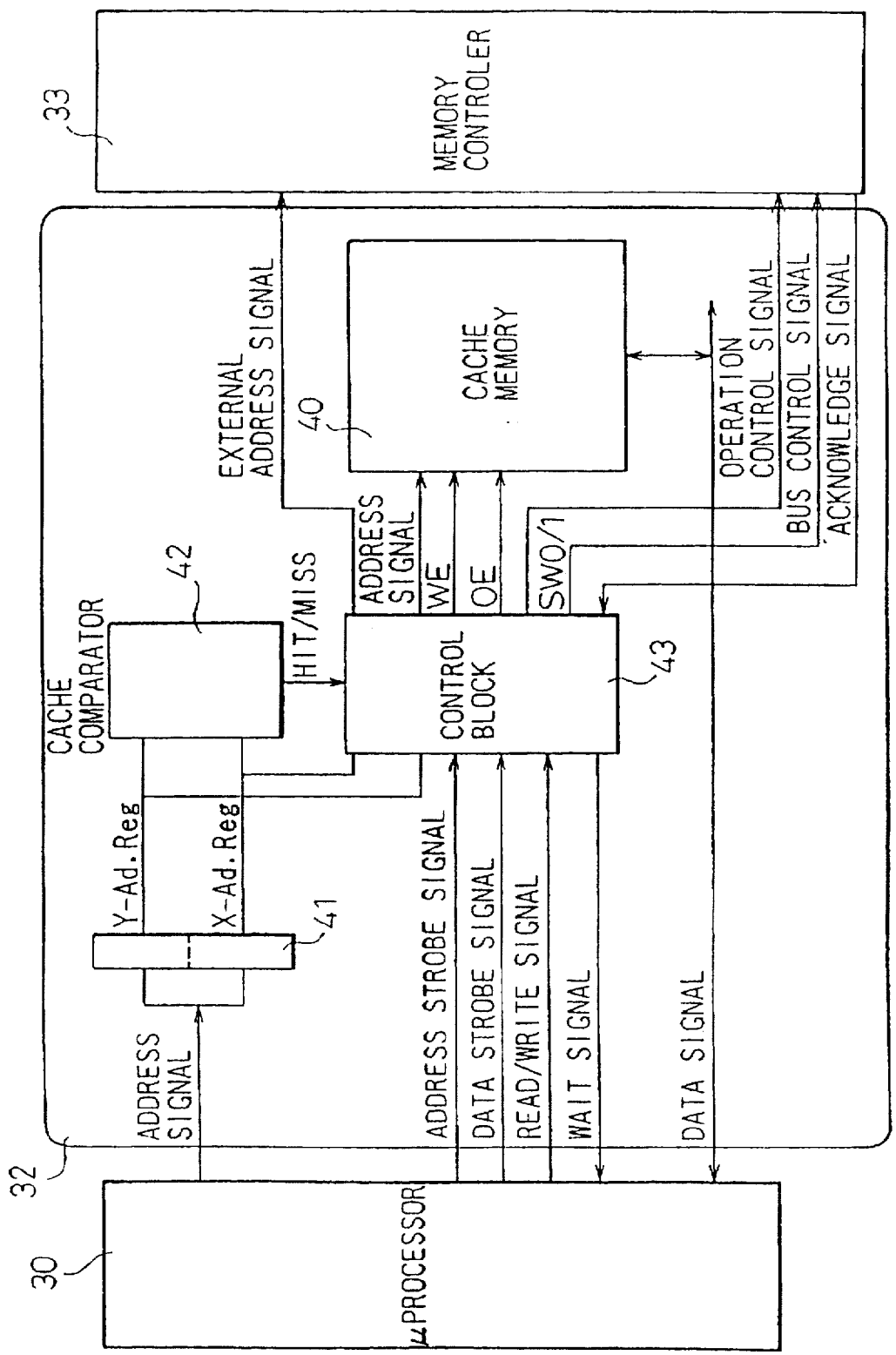

We claim:

1. A cache-memory system for processing data stored in a main memory at a location specified by a combination of data addresses, the cache memory system comprising:

a first cache memory bank having a plurality of memory areas, each memory area storing a copy of a data block specified by a block address indicated by a first part of the combination of data addresses, and each memory area having constituent data specified by an intra-block address formed of a second part of the combination of data addresses;

a second cache memory bank having a plurality of memory areas, each memory area storing a copy of a data block specified by a block address indicated by a first part of the combination of data addresses, and each memory area having constituent data specified by an intra-block address indicated by the remaining second part of the combination of data addresses;

a prediction address generating circuit to determine a prediction block address, in accordance with a prescribed rule, from a current block address derived from a combination of specified data addresses;

a cache comparator to determine whether the current block address and the prediction block address determined by said prediction address generating circuit are stored in said first and said second cache memory bank; and a control block to control said main memory and said first and said second cache memory banks in accordance with the determination made by said cache comparator, said control block allocates one of said first and second cache memory banks as a current bank and the other of said first and second cache memory banks as a prediction bank, reverses the allocation of the current and prediction banks when said cache comparator determines that the current block address is stored in the prediction bank, and block-reads a copy of a data block specified by said prediction block address into the prediction bank, when said cache comparator determines that the prediction block address is not stored in the prediction bank.

2. A cache-memory system according to claim 1, wherein the first part of the combination of data addresses consists of a combination of high-order bits of said plurality of data addresses.

3. A cache-memory system according to claim 1, wherein said cache comparator includes a first and a second cache comparator circuit to respectively determine the occurrence of a hit or a miss in said first and said second cache memory banks; and said first and said second cache comparator circuit each comprise:

a tag memory which stores, in a memory location specified by a tag address formed by a first part of said block address, a tag formed by a second part of said block address, a valid flag indicating whether a copy of a data block specified by a block address identified by the tag and the tag address is validly stored in the cache memory, and a line number designating the memory area holding a valid copy;

a first match detection circuit to determine that a hit has occurred for the current block address when the tag stored in the memory location in said tag memory specified by the tag address derived from the current block address matches the tag derived from said current block address matches the tag derived from said current block address and when the valid flag stored in said memory location is true; and a second match detection circuit to determine that a hit has occurred for the prediction block address when the tag stored in the memory location in said tag memory specified by the tag address derived from the prediction block address matches the tag derived from said prediction block address, and when the valid flag stored in said memory location is true.

4. A cache-memory system according to claim 3, wherein the tag and the tag address each include bits from all of the data addresses used in the combination.

5. A cache-memory system for processing data stored in a main memory at a location specified by a combination of data addresses, the cache memory system comprising:

a first cache memory bank having a plurality of memory areas, each memory area storing a copy of a data block specified by a block address indicated by a first part of the combination of data addresses, and each memory areas having constituent data specified by an intra-block address formed of a second part of the combination of data addresses;

a second cache memory bank having a plurality of memory areas, each memory area storing a copy of a data block specified by a block address indicated by a first part of the combination of data addresses, and each memory area having constituent data specified by an intra-block address indicated by the remaining second part of the combination of data addresses;

a prediction address generating circuit to determine a prediction block address, in accordance with a rule specified by a prediction mode signal, from a current block address derived from a combination of specified data addresses;

a cache comparator to determine whether the current block address and the prediction block address determined by said prediction address generating circuit are stored in said first and said second cache memory bank; and a control block to control said main memory and said first and said second cache memory banks in accordance with the determination made by said cache comparator and when said prediction mode signal specifies a two-way cache mode, said control block controls first and second cache memory banks as a two-way cache in accordance with the determination on said current block address regardless of the determination on said prediction block address.

6. A cache-memory system for storing, in a cache memory, a portion of a main memory where data to be specified by a combination of data addresses are stored, comprising:

a first cache comparator to determine whether first data specified by a combination of the data addresses is available in the cache memory;

a prediction address generating circuit to generate a data address determined by the combination of data addresses and by a prediction mode;

a second cache comparator to determine whether second data specified by the data address generated by said prediction address generating circuit is available in the cache memory; and a control block to read the first and said second data from the main memory for loading into the cache memory when first and said second cache comparators have determined that a cache miss has occurred.

\* \* \* \* \*

UNITED STATES PATENT AND TRADEMARK OFFICE
CERTIFICATE OF CORRECTION

PATENT NO.:     5,822,760
DATED     :     October 13, 1998
INVENTOR(S):    Hideki YOSHIZAWA et al.

It is certified that error appears in the above-identified patent and that said Letters Patent is hereby corrected as shown below:

In the Drawing:
Please substitute each of Figs. 1-5 with the correct Figs. 1-5 attached hereto.

Signed and Sealed this

Ninth Day of November, 1999

Q. TODD DICKINSON

*Attest:*

*Attesting Officer*        Acting Commissioner of Patents and Trademarks